US012578009B2

(12) United States Patent
     Stockinger et al.

(10) Patent No.:    US 12,578,009 B2
(45) Date of Patent:        Mar. 17, 2026

(54) DUAL-CLUTCH TRANSMISSION

(71) Applicant: BRP-ROTAX GMBH & CO. KG,
     Gunskirchen (AT)

(72) Inventors: Martin Stockinger, Zell am Pettenfirst
     (AT); Stefan Krenn, Linz (AT);
     Andreas Matheis, Passau (DE);
     Thomas Gadermayr, Taiskirchen (AT);
     Johannes Wurm, Wallern an der
     Trattnach (AT)

(73) Assignee: BRP-ROTAX GMBH & CO. KG,
     Gunskirchen (AT)

( * ) Notice: Subject to any disclaimer, the term of this
     patent is extended or adjusted under 35
     U.S.C. 154(b) by 0 days.

(21) Appl. No.:    18/710,071

(22) PCT Filed:    Nov. 29, 2022

(86) PCT No.:    PCT/EP2022/083743
     § 371 (c)(1),
     (2) Date:    May 14, 2024

(87) PCT Pub. No.:    WO2023/099503
     PCT Pub. Date: Jun. 8, 2023

(65)            Prior Publication Data
     US 2025/0012343 A1        Jan. 9, 2025

Related U.S. Application Data

(60) Provisional application No. 63/284,281, filed on Nov.
     30, 2021.

(51) Int. Cl.
     F16H 57/04        (2010.01)
     F16H 3/093        (2006.01)
            (Continued)

(52) U.S. Cl.
     CPC ......... F16H 57/0415 (2013.01); F16H 3/093
            (2013.01); F16H 57/021 (2013.01);
            (Continued)

(58) Field of Classification Search
     CPC .................................................... F16H 57/027
     See application file for complete search history.

(56)            References Cited

U.S. PATENT DOCUMENTS 3,693,478 A * 9/1972 Malloy ................. F16H 61/142
                                                          192/3.3
     4,554,844 A * 11/1985 Hamano ............... F16H 57/027
                                                          74/606 R (Continued)

FOREIGN PATENT DOCUMENTS

CN        109654205 A * 4/2019 ........... F16H 57/027
     DE        102017114889 A1 1/2019
            (Continued)

OTHER PUBLICATIONS

International Search Report of PCT/EP2022/083743; issued by the
ISA/EP; Apr. 28, 2023.

*Primary Examiner* — Bobby Rushing, Jr.
(74) *Attorney, Agent, or Firm* — BCF LLP

(57)            ABSTRACT
A transmission for a vehicle (20) includes: an input shaft
(122) for connection to an internal combustion engine (52)
of the vehicle (20); a gear (605) shaft (**122, 199, 400A,
400B**) selectively operatively connected to the input shaft
(122); a clutch selectively actuatable to transmit motion
between the input shaft (122) and the gear (605) shaft (**122,
199, 400A, 400B**) for selectively operating the transmission
in one of a plurality of transmission gears (600); an output
shaft (740) operatively connected to the gear (605) shaft
(122, 199, 400A, 400B) at least in part by the transmission
gears (600); and a transmission housing (102) at least partly
enclosing the input shaft (122), the transmission gears (600),
            (Continued)

the clutch and the output shaft (740). An internal dividing wall (506, 510) defines first and second chambers (350A, 502), the internal dividing wall (506, 510) being configured to limit flow of transmission fluid between the first and second chambers (350A, 502). The input shaft (122) and the clutch are disposed within the first chamber (350A, 350B, 508). The transmission gears (600) and the output shaft (740) are disposed within the second chamber (350A, 350B, 508).

9 Claims, 45 Drawing Sheets

(51) Int. Cl.
| | |
|---|---|
| *F16H 57/021* | (2012.01) |
| *F16H 57/027* | (2012.01) |

(52) U.S. Cl.
CPC ....... *F16H 57/027* (2013.01); *F16H 57/0424* (2013.01); *F16H 57/046* (2013.01)

(56) References Cited

U.S. PATENT DOCUMENTS

| | | | | |
|---|---|---|---|---|
| 8,105,203 | B2 * | 1/2012 | Ishii | ...................... F16H 3/006 |
| | | | | 74/330 |
| 9,981,519 | B2 | 5/2018 | Despres-Nadeau et al. | |
| 10,591,036 | B2 * | 3/2020 | Matsuura | ............... B60K 17/16 |
| 2020/0318727 | A1 | 10/2020 | Ege et al. | |

FOREIGN PATENT DOCUMENTS

| | | | |
|---|---|---|---|
| EP | 2025972 | A2 | 2/2009 |
| JP | 2000274516 | A | 10/2000 |
| JP | 2013029128 | A | 2/2013 |
| WO | 2021152167 | A1 | 8/2021 |

* cited by examiner

DUAL-CLUTCH TRANSMISSION

CROSS-REFERENCE

The present application claims priority to U.S. Provisional Patent Application No. 63/284,281, filed Nov. 30, 2021, the entirety of which is incorporated herein by reference.

TECHNICAL FIELD

The present technology relates to dual-clutch transmissions.

BACKGROUND

Off-road vehicles have powertrains that can incorporate different types of transmission, such as a continuously variable transmission (CVT) or a manually operated transmission. However, other types of transmissions could be used in off-road vehicles and offer different performance in certain conditions than the aforementioned CVT and manually operated transmission.

A dual-clutch transmission (DCT) is a type of transmission that includes first and second clutches. The first clutch drives the odd-numbered transmission gears via a first shaft, and the second clutch drives the even-numbered transmission gears via a second shaft. In a DCT, gear changes can be accomplished without interrupting torque distribution to the driven wheels. The torque of the engine is applied to one clutch at the same time as it is being disconnected from the other clutch. Since alternate gear ratios can preselect an odd transmission gear on one shaft while the vehicle is being driven in an even transmission gear (and vice versa), DCTs offer good shifting performance and efficiency in certain conditions. However, dual-clutch transmissions have not been made widely available in off-road vehicles yet. Reasons causing the delay of their widespread adoption in off-road vehicles include relatively high manufacturing costs and packaging issues due to the limited space in the engine compartment.

Furthermore, it is important to ensure proper lubrication of the various internal components of a DCT. However, in some cases, depending on the complexity of the DCT, maintaining efficient and adequate lubrication of the components of the DCT can be difficult to implement, particularly in cases where the size of the DCT is limited by the amount of space available therefor in the corresponding vehicle.

Therefore, there is a desire for dual-clutch transmissions that can be efficiently packaged in an off-road vehicle, while having reduced manufacturing costs.

SUMMARY

It is an object of the present to ameliorate at least some of the inconveniences present in the prior art.

According to an aspect of the present technology, there is provided a transmission for a vehicle a transmission for a vehicle, comprising: an input shaft configured to be operatively connected to an internal combustion engine of the vehicle; a gear shaft selectively operatively connected to the input shaft; a plurality of transmission gears mounted to the gear shaft; a clutch selectively actuatable to transmit motion between the input shaft and the gear shaft for selectively operating the transmission in one of the plurality of transmission gears; an output shaft operatively connected to the gear shaft at least in part by the plurality of transmission gears, the output shaft being configured to be operatively connected to at least one ground-engaging member of the vehicle; and a transmission housing at least partly enclosing the input shaft, the plurality of transmission gears, the clutch and the output shaft, the transmission housing comprising an internal dividing wall defining first and second chambers of the transmission housing, the internal dividing wall being configured to limit flow of transmission fluid between the first and second chambers, the input shaft and the clutch being disposed within the first chamber, and the plurality of transmission gears and the output shaft being disposed within the second chamber.

In some embodiments, the transmission housing has a lower end and an upper end; and the internal dividing wall extends along at least a majority of a distance measured from the lower end to the upper end.

In some embodiments, the output shaft extends outside of the second chamber through a side of the second chamber opposite the first chamber.

In some embodiments, the internal dividing wall defines at least one air hole disposed in an upper portion of the internal dividing wall for balancing a pressure within the first chamber with a pressure within the second chamber.

In some embodiments, the transmission also includes a transmission fluid distribution system configured to distribute transmission fluid within the transmission and fluidly connecting the first chamber to the second chamber, the transmission fluid distribution system comprising: a fluid tank defined at least in part by the transmission housing; and a primary pump fluidly connected to the fluid tank and to the first and second chambers, the primary pump being configured to pump transmission fluid to the first and second chambers.

In some embodiments, the internal dividing wall has a first side defining the first chamber and a second side defining the second chamber; and the internal dividing wall defines at least one fluid channel extending from the first side to the second side of the internal dividing wall, the at least one fluid channel being fluidly connected to the primary pump to route transmission fluid in a controlled manner from the first chamber to the second chamber.

In some embodiments, the transmission fluid distribution system further comprises at least one fluid spraying device disposed in the second chamber and fluidly connected to the at least one fluid channel such as to receive transmission fluid therefrom, the at least one fluid spraying device being configured to spray transmission fluid within the second chamber.

In some embodiments, the gear shaft defines a shaft passage that extends from the first chamber to the second chamber, the shaft passage being fluidly connected to the primary pump.

In some embodiments, the transmission fluid distribution system further comprises a heat exchanger fluidly connected to the primary pump and configured to absorb heat from transmission fluid received from the primary pump, the heat exchanger having an inlet for receiving heated transmission fluid from the primary pump and an outlet for discharging cooled transmission fluid to multiple components of the transmission including the clutch.

In some embodiments, the primary pump is a rotary vane pump.

In some embodiments, the transmission is a dual clutch transmission; the clutch is a first clutch; the gear shaft is a first gear shaft; the plurality of transmission gears is a plurality of first transmission gears; the transmission further comprises: a second gear shaft selectively operatively connected to the input shaft; a plurality of second transmission gears mounted to the second gear shaft; and a second clutch selectively actuatable to transmit motion between the input shaft and the plurality of second gears for selectively operating the transmission in one of the plurality of second transmission gears, the second clutch being disposed within the first chamber, the plurality of second transmission gears being disposed within the second chamber; and the transmission fluid distribution system further comprises a plurality of valves including a first valve and a second valve fluidly connected to the first clutch and the second clutch respectively for actuating the first clutch and the second clutch.

In some embodiments, the transmission fluid distribution system further comprises a first passage fluidly connecting the primary pump to the heat exchanger and a second passage fluidly connecting the primary pump to the first and second valves; and transmission fluid pumped by the primary pump is routed in part to the heat exchanger via the first passage and in part to the first and second valves via the second passage.

In some embodiments, the plurality of valves includes a third valve; the third valve is fluidly connected to the fluid outlet of the heat exchanger such as to receive cooled transmission fluid therefrom; the third valve is fluidly connected to one of the first clutch and the second clutch to cool the one of the first clutch and the second clutch.

In some embodiments, the plurality of first transmission gears correspond to odd-numbered gears of the transmission; the plurality of second transmission gears correspond to even-numbered gears of the transmission; and the third valve is fluidly connected to the first clutch.

In some embodiments, the first and second valves are proportional valves; and the third valve is an on/off valve.

In some embodiments, the transmission fluid distribution system further comprises: a valve housing at least partly enclosing the plurality of valves; and a plurality of valve outlet passages fluidly connecting the plurality of valves to the first and second clutches, the valve housing being positioned vertically higher than the first and second clutches when the vehicle is at rest on a flat horizontal ground surface such that the valve outlet passages remain filled with transmission fluid throughout operation of the transmission.

In some embodiments, the transmission fluid distribution system further comprises: a first suction pump fluidly connected to the first chamber; and a second suction pump fluidly connected to the second chamber, the first and second suction pumps being fluidly connected to the fluid tank to route transmission fluid from the first and second chambers to the fluid tank.

In some embodiments, the transmission fluid distribution system further comprises a third suction pump fluidly connected to the second chamber, the third suction pump being fluidly connected to the fluid tank to route transmission fluid from the second chamber to the fluid tank.

In some embodiments, the input shaft is rotatable about an input axis; and the suction pumps are disposed vertically lower than the input axis when the vehicle is at rest on a flat horizontal ground surface.

In some embodiments, the transmission housing defines a separator compartment; the transmission fluid distribution system further comprises an air separator disposed in the separator compartment and configured to separate air from transmission fluid, the air separator comprising a separator body that is rotatable about a separator axis, the separator body comprising an impeller; and the suction pumps being fluidly connected to the separator compartment such as to pump transmission fluid from the first and second chambers to the air separator.

In some embodiments, the separator compartment is fluidly connected to the fluid tank such that transmission fluid flows from the separator compartment to the fluid tank.

In some embodiments, the separator compartment comprises an air outlet for discharging air separated from transmission fluid in the separator compartment, the air outlet being disposed at an upper end of the separator compartment.

In some embodiments, the transmission further comprises a primary gear driven by the input shaft; and the transmission fluid distribution system further comprises a separator gear driven by the primary gear, the separator gear being operatively connected to the separator body to cause rotation thereof about the separator axis.

In some embodiments, the separator compartment has an inlet, the separator compartment extending upward from the inlet.

In some embodiments, the separator axis is disposed vertically higher than the suction pumps when the vehicle is at rest on a flat horizontal ground surface.

In some embodiments, the separator body further comprises: a hub that is generally cylindrical and centered about the separator axis, the impeller comprising a plurality of impeller blades extending from the hub and centered about the separator axis; and a sleeve that is generally conical and centered about the separator axis, the sleeve being connected to each of the impeller blades.

In some embodiments, the separator body further comprises an annular formation axially spaced from the sleeve and centered about the separator axis, the annular formation being connected to each of the impeller blades.

In some embodiments, a pressure relief valve selectively fluidly communicates an interior of the fluid tank with an interior of the transmission housing.

In some embodiments, the pressure relief valve selectively fluidly communicates the interior of the fluid tank with an interior of the first chamber.

In some embodiments, the pressure relief valve opens in response to a pressure inside the fluid tank exceeding a predetermined pressure.

In some embodiments, the pressure relief valve has: a valve body; a piston disposed in the valve body; and a spring biasing the piston toward a position closing the pressure relief valve.

In some embodiments, the transmission housing further defines a third chamber configured to enclose a transaxle of the vehicle; the second chamber is disposed between the first chamber and the third chamber; the transmission further comprises a bevel gear operatively connected to the output shaft such that the bevel gear rotates together with the output shaft, the bevel gear being configured to be operatively connected to the transaxle; and the bevel gear is disposed within the third chamber.

In some embodiments, the third chamber is fluidly independent from the first and second chambers.

In some embodiments, the bevel gear is mounted to the output shaft; the output shaft defines a fluid passage extending axially; and the transmission housing comprises a funnel configured to receive transmission fluid circulated within the third chamber by the transaxle, the funnel being fluidly connected to the fluid passage of the output shaft.

In some embodiments, the transmission further comprises a bearing mounted to the output shaft and supported by the transmission housing; and the fluid passage of the output shaft is fluidly connected to the bearing for lubrication thereof.

According to another aspect of the present technology, there is provided a transmission for a vehicle, comprising: an input shaft configured to be operatively connected to an internal combustion engine of the vehicle; a gear shaft selectively operatively connected to the input shaft; a plurality of transmission gears mounted to the gear shaft; a clutch selectively actuatable to transmit motion between the input shaft and the gear shaft for selectively operating the transmission in one of the plurality of transmission gears; an output shaft operatively connected to the gear shaft at least in part by the plurality of transmission gears, the output shaft being configured to be operatively connected to at least one ground-engaging member of the vehicle; a transmission housing at least partly enclosing the input shaft, the plurality of transmission gears, the clutch and the output shaft; a transmission fluid distribution system for distributing transmission fluid throughout the transmission, the transmission fluid distribution system comprising: a fluid tank defined at least in part by the transmission housing; a primary pump fluidly connected to the fluid tank to pump transmission fluid from the fluid tank throughout the transmission housing; a separator compartment defined at least in part by the transmission housing, the separator compartment being fluidly connected to the fluid tank; and an air separator disposed in the separator compartment and configured to separate air from transmission fluid, the air separator comprising a separator body that is rotatable about a separator axis, the separator body comprising an impeller.

In some embodiments, the transmission fluid distribution system further comprises at least one suction pump fluidly connected to the fluid tank to route transmission fluid to the fluid tank.

In some embodiments, the separator axis is disposed vertically higher than the at least one suction pump when the vehicle is at rest on a flat horizontal ground surface.

In some embodiments, transmission fluid flows from the separator compartment to the fluid tank.

In some embodiments, the separator compartment comprises an air outlet for discharging air separated from transmission fluid in the separator compartment, the air outlet being disposed at an upper end of the separator compartment.

In some embodiments, the transmission further comprises a primary gear driven by the input shaft; and the transmission fluid distribution system further comprises a separator gear driven by the primary gear, the separator gear being operatively connected to the separator body to cause rotation thereof about the separator axis.

In some embodiments, the separator compartment has an inlet, the separator compartment extending upward from the inlet.

In some embodiments, the separator axis is disposed vertically higher than an input shaft axis of the input shaft when the vehicle is at rest on a flat horizontal ground surface, the input shaft being rotatable about the input shaft axis.

In some embodiments, the separator body further comprises: a hub that is generally cylindrical and centered about the separator axis, the impeller comprising a plurality of impeller blades extending from the hub and centered about the separator axis; and a sleeve that is generally conical and centered about the separator axis, the sleeve being connected to each of the impeller blades.

In some embodiments, the separator body further comprises an annular formation axially spaced from the sleeve and centered about the separator axis, the annular formation being connected to each of the impeller blades.

In some embodiments, a pressure relief valve selectively fluidly communicates an interior of the fluid tank with an interior of the transmission housing.

In some embodiments, the pressure relief valve opens in response to a pressure inside the fluid tank exceeding a predetermined pressure.

In some embodiments, the pressure relief valve has: a valve body; a piston disposed in the valve body; and a spring biasing the piston toward a position closing the pressure relief valve.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
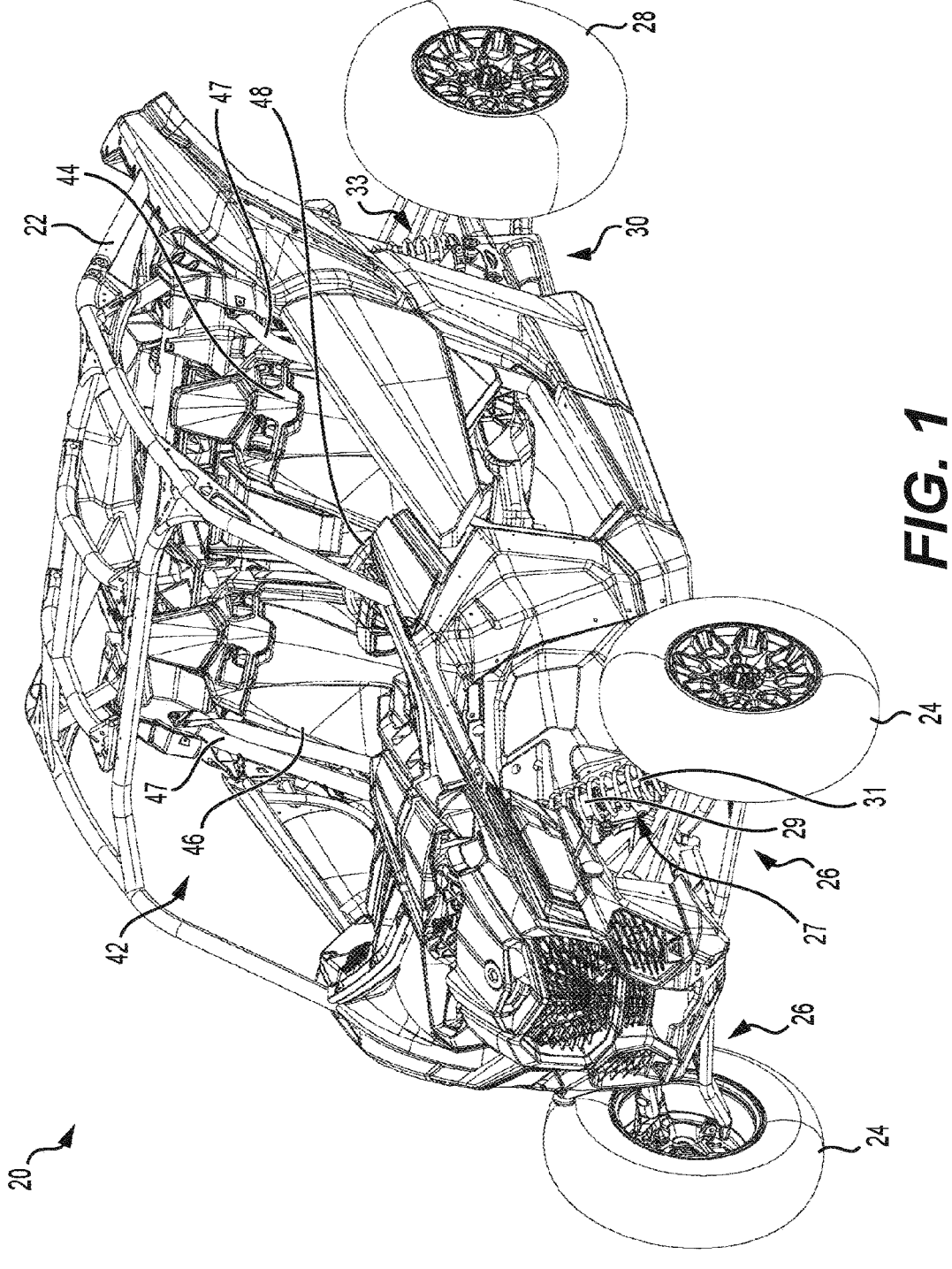
FIG. 1 is a perspective view taken from a top, front, left side of an off-road vehicle.

A dual-clutch transmission 100 (DCT) will be described herein with respect to a four-wheel side-by-side off-road vehicle 20, but it is contemplated that the DCT 100 could be used in other types of vehicles such as, but not limited to, off-road vehicles having more or less than four wheels and/or more or less than two seats. The general features of the off-road vehicle 20 will be described with respect to FIGS. 1 and 2.

The vehicle 20 has a frame 22, two front wheels 24 connected to a front of the frame 22 by front suspension assemblies 26 and two rear wheels 28 connected to the frame 22 by rear suspension assemblies 30 such as those described in U.S. Pat. No. 9,981,519 B2, dated May 29, 2018. Each front suspension assembly 26 has a front shock absorber assembly 27 including a shock absorber 29 and a spring 31. Each rear suspension assembly 30 has a rear shock absorber assembly 33 including a shock absorber 35 and a spring 37. Ground engaging members other than wheels 24, 28 are contemplated for the vehicle 20, such as tracks or skis. In addition, although four ground engaging members are illustrated in the Figures, the vehicle 20 could include more or less than four ground engaging members. Furthermore, different combinations of ground engaging members, such as tracks used in combination with skis, are contemplated.

The frame 22 defines a central cockpit area 42 inside which are disposed a driver seat 44 and a passenger seat 46. In the present implementation, the driver seat 44 is disposed on the left side of the vehicle 20 and the passenger seat 46 is disposed on the right side of the vehicle 20. However, it is contemplated that the driver seat 44 could be disposed on the right side of the vehicle 20 and that the passenger seat 46 could be disposed on the left side of the vehicle 20. As can be seen in FIG. 1, the vehicle 20 further has a seat belt 47 for each one of the seats 44, 46. A steering wheel 48 is disposed in front of the driver seat 44. The steering wheel 48 is used to turn the front wheels 24 to steer the vehicle 20. Various displays and gauges 50 are disposed in front of the steering wheel 48 to provide information to the driver regarding the operating conditions of the vehicle 20. Examples of displays and gauges 50 include, but are not limited to, a speedometer, a tachometer, a fuel gauge, a transmission position display, and an oil temperature gauge.

Figure 2:
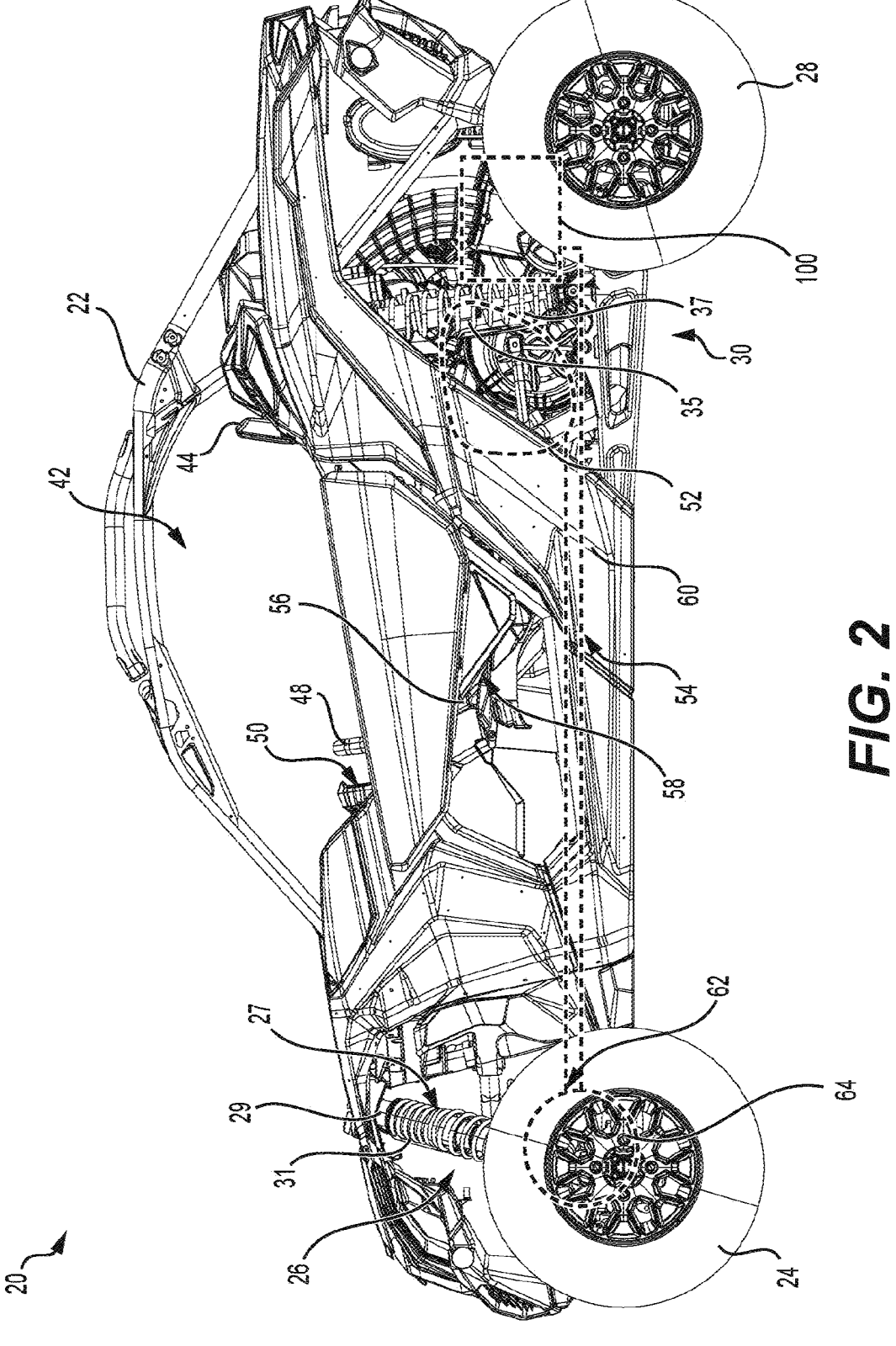
FIG. 2 is a left side elevation view of the off-road vehicle of FIG. 1.

Referring to FIG. 2, an internal combustion engine 52 (schematically shown in FIGS. 2 and 3) is connected to the frame 22 in a rear portion of the vehicle 20. The engine 52 has a crankshaft 53 (schematically shown in FIG. 3A) that is connected to the DCT 100 disposed behind the engine 52 (both schematically shown in FIG. 2). The DCT 100 includes a subtransmission 700 (FIGS. 4, 5 and 14) operatively connected to a driveline 54 (schematically shown in FIG. 2) of the vehicle 20 for operatively connecting the front and rear wheels 24, 28 to the engine 52 in order to propel the vehicle 20. A gear shifter 56 (FIG. 2) located between the seats 44, 46 operates the DCT 100 and the subtransmission 700 of the vehicle 20, and enables the driver to select one of a plurality of gear configurations for operation of the vehicle 20. It is contemplated that paddle shifters (not shown) could be mounted to the steering wheel 48 for enabling the driver to select a gear for operation of the vehicle 20. In the illustrated implementation of the vehicle 20, the gear configurations made available by the DCT 100 include a reverse gear, and forward first, second, third, fourth, fifth, sixth and seventh gear. The gear configurations made available by the subtransmission 700 include park, neutral, high forward gears, and low forward gears. Thus, the DCT 100 and the subtransmission 700 enable fourteen different forward-going gear configurations and two different reverse gear configurations. It is contemplated that the sequence and/or number of gear configurations could be different than as shown herein in other implementations.

A driving mode selector button 58 (FIG. 2) also enables the driver to select 2×4 or 4×4 operation of the vehicle 20. More particularly, the driveline 54 includes a front propeller shaft 60 which extends horizontally to the left of the engine 52 towards a front differential assembly 62 (schematically shown in FIG. 2). The front differential assembly 62 is operatively connected to the front wheels 24 via front wheel axle assemblies (not shown). The front differential assembly 62 includes an electronic selector 64 (also schematically shown in FIG. 2) operatively connected to the driving mode selector button 58. The electronic selector 64 allows to selectively connect the front propeller shaft 60 to the front wheel axle assemblies to enable 4×4 driving mode of the vehicle 20, or to selectively disconnect the front propeller shaft 60 from the front wheel axle assemblies to enable 2×4 driving mode of the vehicle 20 (i.e. with only the rear wheels 28 propelling the vehicle 20).

The vehicle 20 further includes other components such as brakes, a radiator, headlights, and the like. As it is believed that these components would be readily recognized by one of ordinary skill in the art, further explanation and description of these components will not be provided herein.

Turning now to FIGS. 3 to 14, the DCT 100 will be described in more detail. The DCT 100 includes a transmission housing 102 that is separate from the internal combustion engine 52. The housing 102 is flanged to a rear face of the internal combustion engine 52. In addition, the housing 102 has a dedicated hydraulic and lubrication transmission fluid circuit, separated from that of the engine 52. Notably, the DCT 100 has a transmission fluid distribution system 450 defining the hydraulic and lubrication transmission fluid circuit to distribute transmission fluid within the DCT 100.

The transmission fluid distribution system 450 includes a transmission fluid pump 104 (schematically shown in FIG. 3A) received inside the housing 102. The transmission fluid pump 104 is adapted to selectively pump a transmission fluid such as oil-based fluids. Again, in the present implementation, the transmission fluid pump 104 is separated from any other pump(s) the engine 52 may have. The transmission fluid pump 104 may be referred to as the "primary pump" of the transmission fluid distribution system 450. Notably, as will be described in greater detail below, in this embodiment, the transmission fluid distribution system 450 also includes other pumps to ensure circulation of transmission fluid throughout the DCT 100. In this embodiment, the primary pump 104 is a rotary vane pump. Moreover, in this embodiment, the primary pump 104 has a pressure regulating valve to vary a pressure setting thereof.

The arrangement of the transmission housing 102 and the transmission fluid distribution system 450 will be described in greater detail below.

Figure 3A:
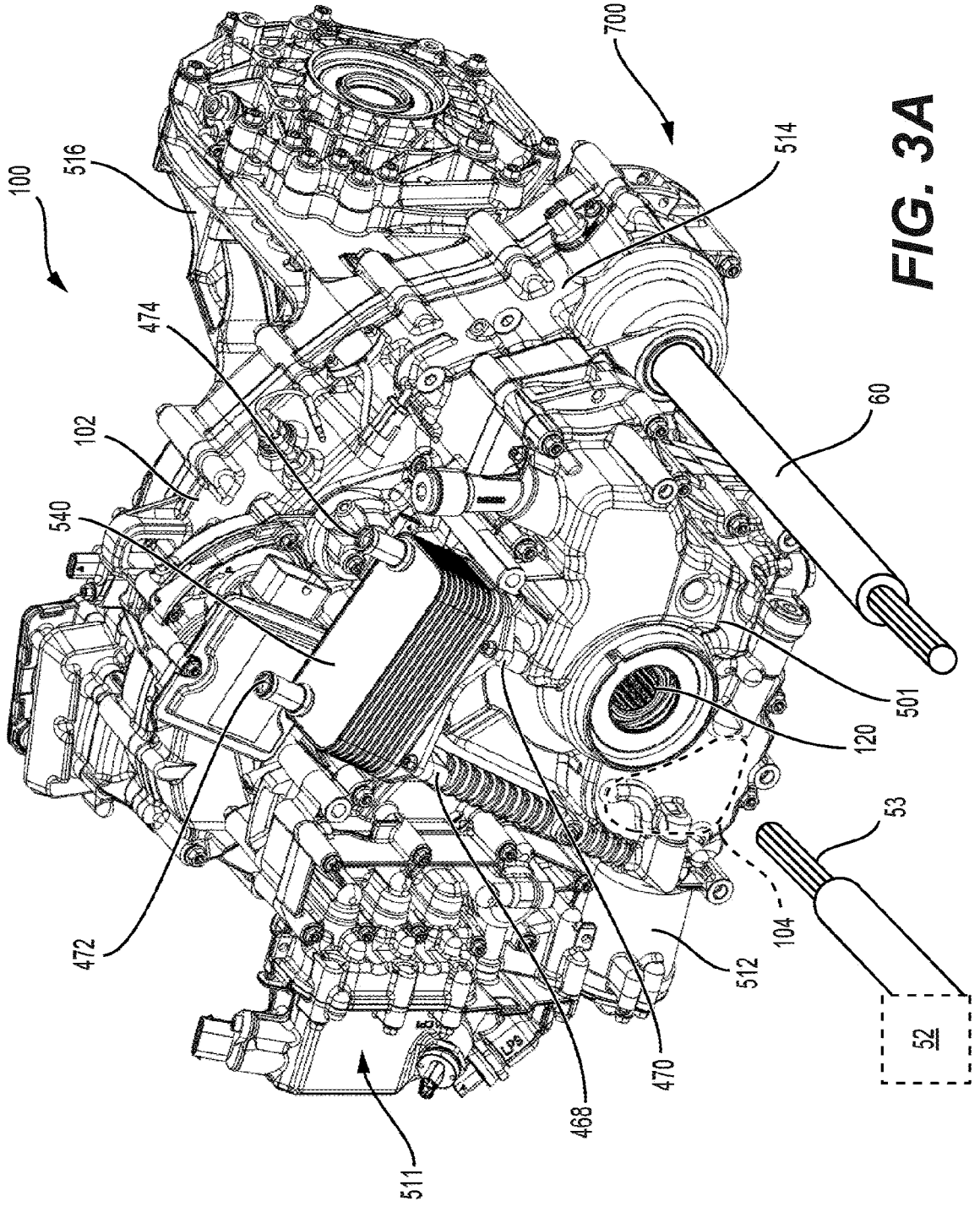
FIG. 3A is a perspective view taken from a top, front, left side of a dual-clutch transmission and front propeller shaft of the vehicle of FIG. 1.
Figure 3B:
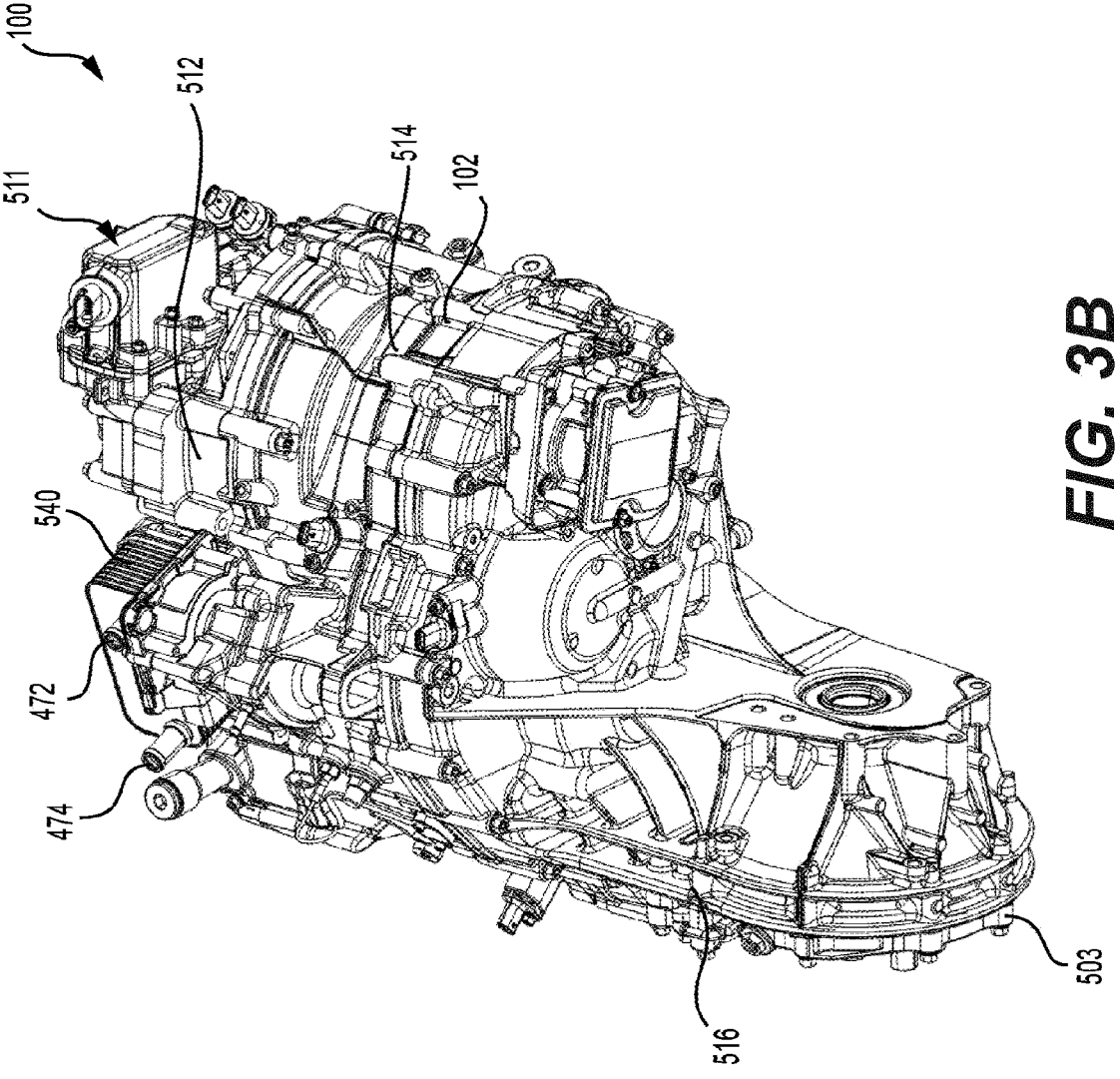
FIG. 3B is a perspective view taken from a top, rear, right side of the dual-clutch transmission of FIG. 3A.
Figure 3C:
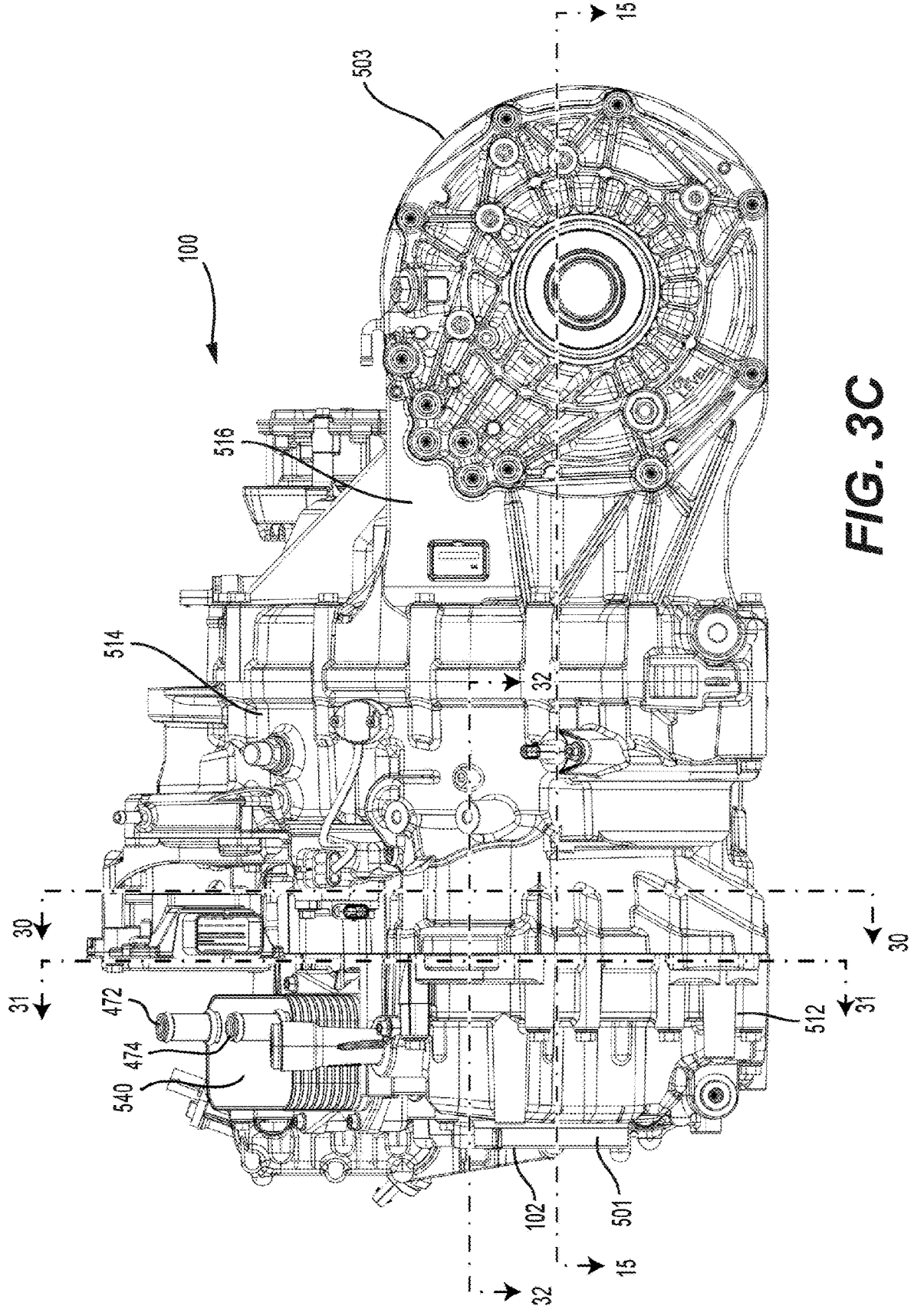
FIG. 3C is a left side elevation view of the dual-clutch transmission of FIG. 3A.
Figure 3D:
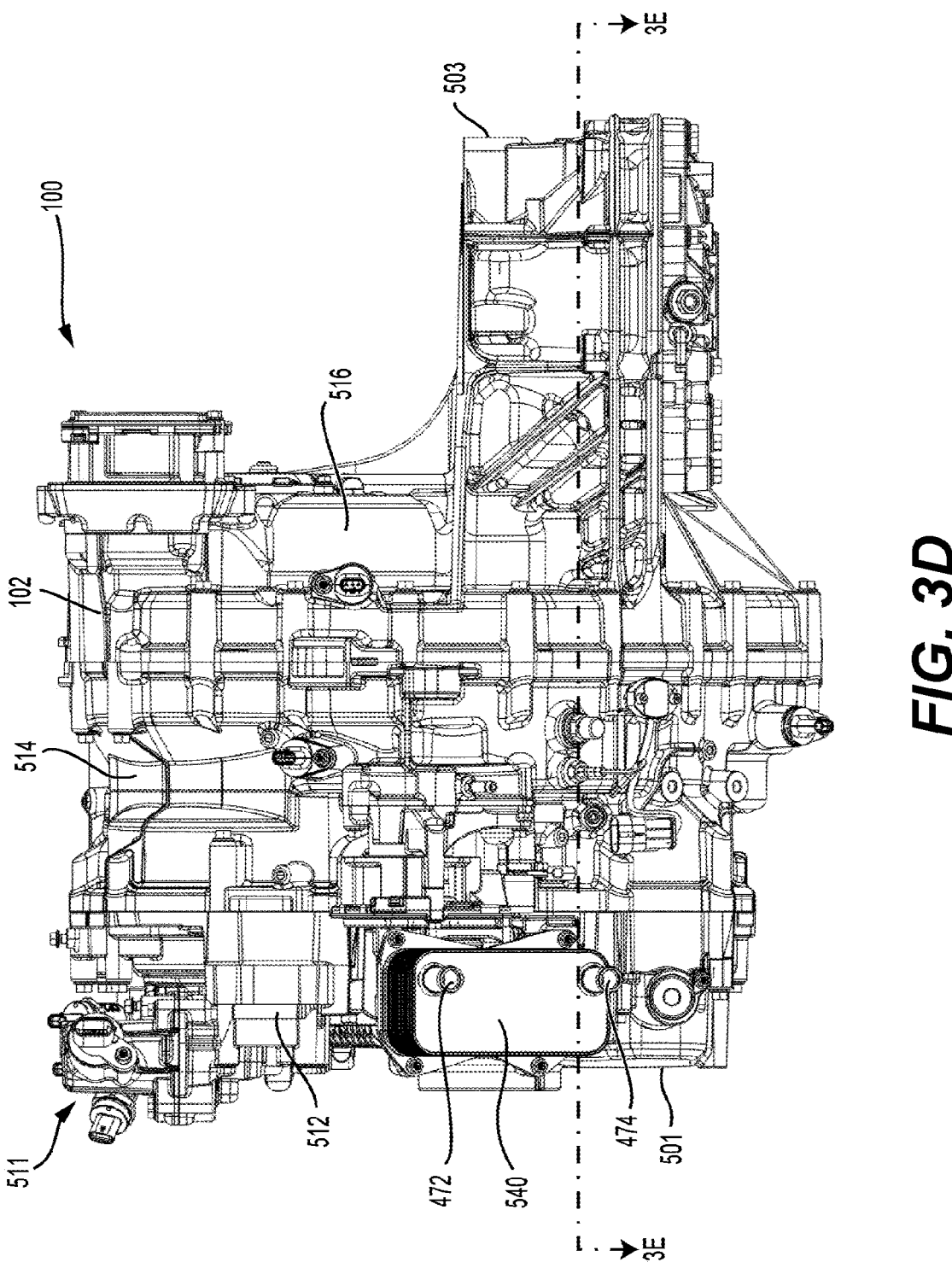
FIG. 3D is a top plan view of the dual-clutch transmission of FIG. 3A.
Figure 4:
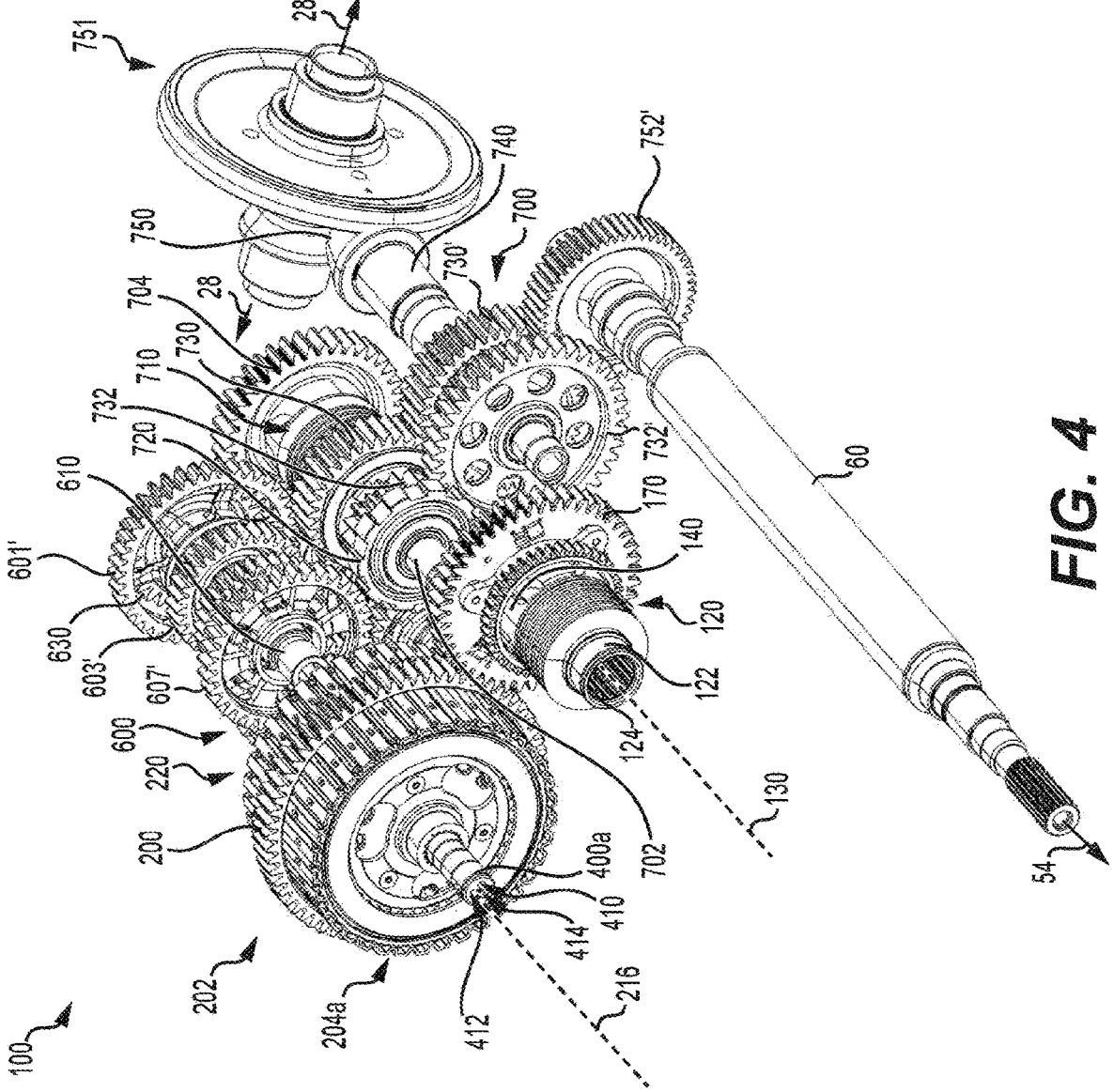
FIG. 4 is a perspective view taken from a top, front, left side of the dual-clutch transmission and front propeller shaft of FIG. 3A, with a housing of the dual-clutch transmission removed.
Figure 5:
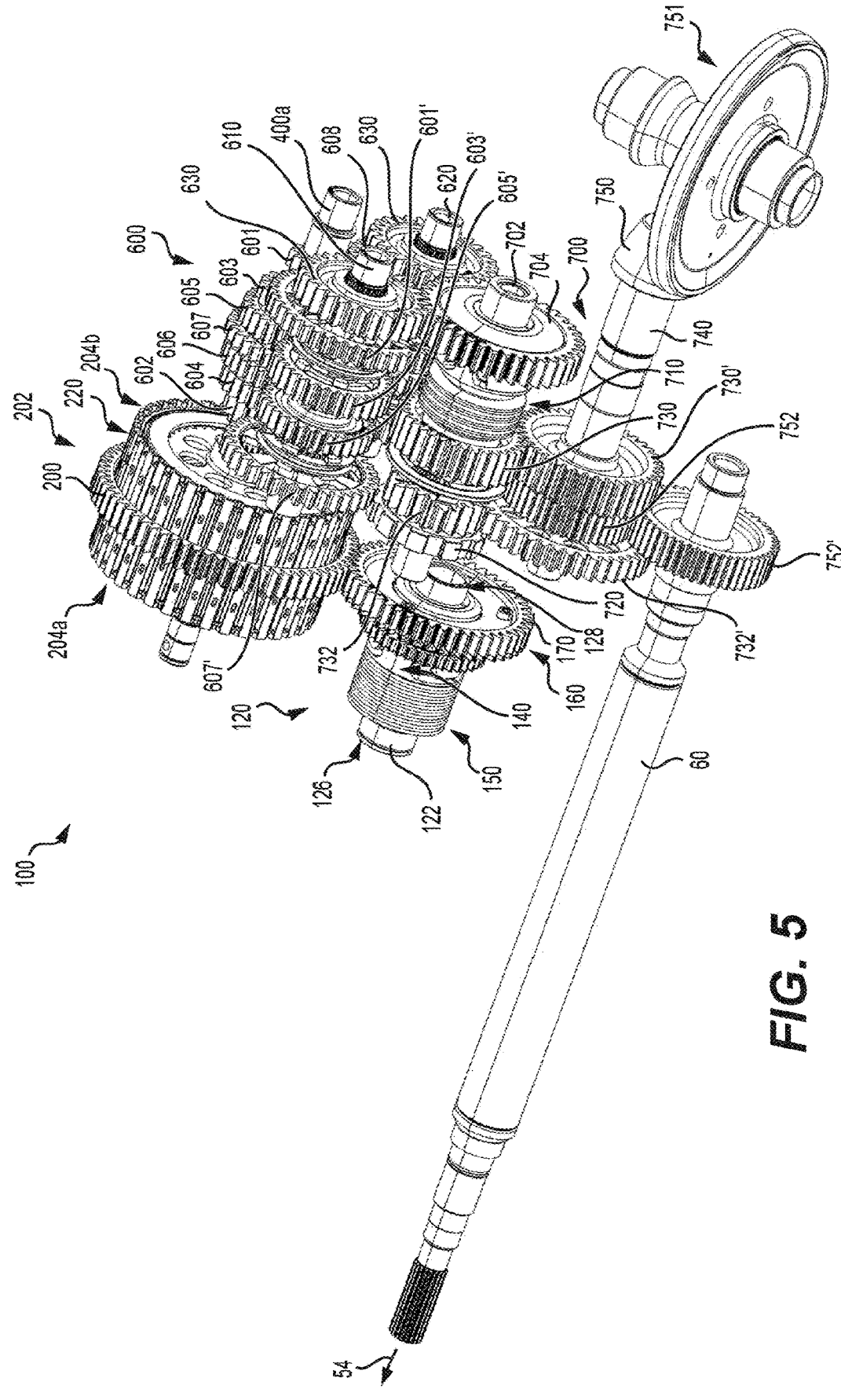
FIG. 5 is a perspective view taken from a top, rear, left side of the dual-clutch transmission and front propeller shaft of FIG. 4.
Figure 6:
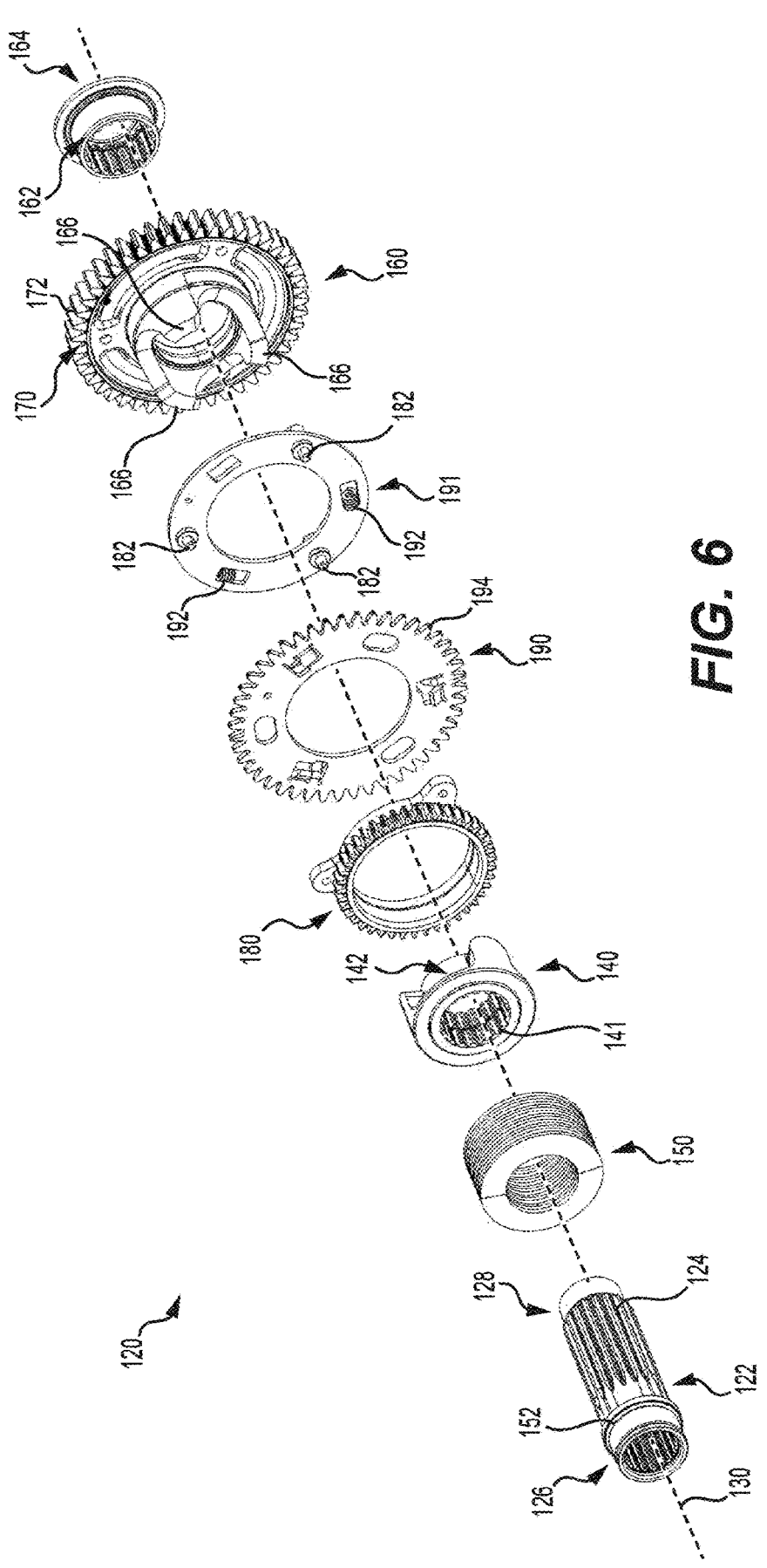
FIG. 6 is an exploded, perspective view taken from a top, front, left side of an input damper of the dual-clutch transmission of FIG. 3A.
Figure 8:
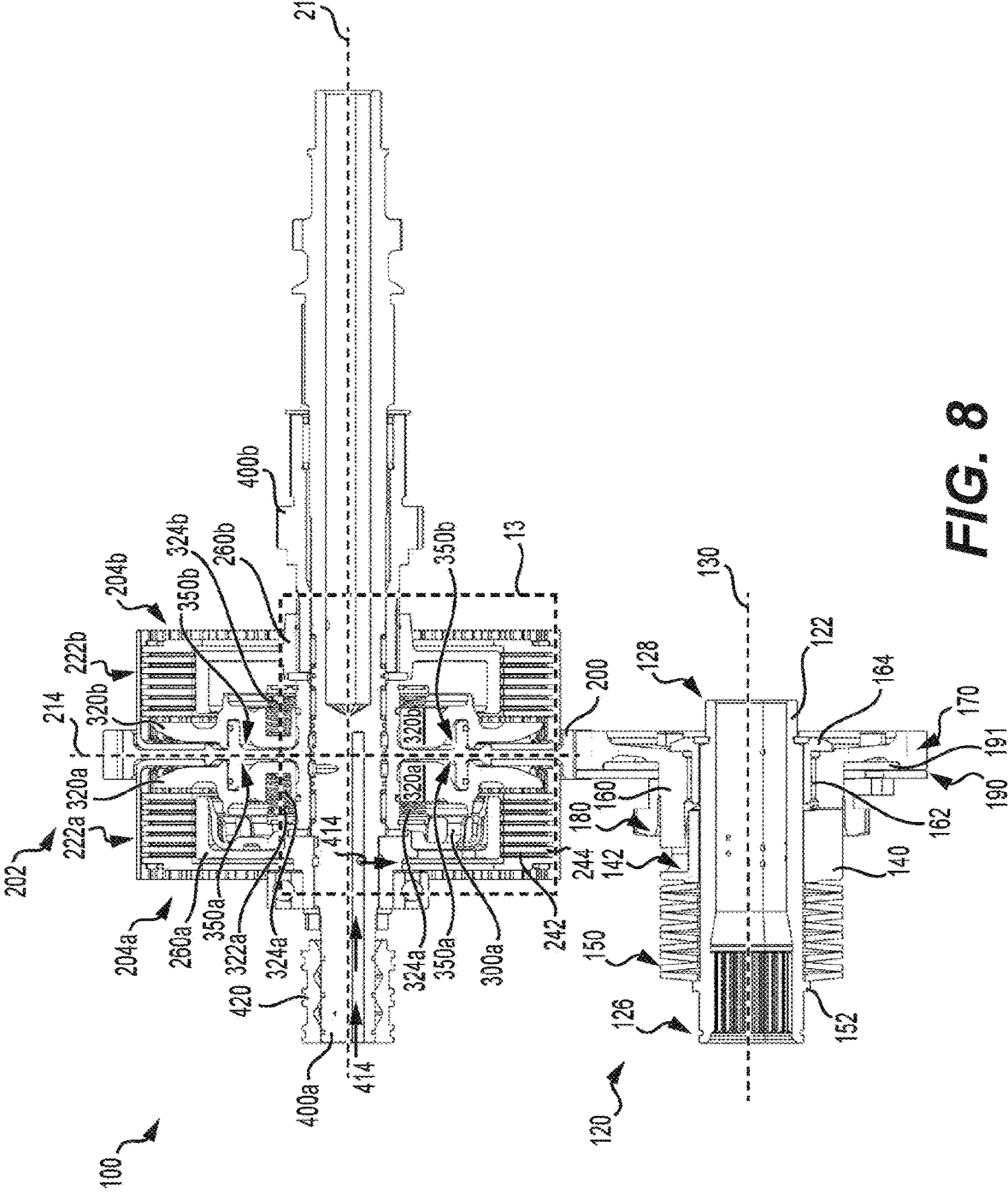
FIG. 8 is a longitudinal cross-sectional view of the dual-clutch and the input damper of the dual-clutch transmission of FIG. 3A.
Figure 33:
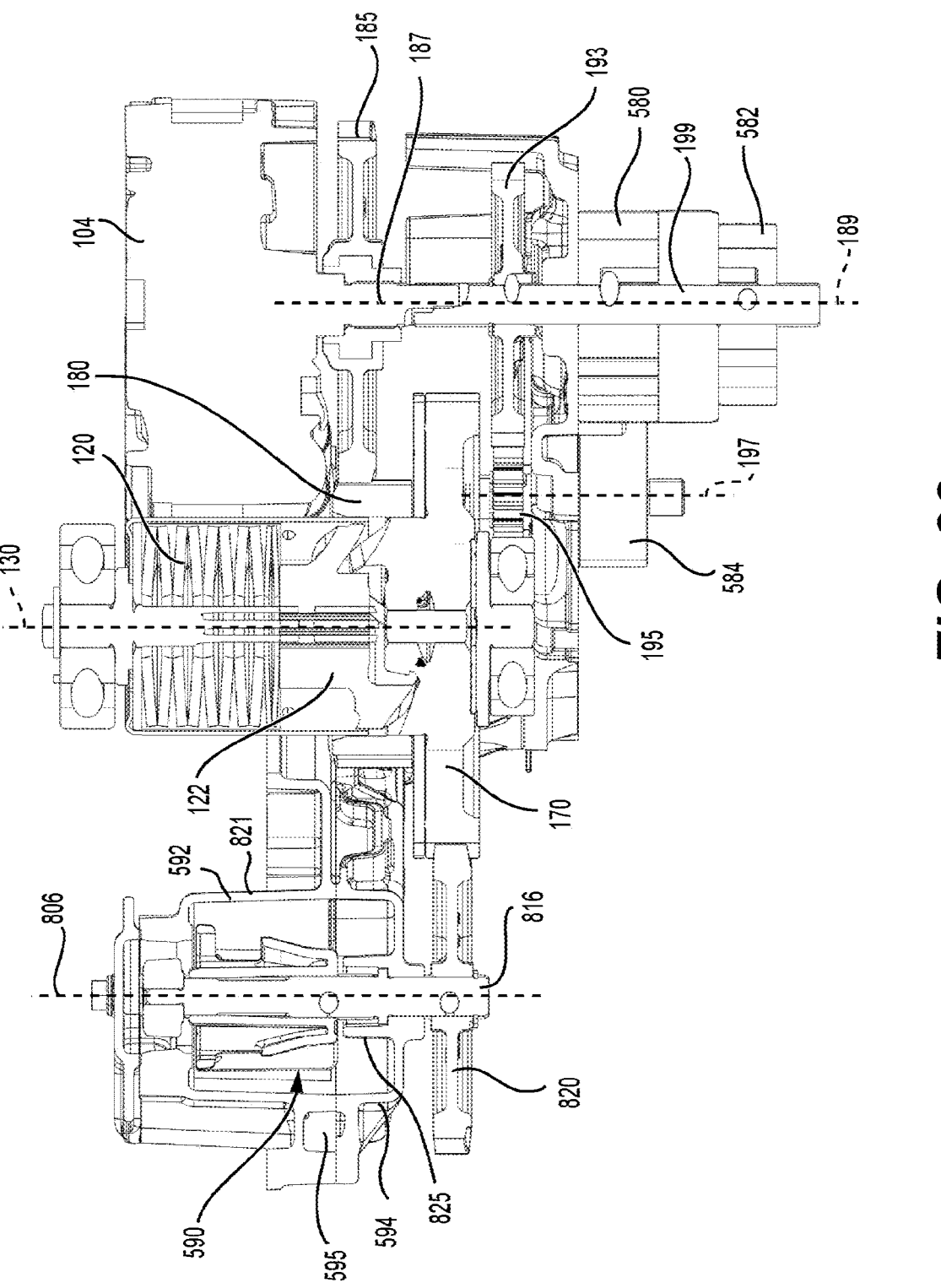
FIG. 33 is a cross-sectional view of the part of the dual-clutch transmission of FIG. 23B taken along line 33-33 in FIG. 23B, with some components removed for clarity.

Referring to FIGS. 4 to 6, the DCT 100 includes an input damper 120 adapted to reduce the torque variations from the crankshaft 53 to the DCT 100. The input damper 120 has a hollow shaft 122 defining splines 124 for connection to the crankshaft 53 (as can be understood from FIG. 3A). The hollow shaft 122 may also be referred to as an "input" shaft 122 given that it is the shaft of the DCT 100 which is connected to and receives the torque input from the crankshaft 53. The input shaft 122 has a front end 126 and a rear end 128 defined consistently with the forward travel direction of the vehicle 20 (FIGS. 6 and 8). The input shaft 122 also defines an input damper axis 130 about which the input shaft 122 rotates. An input member 140 is slidably engaged to the input shaft 122 and positioned between the front and rear ends 126, 128. The input member 140 has splines 141 complementary to splines 124, and the input member 140 can slide axially along the input damper axis 130 between the front and rear ends 126, 128. The input member 140 defines three recesses 142 angularly displaced by about 120 degrees relative to the input damper axis 130. A disc spring assembly 150 is connected to the input shaft 122 and extends between the front and rear ends 126, 128. The disc spring assembly 150 abuts a shoulder 152 of the input shaft 122 and biases the input member 140 axially along the input damper axis 130 towards the rear end 128 of the input shaft 122. An output member 160 is disposed over the input shaft 122 and positioned between the input member 140 and the rear end 128 of the input shaft 122. The output member 160 is supported by bearings 162 disposed between the output member 160 and a connector 164 disposed adjacent the rear end 128 of the input shaft 122. The connector 164 retains the output member 160 on the input shaft 122. The output member 160 defines three cams 166 also angularly displaced by about 120 degrees relative to the input damper axis 130 (FIG. 6). The three cams 166 are structured and configured for engaging the corresponding three recesses 142 of the input member 140 when the input member 140 is biased towards the rear end 128 of the input shaft 122. An output gear 170 is connected to the output member 160, and also rotates about the input damper axis 130. The output gear 170 has a plurality of teeth 172. A pump gear 180 is connected to the output gear 170 via three fasteners 182, and extends between the output gear 170 and the disc spring assembly 150. The pump gear 180 also rotates about the input damper axis 130. The pump gear 180 is adapted to drive the primary pump 104 (FIG. 3A) by meshing with and driving a primary pump gear 185 (FIG. 33). An auxiliary output gear 190 is connected to the output gear 170 via a ring 191 having coil spring assemblies 192. The auxiliary output gear 190 is biased by the coil spring assemblies 192 and has a plurality of teeth 194. In the present implementation, the number of teeth 172 of the output gear 170 matches the number of teeth 194 of the auxiliary output gear 190. The coil spring assemblies 192 permits angular displacements of the auxiliary output gear 190 about the input damper axis 130 relative to the output gear 170. The auxiliary output gear 190 provides preload on the teeth 172 of the output gear 170 and reduces backlash that can occur between the output gear 170 and a central clutch gear 200 described below. The output gear 170 may also be referred to as a "primary gear".

Figure 7:
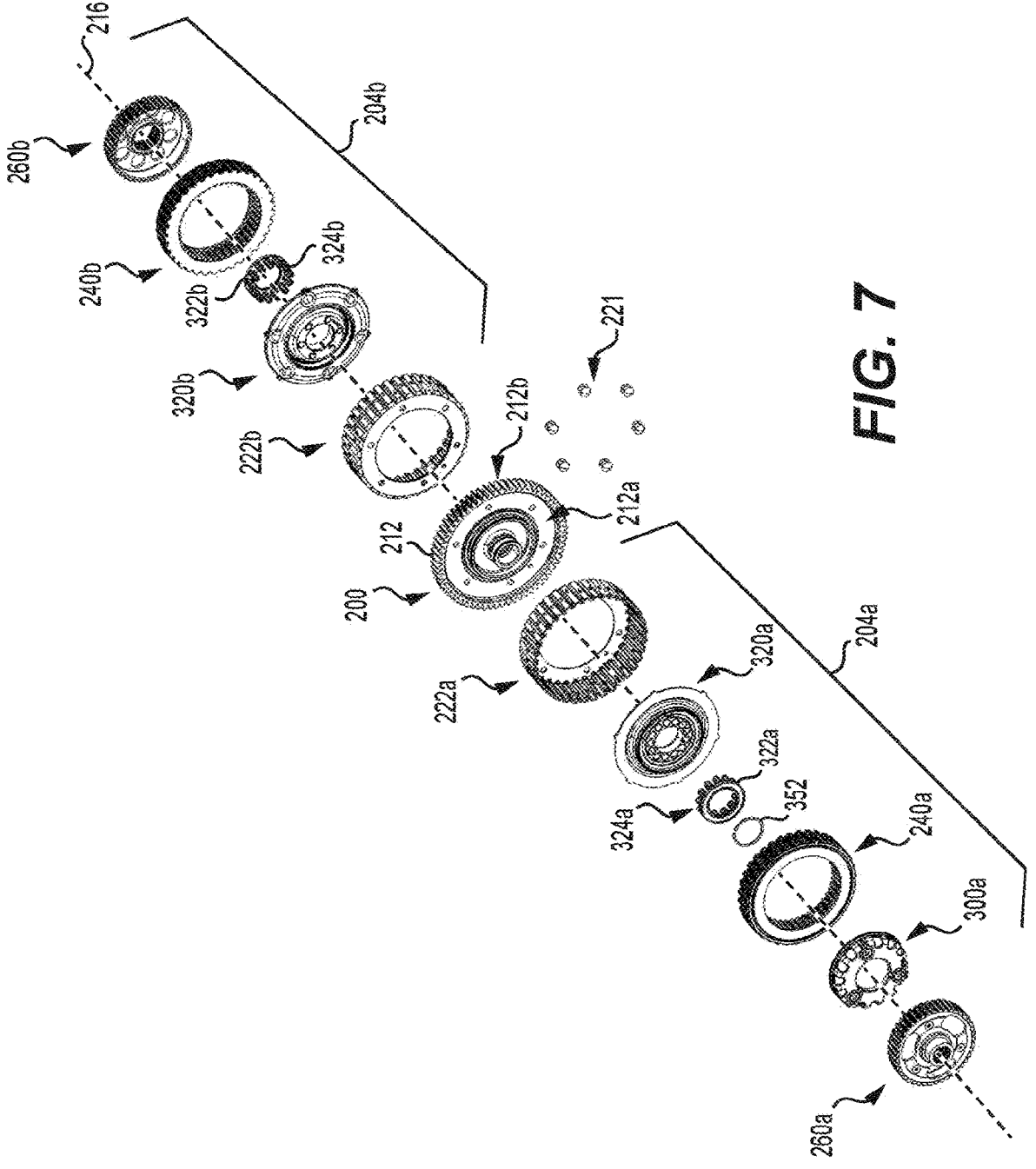
FIG. 7 is an exploded, perspective view taken from a top, front, left side of a dual-clutch of the dual-clutch transmission of FIG. 3A.
Figure 9:
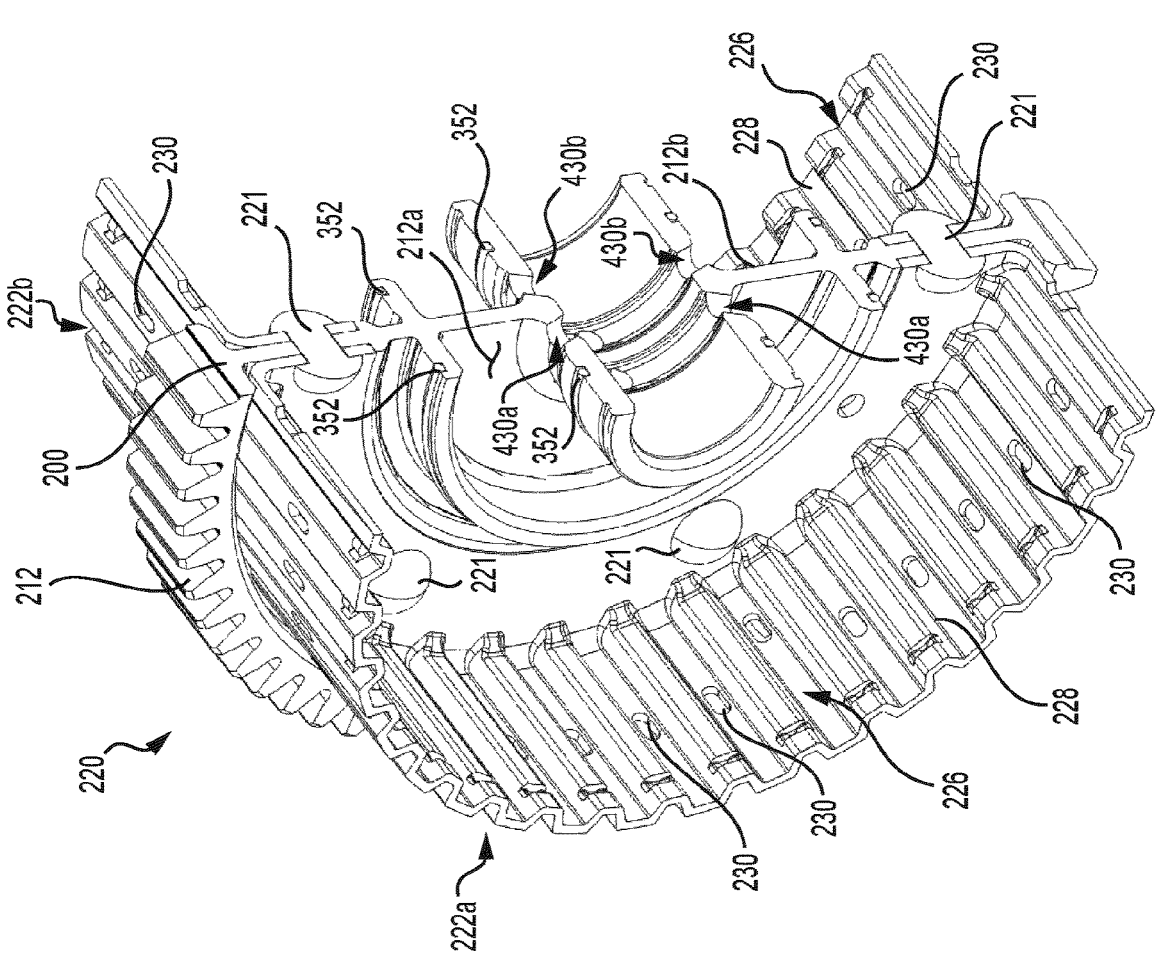
FIG. 9 is a perspective, longitudinal cross-sectional view of the clutch pack drum and the central clutch gear of the dual-clutch of FIG. 7.

Referring to FIGS. 4 to 8, the DCT 100 includes a dual-clutch 202 having first and second clutches 204*a*, 204*b*. Before describing in details the first and second clutches 204*a*, 204*b*, components of the dual clutch 202 will be described. The dual clutch 202 includes a clutch pack drum 220 that is adapted to rotate inside the housing 102, and the central clutch gear 200 is connected to the clutch pack drum 220 via fasteners 221 (FIGS. 7 and 9). The central clutch gear 200 has teeth 212 adapted to mesh with the teeth 172, 194 of the output gear 170 and the auxiliary output gear 190. The central clutch gear 200 is thus operatively connected to the crankshaft 53 of the internal combustion engine 52 via the input damper 120. It is to be noted that having the input damper 120 located outside the clutch pack drum 220 offers more flexibility to package the DCT 100 in the rear portion of the frame 22 of the vehicle 20 supporting the engine 52 and the DCT 100. Thus, having the input damper 120 located outside the clutch pack drum 220 improves the overall packaging of the DCT 100 in the rear portion of the vehicle 20. Moreover, having the input damper 120 located outside the clutch pack drum 220 allows for a greater angle of relative rotation between the input member 140 and the output member 160 compared to an input damper that would be integrated in the clutch pack drum 220. The greater angle of relative rotation between the input member 140 and the output member 160 improves the damping provided by the input damper 120.

Referring to FIGS. 7 and 9, the central clutch gear 200 has a front face 212*a* and a rear face 212*b*. The central clutch gear 200 defines a clutch gear plane 214 and a clutch gear rotation axis 216 normal to the clutch gear plane 214 (FIG. 8). It is to be appreciated that the clutch gear rotation axis 216 is parallel to the input damper axis 130, and extends above and to the right of the input damper axis 130 (FIG. 4).

Referring to FIGS. 7 to 9, the clutch pack drum 220 includes a front clutch pack basket 222*a* disposed in front of the central clutch gear 200, and a rear clutch pack basket 222*b* disposed behind the central clutch gear 200. The front and rear clutch pack baskets 222*a*, 222*b* are interconnected using the fasteners 221 extending through the central clutch gear 200. The front and rear clutch pack baskets 222*a*, 222*b* are identical. In some implementations, the front and rear clutch pack baskets 222*a*, 222*b* are symmetrical about the clutch gear plane 214. The front and rear clutch pack baskets 222*a*, 222*b* could be structured otherwise in other implementations. Having the front and rear clutch pack baskets 222*a*, 222*b* identical, or symmetrical about the clutch gear plane 214, assists in reducing the manufacturing costs of the DCT 100. The front and rear clutch pack baskets 222*a*, 222*b* each have a cylindrical wall 226 defining splines 228 and a plurality of holes 230.

Turning now to FIGS. 7 to 13C, the first clutch 204*a* will be described in details first. The operation of the first and second clutches 204*a*, 204*b*, and the flow of fluid through the DCT 100 will be described further below. A front clutch pack 240*a* is received in the clutch pack basket 222*a* and is disposed in front of the central clutch gear 200. The clutch pack 240*a* includes a plurality of clutch plates 242 having teeth 244 extending away from the clutch gear rotation axis 216 and engaging the splines 228 of the clutch pack basket 222*a* for rotating with the clutch pack drum 220 (FIG. 13A). The clutch plates 242 are movable axially in a direction 246 (see double arrow 246 in FIGS. 13A to 13C) defined by the clutch gear rotation axis 216. The clutch plates 242 have disc surfaces including relatively low friction material. The front clutch pack 240*a* further includes a plurality of clutch disks 250 disposed alternatingly with the clutch plates 242 in the direction 246 (FIG. 13A). The clutch disks 250 have disc surfaces including a relatively high friction material. The clutch disks 250 have teeth 254 extending towards the clutch gear rotation axis 216. The clutch disks 250 are also movable axially in the direction 246 defined by the clutch gear rotation axis 216. As will become apparent from the description below, when the clutch disks 250 are selectively engaged by the clutch plates 242, the clutch disks 250 rotate with the clutch pack drum 220.

Figure 10:
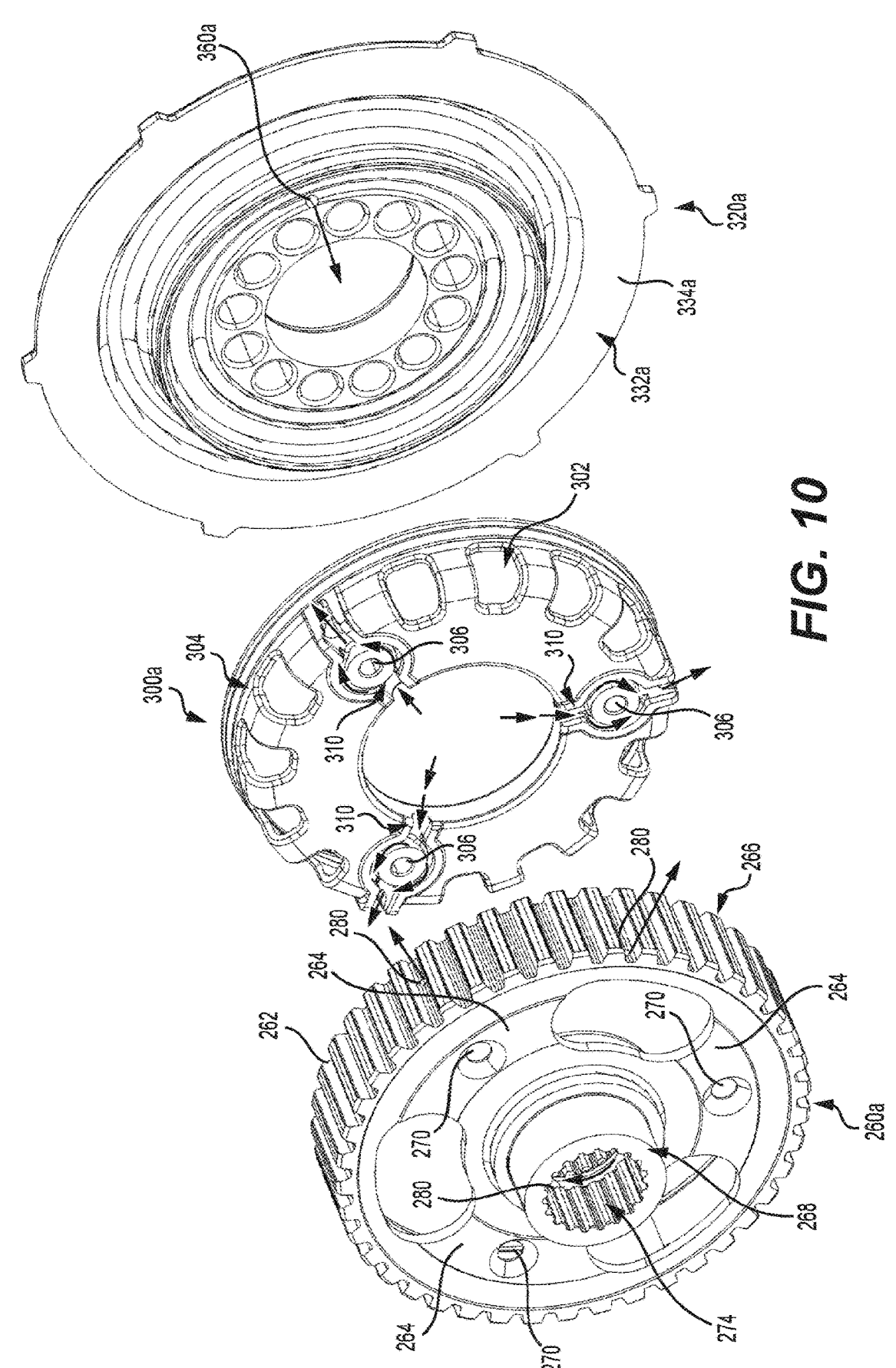
FIG. 10 is an exploded, perspective view taken from a top, front, left side of the front clutch hub, front lubrication cover and front pressure plate of the dual-clutch of FIG. 7.
Figure 11:
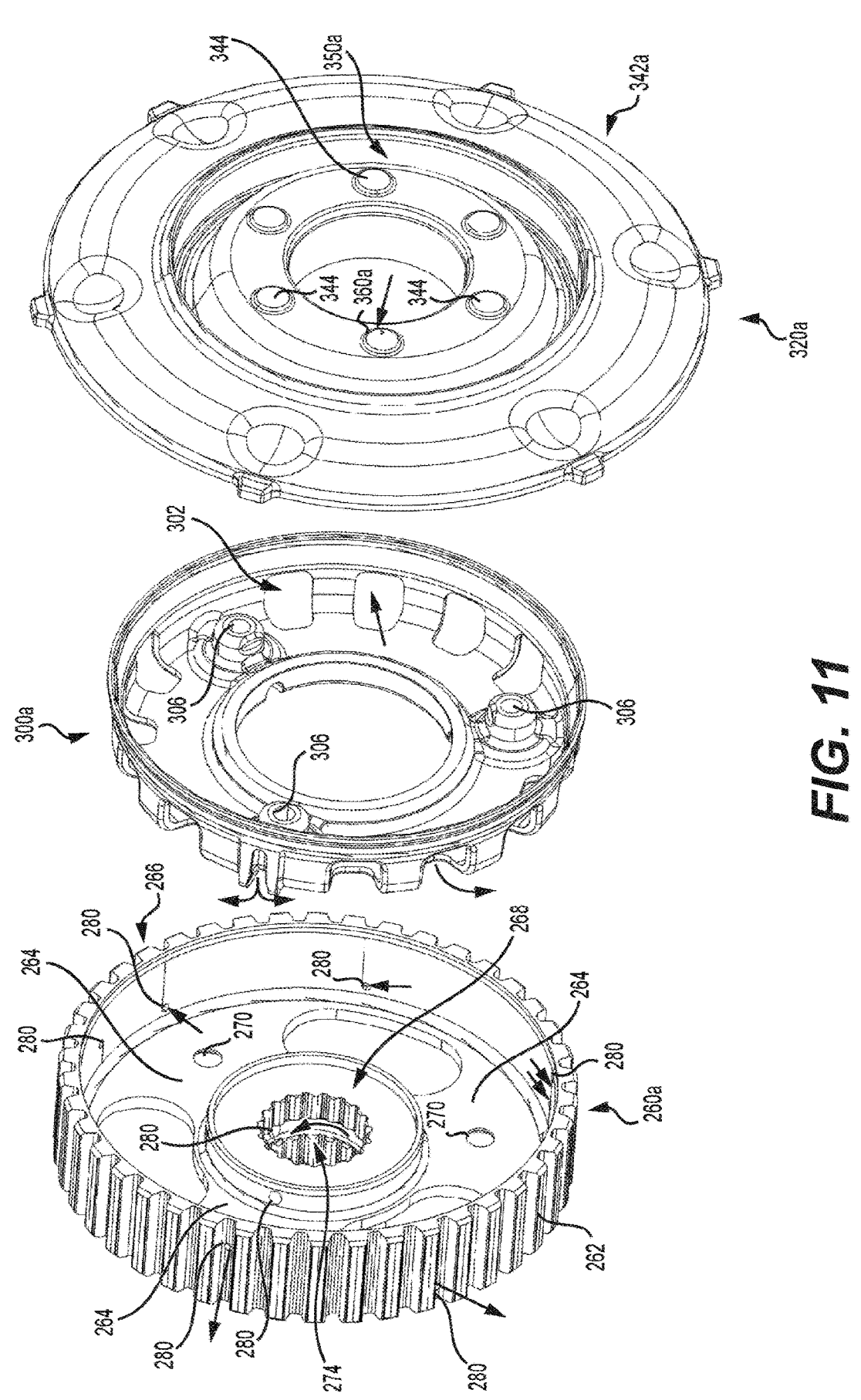
FIG. 11 is an exploded, perspective view taken from a rear, left side of the front clutch hub, front lubrication cover and front pressure plate of the dual-clutch of FIG. 7.
Figure 13A:
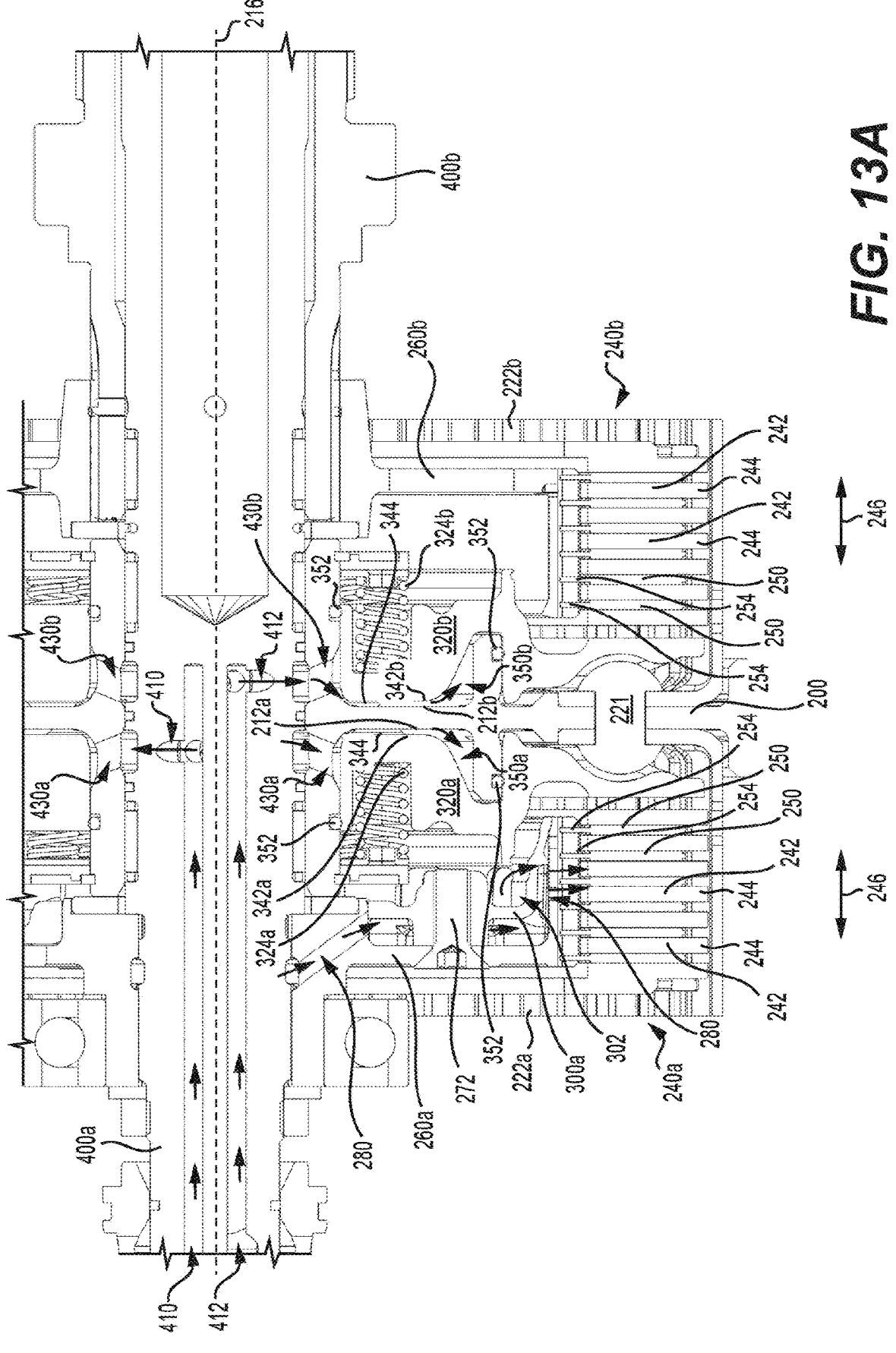
FIG. 13A is a close-up view of portion 13 of FIG. 8, with the front and rear pressure plates abutting the central clutch gear of the dual-clutch of FIG. 7.

Referring to FIGS. 7, 10 and 11, a front clutch hub 260*a* is received in the clutch pack 240*a* and is disposed in front of the central clutch gear 200. The clutch hub 260*a* defines splines 262 structured to engage with the teeth 254 of the clutch disks 250 of the clutch pack 240*a*. The clutch disks 250 are movable axially relative to the clutch hub 260*a* in the direction 246 defined by the clutch gear rotation axis 216 as the teeth 254 slide axially in the splines 262. When the clutch disks 250 are selectively engaged by the clutch plates 242, the clutch hub 260*a* rotates with the clutch pack drum 220. The clutch hub 260*a* has three arms 264 connecting a rim portion 266 of the clutch hub 260*a* (defining the splines 262) to a central portion 268 of the clutch hub 260*a*. Holes 270 are defined in each of the arms 264 for receiving fasteners 272 (FIG. 13A). The central portion 268 defines splines 274. Referring to FIGS. 10, 11 and 13A, a plurality of bores 280 are defined in the central portion 268, in the arms 264 and in the rim portion 266. The bores 280 are adapted for allowing flow of fluid therethrough, as will become apparent from the following description.

Referring to FIGS. 10 and 11, a lubrication cover 300*a* is also received in the clutch pack 240*a*. The lubrication cover 300*a* is disposed in front of the central clutch gear 200 and behind the front clutch hub 260*a*. The lubrication cover 300*a* defines a plurality of apertures 302 on a rim portion 304 thereof. Three threaded holes 306 are defined in the lubrication cover 300*a* for receiving the fasteners 272. When the fasteners 272 extend through the holes 270 of the clutch hub 260*a* and are engaged in the threaded holes 306 of the lubrication cover 300*a*, the lubrication cover 300*a* and the clutch hub 260*a* are interconnected. Passages 310 are defined in the lubrication cover 300*a* and extend around each one of the threaded holes 306. The passages 310 are adapted for allowing flow of fluid therethrough, as will become apparent from the following description.

Referring to FIGS. 7, 10, 11 and 13A, the DCT 100 further includes a pressure plate 320*a* disposed in front of the central clutch gear 200. The pressure plate 320*a* is disposed between the central clutch gear 200 and the lubrication cover 300*a*. A ring 322*a* is connected to the central clutch gear 200, and coil spring assemblies 324*a* interconnect the pressure plate 320*a* to the central clutch gear 200. The pressure plate 320*a* rotates with the central clutch gear 200, and is movable axially in the direction 246 upon compression and extension of the coil spring assemblies 324*a*. The pressure plate 320*a* has a front face 332*a* (FIG.

Figure 13B:
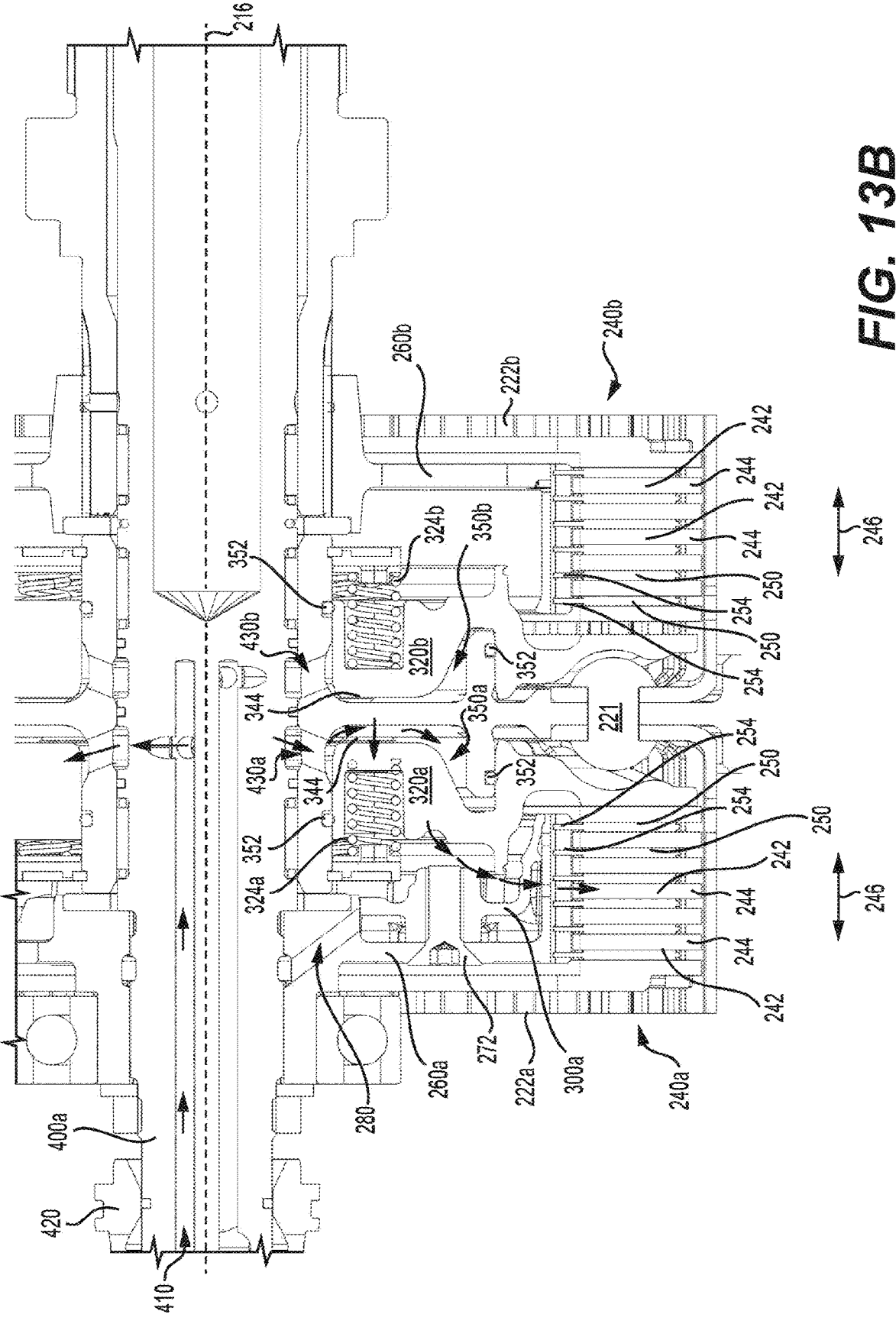
FIG. 13B is a close-up view of portion 13 of FIG. 8, with the front pressure plate being moved axially away from the central clutch gear of the dual-clutch of FIG. 7, and with the rear pressure plate abutting the central clutch gear.
Figure 13C:
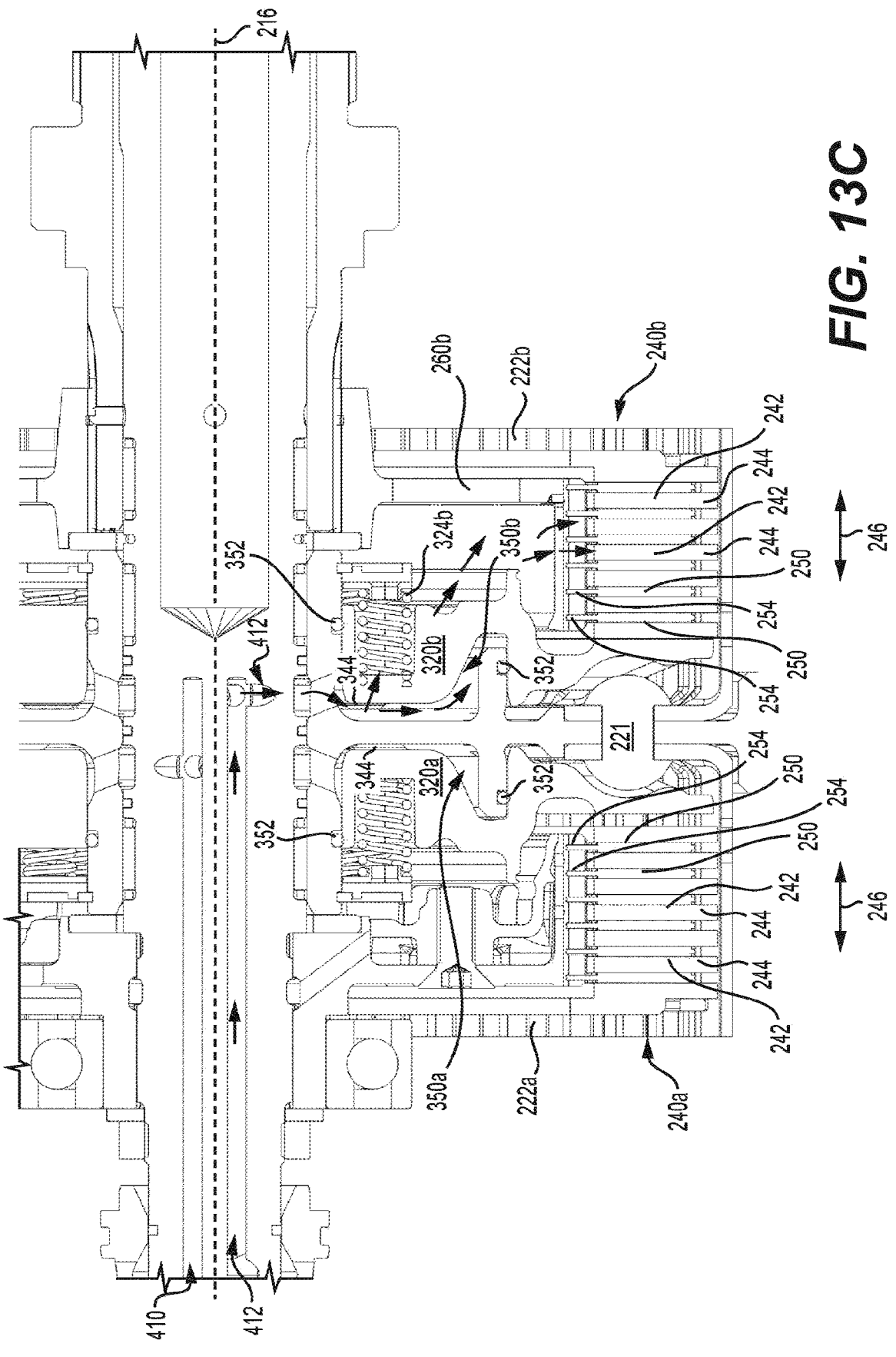
FIG. 13C is a close-up view of portion 13 of FIG. 8, with the rear pressure plate being moved axially away from the central clutch gear of the dual-clutch of FIG. 7, and with the front pressure plate abutting the central clutch gear.

10) including a rim portion 334a. The rim portion 334a of the pressure plate 320a is structured to selectively engage the clutch plate 242 that is closest to the central clutch gear 200. The pressure plate 320a further has a rear face 342a (FIG. 11) where six pads 344 project therefrom. The pads 344 are structured for abutting the front face 212a of the central clutch gear 200 and to leave a spacing between the front face 212a of the central clutch gear 200 and the rear face 342a of the pressure plate 320a (the spacing is shown in FIG. 13A). Referring to FIGS. 13A to 13C, a chamber 350a is defined between the front face 212a of the central clutch gear 200 and the rear face 342a of the pressure plate 320a. Seals 352 are disposed between the pressure plate 320a and the central clutch gear 200 to prevent fluid from escaping the chamber 350a through the regions where the seals 352 extend. The pressure plate 320a further defines a pressure plate passage 360a extending between the front face 332a and the rear face 342a. More particularly, the pressure plate passage 360a starts on the rear face 342a from one of the pads 344 (FIG. 11). The pressure plate passage 360a is adapted for allowing flow of fluid therethrough, as will become apparent from the following description.

Figure 14:
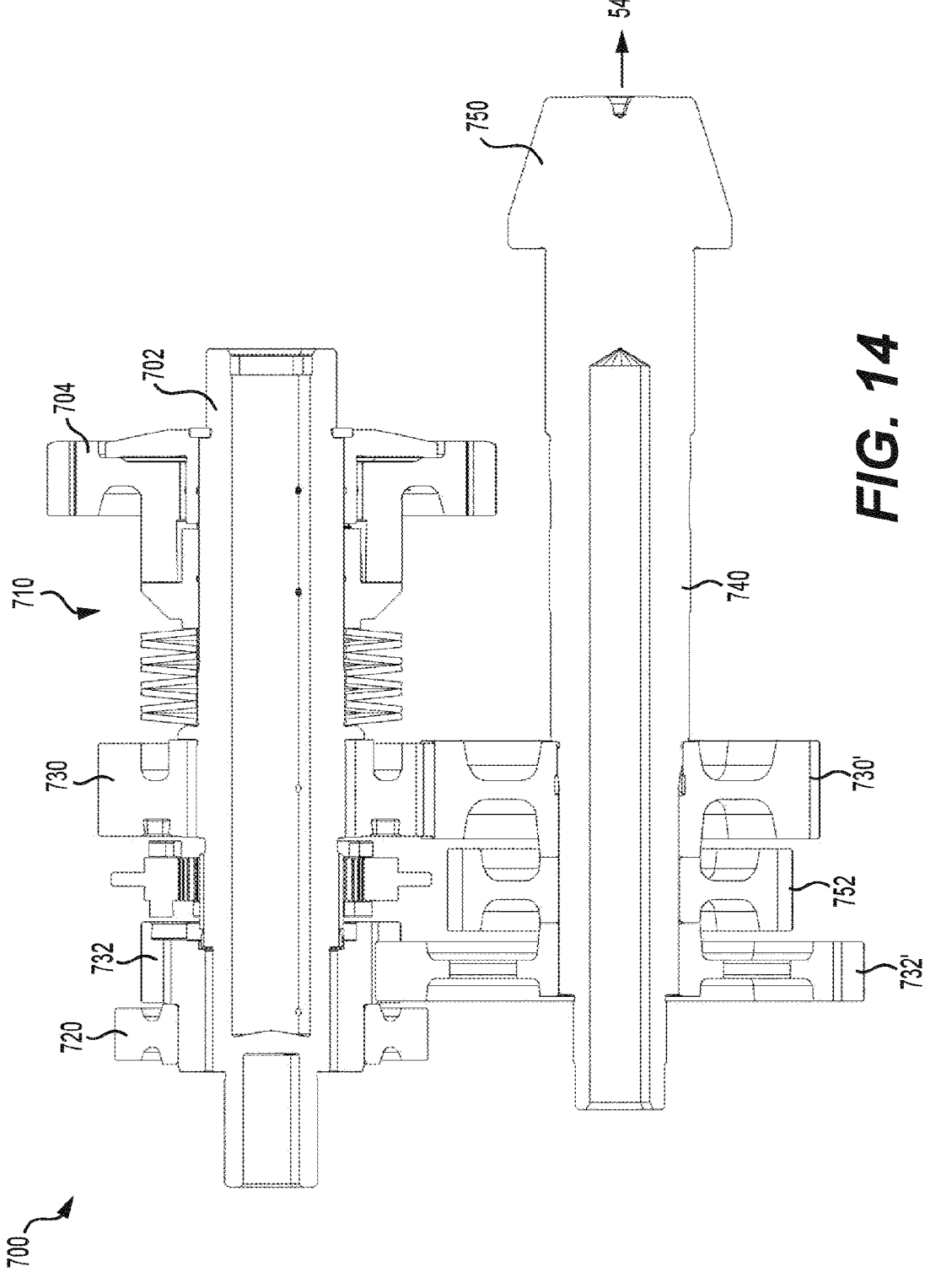
FIG. 14 is a longitudinal cross-sectional view of a sub-transmission of the dual-clutch transmission of FIG. 3A.

Referring to FIGS. 4, 8, and 13A, a shaft 400a is connected to the front clutch hub 260a via teeth (not shown) engaging the splines 274 of central portion 268. The shaft 400a is coaxial with the clutch gear rotation axis 216. The shaft 400a defines three passages 410, 412 (FIG. 13A), and 414 (FIG. 8) adapted for flowing fluid therethrough. A manifold 420 (FIG. 8) is connected to the front portion of the shaft 400a. The manifold 420 fluidly connects the primary pump 104 to the passages 410, 412, 414. Three plugs (not shown) seal the ends of the passages 410, 412, 414 defined in the front portion of the shaft 400a (FIG. 4). Referring to FIGS. 4, 5 and 14, a plurality of transmission gears 600 are operatively connected to the shaft 400a. The transmission gears 600 include the gears corresponding to the first gear 601, third gear 603, fifth gear 605, and seventh gear 607 of the DCT 100. The transmission gears 600 are all disposed behind the central clutch gear 200.

Arrows show the flow of fluid through the dual-clutch 202 in FIGS. 10, 11, 13A and 13B when the dual-clutch 202 rotates. When fluid is selectively supplied in the passage 410 from the primary pump 104, fluid flows through the shaft 400a in the passage 410 (FIG. 13A), through passages 430a defined in the central clutch gear 200 (FIGS. 9 and 13A) and into the chamber 350a. Since the pads 344 abut the front face 212a of the central clutch gear 200, fluid flows through the spacing between the pressure plate 320a and the central clutch gear 200, and fills the chamber 350a. The pads 344 are thus structured for selectively allowing flow of fluid from the passage 410 to the chamber 350a. When the fluid is selectively supplied with sufficient pressure by the primary pump 104, the pressurized fluid in the chamber 350a overcomes the biasing force of the coil spring assemblies 324a and moves the pressure plate 320a axially away from the central clutch gear 200 (i.e. forward of the central clutch gear 200), as shown between FIGS. 13A and 13B. The pressure plate 320a selectively squeezes the clutch plates 242 and the clutch disks 250 together for engaging the clutch plates 242 with the clutch disks 250. The front clutch hub 260a and the lubrication cover 300a are thus rotatable with the clutch pack drum 220 and the central clutch gear 200, and the shaft 400a drives the transmission gears 600 corresponding to the first gear 601, third gear 603, fifth gear 605 and seventh gear 607 of the DCT 100.

Referring to FIG. 13B, as some of the fluid escapes the chamber 350a through the pressure plate passage 360a (as shown by the arrows in FIG. 13B), fluid flows in the front clutch pack 240a and lubricates and cools the clutch plates 242, the clutch disks 250, and the clutch pack basket 222a, as shown by arrows in FIG. 13B. Fluid flows through the holes 230 of the clutch pack basket 222a, is collected in the housing 102 and is returned to the primary pump 104 for recirculation in the DCT 100. It is thus to be understood that in order for the pressure plate 320a to selectively squeeze the clutch pack 240a, pressurized fluid is continuously supplied in the chamber 350a by the primary pump 104.

Referring to FIG. 13A, when fluid is selectively supplied in the passage 414 (FIG. 8) and as the first clutch 204a rotates, fluid flows through the shaft 400a, through the bores 280 defined in the central portion 268, in the arms 264 and in the rim portion 266 of the front clutch hub 260a, and through the aperture 302 and passages 310 defined in the lubrication cover 300a, and on to the front clutch pack 240a, as shown by arrows in FIG. 13A. The fluid flowing through the passage 414 provides additional lubrication and cooling to the clutch plates 242, the clutch disks 250, and the clutch pack basket 222a of the first clutch 204a. Since the first clutch 204a is operatively connected to the transmission gear 600 corresponding to the first gear 601 of the DCT 100, which can have a heavy usage, for example, when the vehicle 20 launches repetitively, additional lubrication and cooling to the first clutch 204a provided by fluid flowing through the passage 414 and the bore 280 is advantageous under certain conditions.

Figure 12:
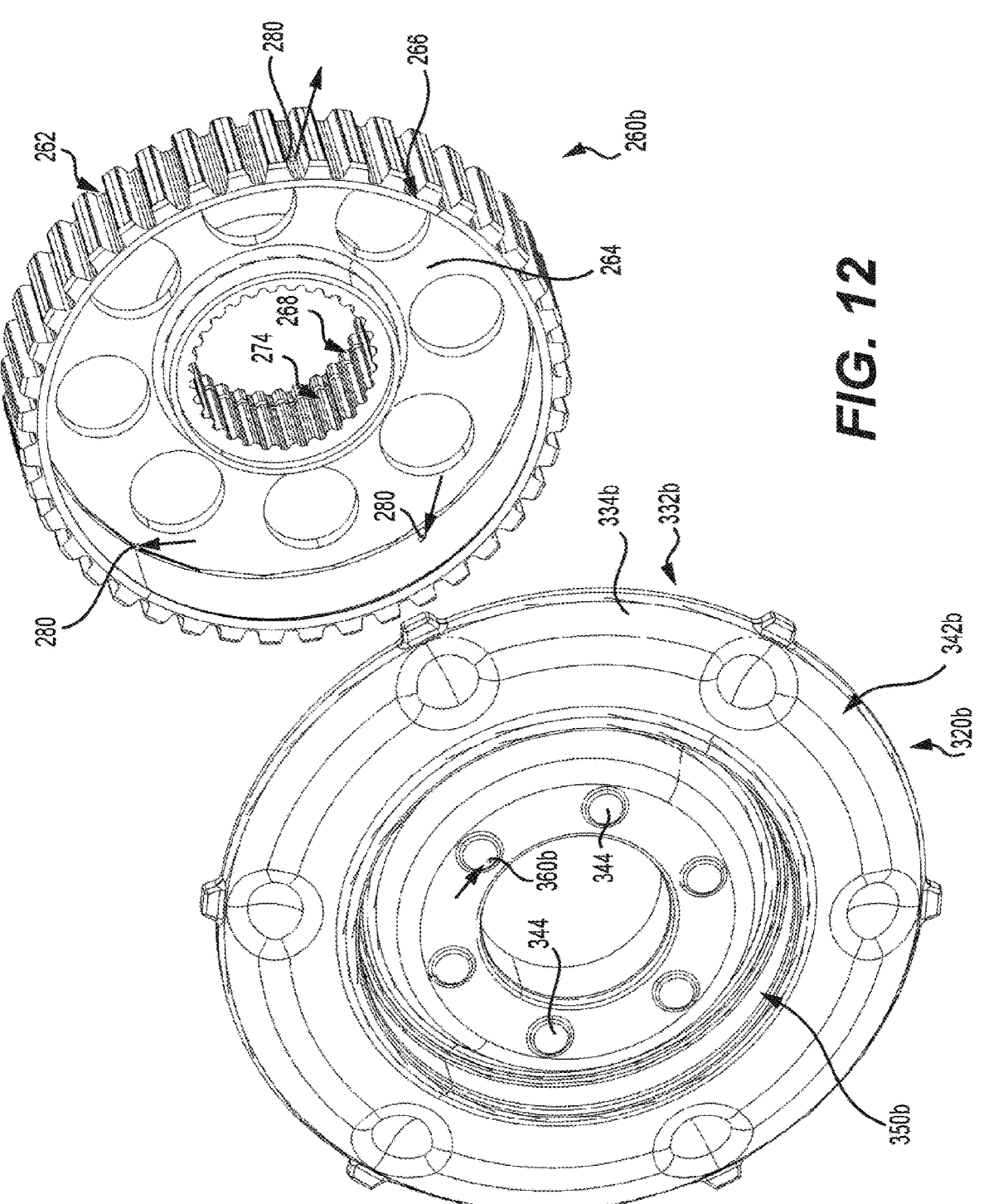
FIG. 12 is an exploded, perspective view taken from a top, front, left side of the rear pressure plate and rear clutch hub of the dual-clutch of FIG. 7.

Referring to FIGS. 7, 8 and 12, the second clutch 204b will now be described. A rear clutch pack 240b is received in the clutch pack basket 222b and is disposed behind the central clutch gear 200. The rear clutch pack 240b also includes a plurality of clutch plates 242 having teeth 244 extending away from the clutch gear rotation axis 216 and engaging the splines 228 of the clutch pack basket 222b for rotating with the clutch pack drum 220 (FIGS. 13A to 13C). In the present implementations, the front and rear clutch packs 240a, 240b are identical, but they could be structured otherwise in other implementations. This feature assists in reducing the manufacturing costs of the DCT 100. The clutch plates 242 have disc surfaces including a relatively low friction material. The rear clutch pack 240b further includes a plurality of clutch disks 250 disposed alternatingly with the clutch plates 242 in the direction 246 (FIG. 13A). The clutch disks 250 have disc surfaces including a relatively high friction material. The clutch disks 250 have teeth 254 extending towards the clutch gear rotation axis 216 (FIGS. 13A to 13C). The clutch disks 250 are also movable axially in the direction 246 defined by the clutch gear rotation axis 216.

Referring to FIGS. 7 and 12, a rear clutch hub 260b is received in the clutch pack 240b and is disposed behind the central clutch gear 200. The clutch hub 260b also defines splines 262 structured to engage with the teeth 254 of the clutch disks 250 of the clutch pack 240b. The clutch disks 250 are movable axially relative to the clutch hub 260b in the direction 246 (FIGS. 13A to 13C). When the clutch disks 250 are selectively engaged by the clutch plates 242, the clutch hub 260b rotates with the clutch pack drum 220. The clutch hub 260b has eight arms 264 connecting a rim portion 266 of the clutch hub 260b to the central portion 268 of the clutch hub 260b. The central portion 268 defines splines 274. Referring to FIG. 12, a plurality of bores 280 are also defined in the central portion 268, in the arms 264 and in the rim portion 266 of the clutch hub 260b. The bores 280 are adapted for allowing flow of fluid therethrough, as will become apparent from the following description.

Referring to FIGS. 7 and 12, the DCT 100 further includes a pressure plate 320*b* disposed behind the central clutch gear 200. The pressure plate 320*b* is disposed between the central clutch gear 200 and the clutch hub 260*b*. A ring 322*b* (FIG. 7) is connected to the central clutch gear 200, and coil spring assemblies 324*b* interconnect the pressure plate 320*b* to the central clutch gear 200. It is to be noted that the rings 322*a*, 322*b* are identical, and that the spring assemblies 324*a*, 324*b* are identical. These features assist in reducing the manufacturing costs of the DCT 100. The pressure plate 320*b* rotates with the central clutch gear 200, and is movable axially in the direction 246 upon compression and extension of the coil spring assemblies 324*b*. The pressure plate 320*b* has a rear face 332*b* including a rim portion 334*b*. The rim portion 334*b* of the pressure plate 320*a* is structured to selectively engage the clutch plate 242 of the rear clutch pack 240*b* that is closest to the central clutch gear 200. The pressure plate 320*b* further has a front face 342*b* where six pads 344 project therefrom. The pads 344 are structured for abutting the rear face 212*b* of the central clutch gear 200 and to leave a spacing defined between the rear face 212*b* of the central clutch gear 200 and the front face 342*b* of the pressure plate 320*b* (FIG. 13A). A chamber 350*b* is defined between the rear face 212*b* of the central clutch gear 200 and the front face 342*b* of the pressure plate 320*b*. Seals 352 are also disposed between the pressure plate 320*b* and the central clutch gear 200 to prevent fluid from escaping the chamber 350*b* through the regions where the seals 352 extend. The pressure plate 320*b* further defines a pressure plate passage 360*b* (FIG. 12) extending between the rear face 332*b* and the front face 342*b*. More particularly, the pressure plate passage 360*b* starts on the front face 342*b* from one of the pads 344. The pressure plate passage 360*b* is adapted for allowing flow of fluid therethrough, as will become apparent from the following description.

It is to be appreciated that in the illustrated implementation, the pressure plates 320*a*. 320*b* are identical. In some implementations, the pressure plates 320*a*, 320*b* are symmetrical about the clutch gear plane 214. These features assist in reducing the manufacturing costs of the DCT 100. Furthermore, there is no component similar to the lubrication cover 300*a* in the second clutch 204*b*.

Referring to FIGS. 13A to 13C, arrows show the flow of fluid through the dual-clutch 202 when the dual-clutch 202 rotates and fluid is selectively supplied in the passages 410, 412, 414. When fluid is selectively supplied in the passage 412 of the shaft 400*a*, fluid flows through the shaft 400*a* in the passage 412 (FIGS. 13A and 13C), through passages 430*b* defined in the central clutch gear 200 (FIG. 9) and into the chamber 350*b*. Since the pads 344 abut the rear face 212*b* of the central clutch gear 200, fluid flows through the spacing between the pressure plate 320*b* and the central clutch gear 200, and fills the chamber 350*b*. The pads 344 are thus structured for selectively allowing flow of fluid from the passage 412 to the chamber 350*b*. When the fluid is selectively supplied with sufficient pressure, the pressurized fluid in the chamber 350*b* overcomes the biasing force of the coil spring assemblies 324*b* and moves the pressure plate 320*b* axially away from the central clutch gear 200 (i.e. rearward of the central clutch gear 200), as shown between FIGS. 13A and 13C. The pressure plate 320*b* selectively squeezes the clutch plates 242 and the clutch disks 250 together for engaging the clutch plates 242 with the clutch disks 250. The rear clutch hub 260*b* is thus rotatable with the clutch pack drum 220 and the central clutch gear 200. As some of the fluid escapes the chamber 350*b* through the pressure plate passage 360*b*, fluid flows in the rear clutch pack 240*b* and lubricates and cools the clutch plates 242, the clutch disks 250, and the clutch pack basket 222*b*, as shown by arrows in FIG. 13C. Fluid flows through the holes 230 of the clutch pack basket 222*b*, is collected in the housing 102 and is returned to the primary pump 104 for recirculation in the DCT 100. It is thus to be understood that in order for the pressure plate 320*b* to selectively squeeze the clutch pack 240*b*, pressurized fluid is continuously supplied by the primary pump 104.

Furthermore, it is to be noted that in the DCT 100 of the present technology, having the central clutch gear 200 between the pressure plates 320*a*. 320*b*, and thus the chambers 350*a*, 350*b* on either side of the central clutch gear 200, assists in distributing the forces more evenly in the clutch pack drum 220. This feature also assists in reducing the rotating masses in the clutch pack drum 220.

Referring to FIG. 8, a hollow shaft 400*b* is connected to the rear clutch hub 260*b* via the splines 274 defined in the central portion 268 thereof. The shaft 400*a* extends through the shaft 400*b*. Another plurality of transmission gears 600 are operatively connected to the shaft 400*b*. Referring to FIG. 5, the transmission gears 600 include the gears corresponding to the second gear 602, fourth gear 604 and sixth gear 606 of the DCT 100, and the transmission gears 600 are also disposed behind the central clutch gear 200.

Referring back to FIGS. 4 and 5, the DCT 100 further includes a layshaft 610 having additional transmission gears 601', 603', 605', 607' operatively connected thereto. Each of the transmission gears 601', 603', 605', 607' on the layshaft 610 is selected to have a gear ratio with the corresponding transmission gear 601, 603, 605, 607 to correspond to the first, third, fifth and seventh gear of the DCT 100. The DCT 100 further includes another layshaft 620 having additional transmission gears (not shown) operatively connected thereto. Each of the transmission gears on the layshaft 620 is selected to have a gear ratio with the corresponding transmission gear 602, 604, 606 to correspond to the second, fourth and sixth gear of the DCT 100. The layshaft 620 further includes the transmission gear 608 corresponding to a reverse gear of the DCT 100. An output gear 630 is operatively connected to each of the layshafts 610, 620 to operatively connect the transmission gears 600 to the sub-transmission 700. The DCT 100 further includes synchronizers, shift actuators and shift forks 619 (FIG. 22) adapted to preselect an odd transmission gear on the shaft 400*a* while the vehicle 20 is being driven in an even transmission gear on the shaft 400*b* (and vice versa), and thus enable the driver to operate transmission gear changes when the driver operates the gear shifter 56.

Referring now to FIGS. 4, 5 and 14, the subtransmission 700 will be described in more details. The subtransmission 700 has a subtransmission shaft 702. An input gear 704 is operatively connected to the subtransmission shaft 702 via an output damper 710. The input gear 704 is selectively driven by the output gear 630 of the layshaft 610, or by the output gear 630 of the layshaft 620, depending on the transmission gear that is selected. The output damper 710 is operatively connected between the input gear 704 and the subtransmission shaft 702. The output damper 710 has components similar to the input damper 120, and can reduce backlash that can occur between the driveline 54 of the vehicle 20 and the DCT 100. A parking lock gear 720 is operatively connected to the subtransmission shaft 702, and is adapted to lock the subtransmission 700, and thus the vehicle 20, when selected. The subtransmission 700 further includes a high transmission gear 730 and a low transmission gear 732 operatively connected to the subtransmission shaft 702.

The subtransmission 700 further includes an output shaft 740 configured for operative connection to the driveline 54 of the vehicle 20 (as shown by arrow 54 in FIGS. 4, 5 and 14). A high transmission gear 730' and a low transmission gear 732' are operatively connected to the output shaft 740. When the subtransmission 700 is in the high gear configuration (i.e. when the high transmission gear 730 drives the high transmission gear 730'), a first gear ratio is defined between the subtransmission shaft 702 and the output shaft 740. When the subtransmission 700 is in the low gear configuration (i.e. when the low transmission gear 732 drives the low transmission gear 732'), a second gear ratio is defined between the subtransmission shaft 702 and the output shaft 740. The first gear ratio (i.e. high gear ratio) is smaller than the second gear ratio (i.e. low gear ratio). The driver can thus select in which mode the subtransmission 700 is to be configured, i.e. between high gear ratio and low gear ratio, depending on the terrain on which the vehicle 20 travels, for example.

The output shaft 740 further has a bevel gear 750 defined in the rear portion thereof. The bevel gear 750 is adapted to operatively connect to a rear transaxle 751 of the vehicle 20 for driving the rear wheels 28 (as indicated by arrows 28 on FIG. 4). A front propeller shaft gear 752 is operatively connected to the output shaft 740, and is adapted to engage with a front propeller shaft gear 752' operatively connected to the front propeller shaft 60. As mentioned above, the front propeller shaft 60 selectively drives the front wheels 24 when the driver selects 4×4 operation of the vehicle 20.

The configuration of the transmission housing 102 of the DCT 100 and the transmission fluid distribution system 450 cooperating therewith will now be described in greater detail with reference to FIGS. 3A to 3E and 15 to 35.

Figure 15:
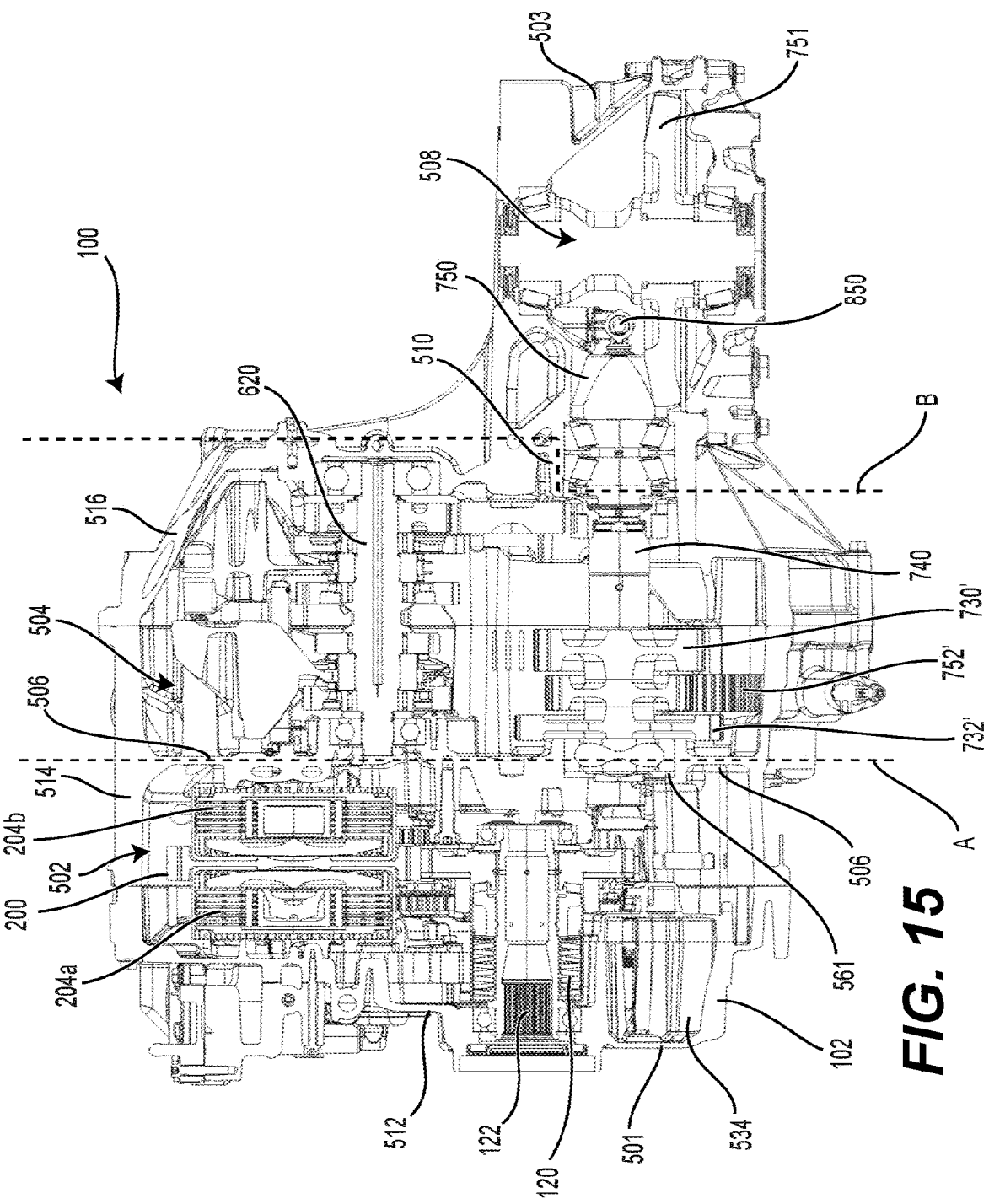
FIG. 15 is a cross-sectional view of the dual-clutch transmission of FIG. 3A taken along line 15-15 in FIG. 3C.

As shown in FIGS. 3A to 3E, the transmission housing 102 has a front end 501 and a rear end 503 and defines an internal volume within which the various components of the DCT 100 are enclosed. The transmission housing 102 defines a plurality of chambers in order to limit the flow of transmission fluid within the internal volume of the transmission housing 102 when the vehicle 20 is underway. Notably, the separation of the transmission housing 102 into separate chambers prevents excessive movement of transmission fluid within the transmission housing 102 which could occur during certain operations of the vehicle 20 (e.g., when going up or down a hill) if a single large chamber were provided. In particular, in this embodiment, the transmission housing 102 defines a front chamber 502 and a rear chamber 504 disposed rearward of the front chamber 502. Notably, the transmission housing 102 has an internal dividing wall 506 that separates the front chamber 502 from the rear chamber 504. In particular, the internal dividing wall 506 is configured to limit flow of transmission fluid between the front and rear chambers 502, 504 generally along a vertical boundary plane A (FIG. 15). That is, the internal dividing wall 506 prevents the free flow of transmission fluid throughout the internal volume defined by the transmission housing 102 such that, when the DCT 100 is in a tilted position (e.g., when the vehicle 20 goes up or down a hill), the flow of transmission fluid from the front chamber 502 to the rear chamber 504 and vice-versa is limited. Rather, as will be described in more detail below, the flow of transmission fluid between the front and rear chambers 502, 504 is controlled by the transmission fluid distribution system

450. In particular, the primary pump 104 is configured to pump transmission fluid to the front and rear chambers 502, 504.

The front and rear chambers 502, 504 are arranged such as to contain different components of the DCT 100. Notably, the front chamber 502 encloses the internal components of the DCT 100 that are positioned more forwardly. For instance, the input shaft 122 and the first and second clutches 204a, 204b are disposed within the front chamber 502. Meanwhile, the transmission gears 600, the layshafts 610, 620 and the gears mounted thereto (e.g., gears 601', 603', 605', 607'), the subtransmission 700 and the output shaft 740 are disposed within the rear chamber 504.

In this embodiment, the transmission housing 102 also defines an additional chamber 508 disposed rearward of the rear chamber 504. As such, the rear chamber 504 is disposed between the front chamber 502 and the chamber 508. An internal dividing wall 510 of the transmission housing 102 separates the rear chamber 504 from the chamber 508 to prevent the flow of transmission fluid between the rear chamber 506 and the chamber 508 generally along a vertical boundary B. The rear transaxle 751 is disposed in the chamber 508 and therefore the chamber 508 may be referred to as the transaxle chamber 508. The bevel gear 750 is also disposed in the transaxle chamber 508.

The transaxle chamber 508 is fluidly independent from the front and rear chambers 502, 504. That is, the transmission fluid that flows within the transaxle chamber 508 does not flow into the front or rear chambers 502, 504 and vice-versa. This can be helpful to contain the transmission fluid of the DCT 100 within a more manageable volume defined by the front and rear chambers 502, 504 which can facilitate the collection of the transmission fluid circulating therein. Furthermore, in this embodiment, the transaxle chamber 508 contains a different type of transmission fluid (e.g., a different type of oil) with a greater shear viscosity to accommodate operation of the bevel gear 750 but may not be ideal for hydraulics. In this embodiment, the output shaft 740 extends outside of the rear chamber 504 through a rear side thereof and into the transaxle chamber 508 such as to be operatively connected to the rear transaxle 751.

As shown in FIGS. 3A to 3D, the transmission housing 102 includes a plurality of housing segments which are interconnected to one another to define the chambers 502, 504, 508. Notably, the transmission housing 102 has a front housing segment 512, a middle housing segment 514 disposed rearward of the front housing segment 512 and a rear housing segment 516 disposed rearward of the middle housing segment 514. The middle housing segment 514 is thus disposed between the front and rear housing segments 512, 516. The housing segments 512, 514, 516 are manufactured separately and then assembled together to form the transmission housing 102. The front chamber 502 is defined by the front and middle housing segments 512, 514. The rear chamber 504 is defined by the middle and rear housing segments 514, 516. Notably, the middle housing segment 514 includes the internal dividing wall 506 that separates the front and rear chambers 502, 504. The rear housing segment 516 includes the internal dividing wall 510 that separates the rear chamber 504 from the transaxle chamber 508.

Figure 16:
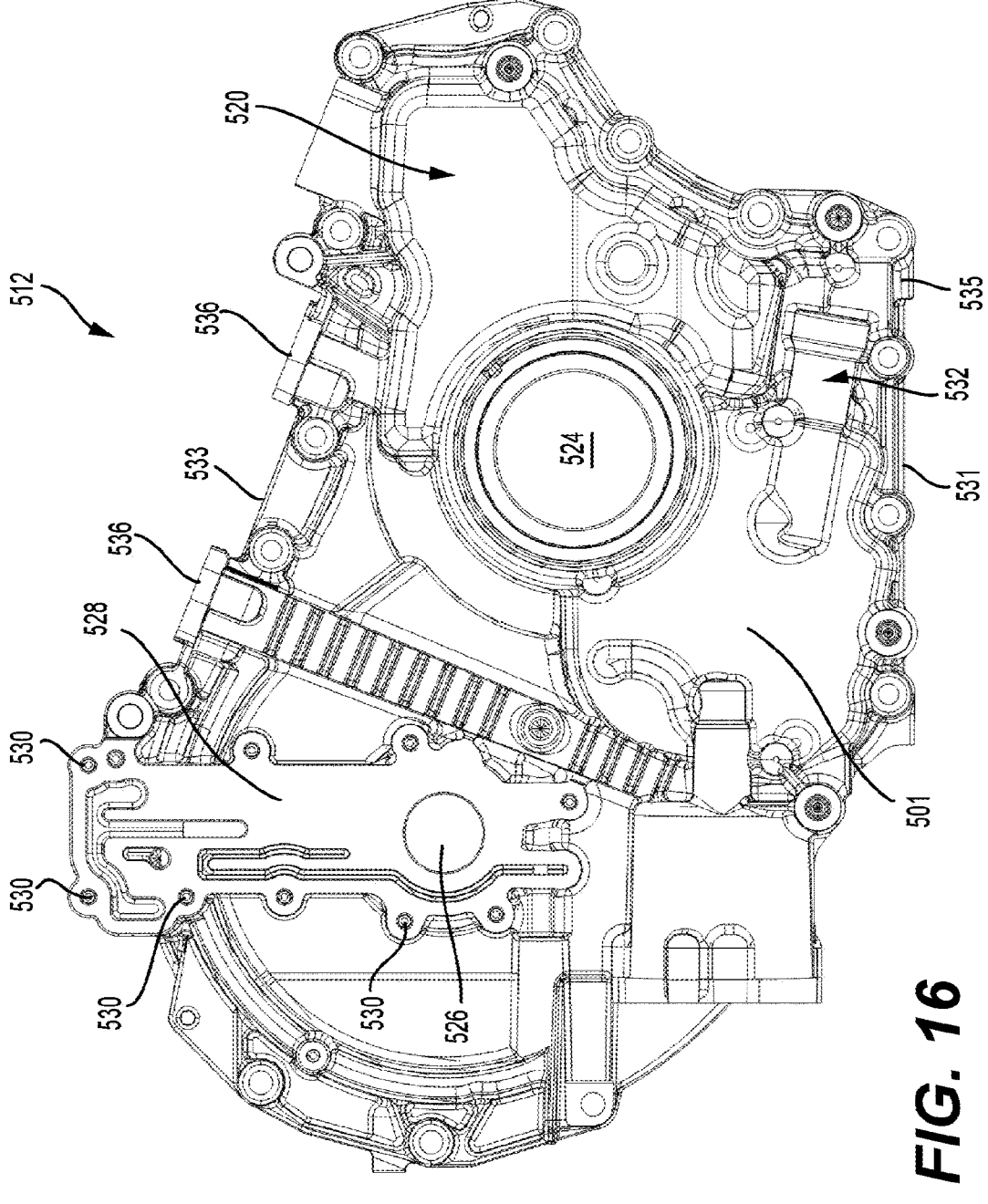
FIG. 16 is a front elevation view of a front housing segment of a transmission housing of the dual-clutch transmission of FIG. 3A.
Figure 17:
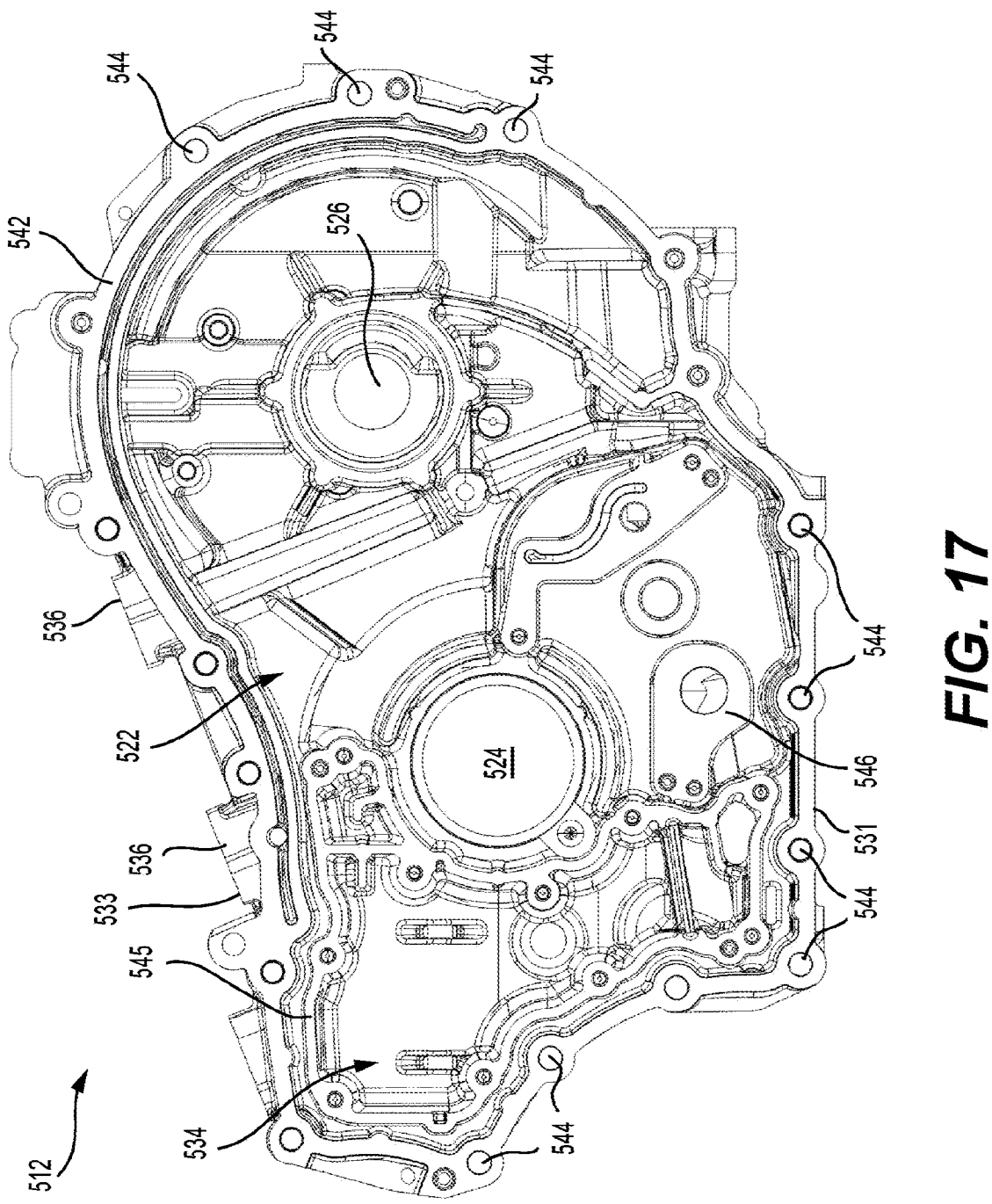
FIG. 17 is a rear elevation view of the front housing segment of FIG. 16.

With reference to FIGS. 16 and 17, the front housing segment 512 has a front side 520 (shown in FIG. 16) and a rear side 522 (shown in FIG. 17) opposite the front side 520. The front side 520 defines at least in part the front end 501 of the transmission housing 102. The front housing segment 512 defines an input opening 524 and a shaft opening 526 which extend from the front side 520 to the rear side 522.

The input opening 524 (also shown in FIG. 3A) is configured to receive the crankshaft 53 therethrough for connection to the input shaft 122. The shaft opening 526 is configured to receive an end of the shaft 400a in order to fluidly connect the passages 410, 412, 414 of the shaft 400a to the primary pump 104. The front housing segment 512 also defines a valve housing flange 528 on the front side 520 for connecting a valve housing 511 thereto via a plurality of threaded openings 530 defined by the valve housing flange 528. The valve housing 511 will be described in greater detail below.

As shown in FIG. 16, the front housing segment 512 also defines a pump feed 532 which fluidly connects the primary pump 104 to a fluid tank 534 (FIGS. 15 and 17) defined by the front housing segment 512 on the rear side 522. A drain port 535 is disposed near a lower end 531 of the front housing segment 512 for draining the contents of the fluid tank 534. Moreover, as shown in FIG. 16, at an upper end 533 thereof, the front housing segment 512 has two heat exchanger connectors 536 which fluidly connect the primary pump 104 to a heat exchanger 540 as will be described in greater detail below.

As shown in FIG. 17, the front housing segment 512 has a rear connection flange 542 on the rear side 522 for connecting the front housing segment 512 to the middle housing segment 514. Notably, a plurality of flange openings 544 are defined by the rear connection flange 542 for receiving fasteners that engage the rear housing segment 514. An inner flange 545 on the rear side 522 of the front housing segment 512 defines in part the fluid tank 534. The front housing segment 512 also has a pump connection flange 546 on the rear side 522 for connecting the primary pump 104 to the front housing segment 512 and fluidly connecting the primary pump 104 to the fluid tank 534.

Figure 18:
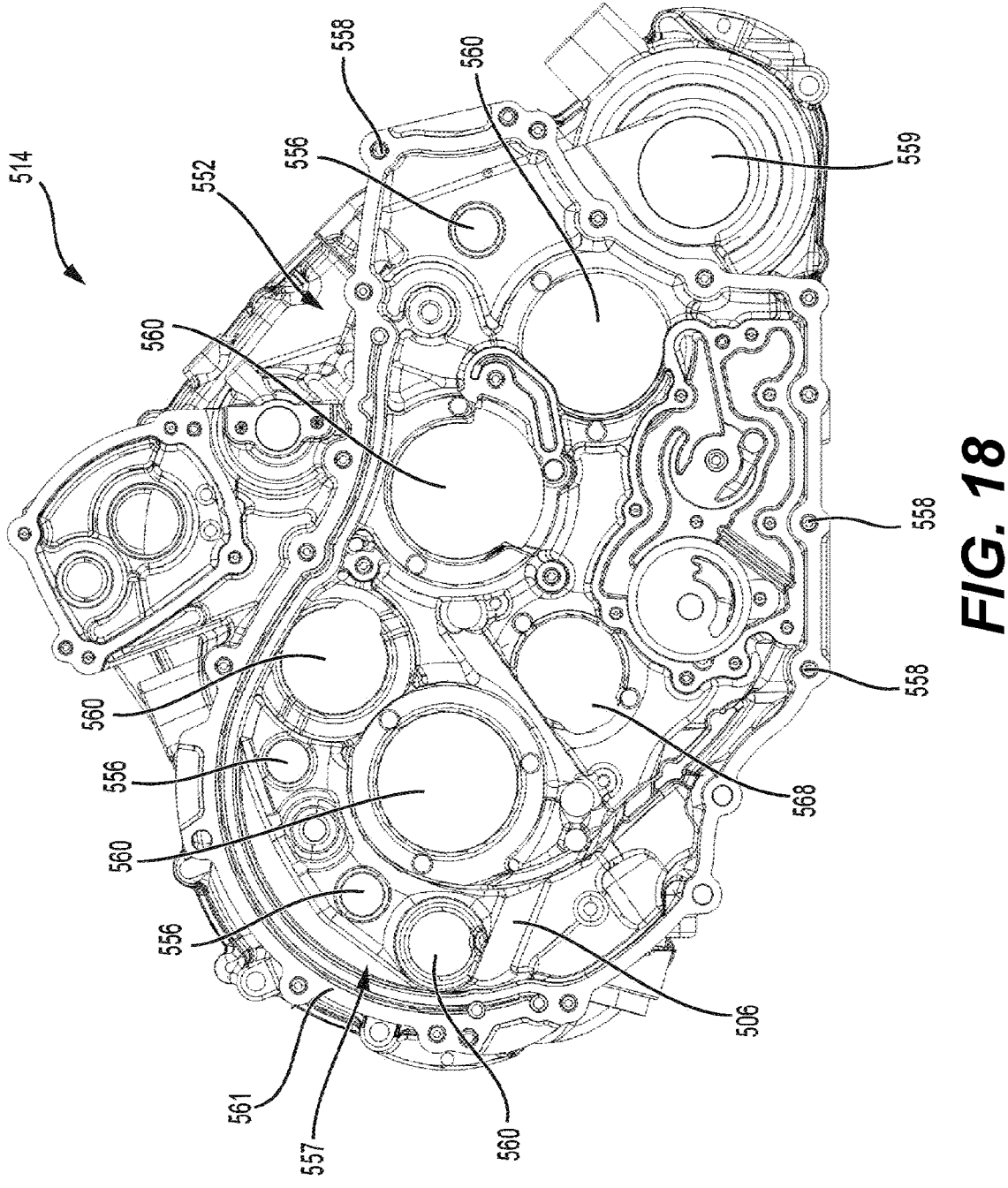
FIG. 18 is a front elevation view of a middle housing segment of the transmission housing of the dual-clutch transmission of FIG. 3A.
Figure 19:
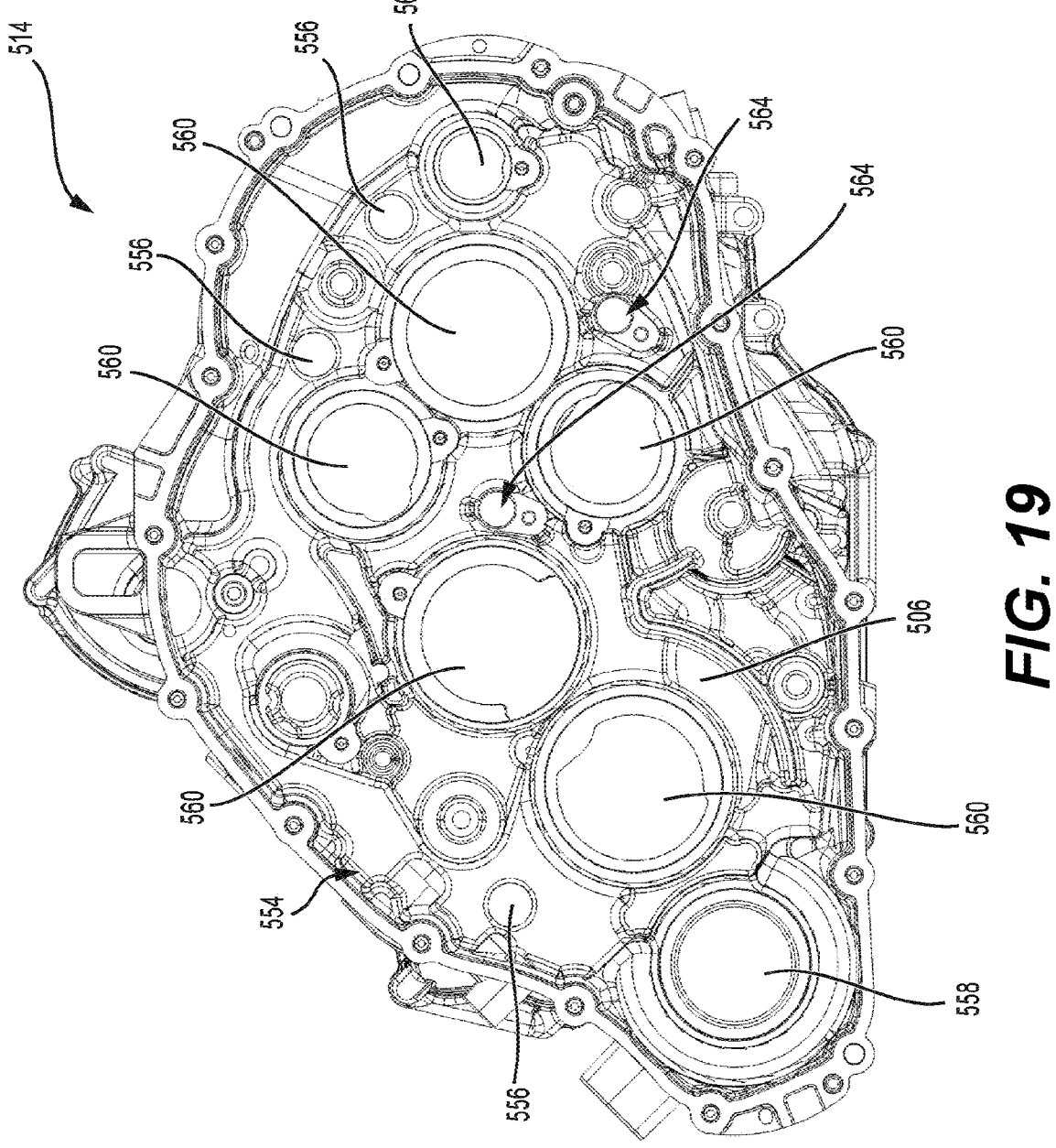
FIG. 19 is a rear elevation view of the middle housing segment of FIG. 18.

With reference to FIGS. 18 and 19, the middle housing segment 514 has a front side 552 (shown in FIG. 18) and a rear side 554 (shown in FIG. 19) opposite the front side 552. The middle housing segment 514 has a front connection flange 561 on the front side 552 for securing the middle housing segment 514 to the front housing segment 512. Notably, the front connection flange 561 defines a plurality of fastener openings 558 to receive fasteners that secure the middle housing segment 514 to the front housing segment 512. The middle housing segment 514 includes the internal dividing wall 506 which separates the front chamber 502 from the rear chamber 504. As can be seen, the internal dividing wall 506 defines a plurality of openings. Notably, in this embodiment, the internal dividing wall 506 defines three air holes 556 for balancing the pressure within the front chamber 502 with the pressure within the rear chamber 504. Additional or fewer air holes may be provided in other embodiments. Moreover, in this embodiment, the air holes 556 are disposed in an upper portion 557 of the internal dividing wall 506. In this case, the upper portion 557 can be said to be an upper half of the internal dividing wall 506. Furthermore, as shown in FIGS. 18 and 19, the internal dividing wall 506 extends along at least a majority of a distance measured from a lower end of the transmission housing 102 to an upper end of the transmission housing 102. The middle housing segment 514 also defines a propeller shaft opening 559 for receiving the front propeller shaft 60 (see FIG. 3A), and a plurality of shaft openings 560 for receiving bearings that support different ones of the shafts of the DCT 100.

Further details of the front and middle housing segments 512, 514 will be described with respect to the transmission fluid distribution system 450 below.

Figure 20:
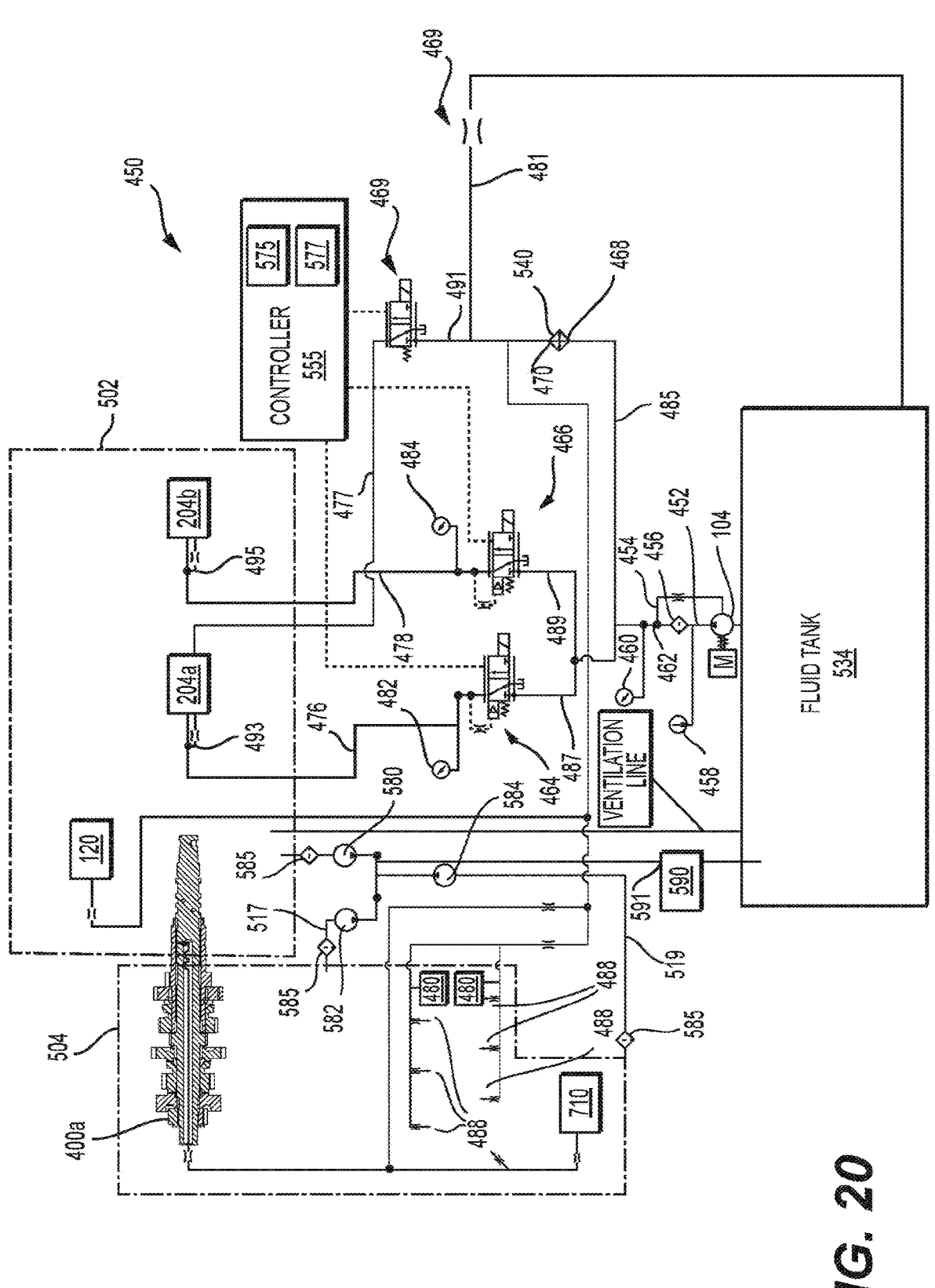
FIG. 20 is a schematic diagram of a transmission fluid distribution system of the dual-clutch transmission of FIG. 3A.
Figure 25:
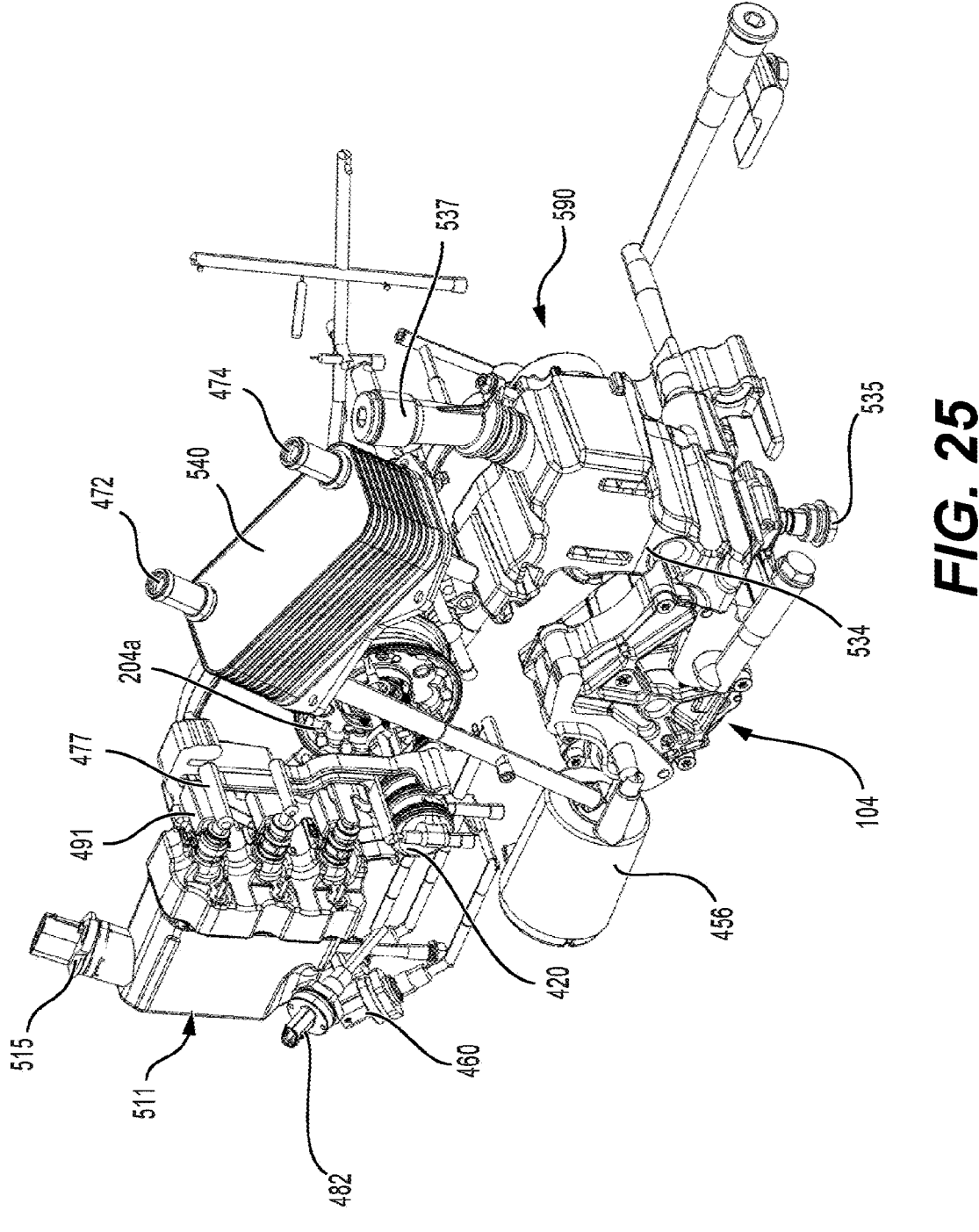
FIG. 25 is a perspective view, taken from a front, top, left side, of the transmission fluid content of the transmission fluid distribution system of FIG. 24.

With reference to FIG. 20, the transmission fluid distribution system 450 will now be described in greater detail. As mentioned above, the transmission fluid distribution system 450 includes the fluid tank 534 and the primary pump 104 which is configured to pump the transmission fluid contained within the fluid tank 534 throughout various passages of the transmission fluid distribution system 450. As shown in FIG. 25, the fluid tank 534 is disposed in the front chamber 502 and is partly defined by the transmission housing 102, namely by the front housing segment 512. The fluid tank 534 has an inlet duct 537 (see FIG. 22) at an upper end thereof to fill the fluid tank 534 with transmission fluid.

As mentioned above, in this embodiment, the primary pump 104 is driven by the meshing of a primary pump gear 185 (FIG. 33) thereof with the pump gear 180. As shown in FIG. 33, the primary pump gear 185 is mounted to a pump shaft 187 extending along a pump axis 189 about which the primary pump 185 is rotatable. The pump axis 189 extends to the right of the input damper axis 130 and is vertically lower than the input damper axis 130. In this embodiment, the primary pump 104 pressurizes the transmission fluid to a pressure of approximately 17 bars.

Figure 21:
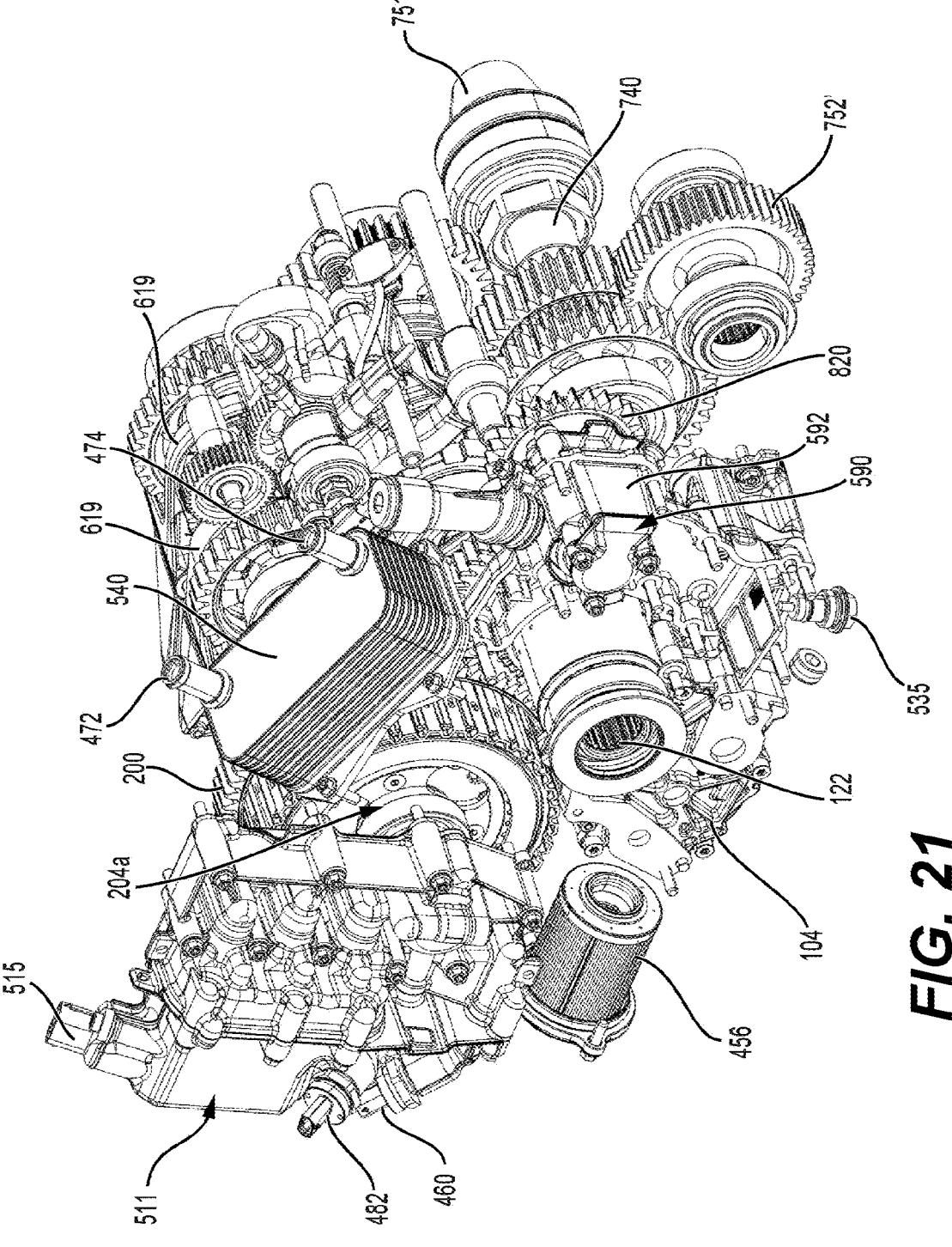
FIG. 21 is a perspective view, taken from a front, top, left side, of the dual-clutch transmission of FIG. 3A with a transmission housing thereof removed to expose the internal components of the dual-clutch transmission.

Returning now to FIG. 20, a main conduit 452 extends from the primary pump 104 to allow the primary pump 104 to pump transmission fluid from the fluid tank 534 through the main conduit 452. From the primary pump 104, the transmission fluid pumped through the main conduit 452 flows through a filter 456 to remove debris from the transmission fluid. As shown in FIG. 21, the filter 456 is positioned to the right of the primary pump 104. Returning to FIG. 20, a temperature sensor 458 and a pressure sensor 460 are connected to the main conduit 452 to sense a temperature and a pressure of the transmission fluid flowing therein. At a junction 462 with the main conduit 452, a feedback conduit 454 extends back to the primary pump 104. Notably, the primary pump 104 has an integrated pressure regulation system based on feedback received through the feedback conduit 454. As the feedback conduit 454 is downstream from the filter 456, this allows the primary pump 104 to compensate for a pressure drop occurring at the filter 456.

Figure 22:
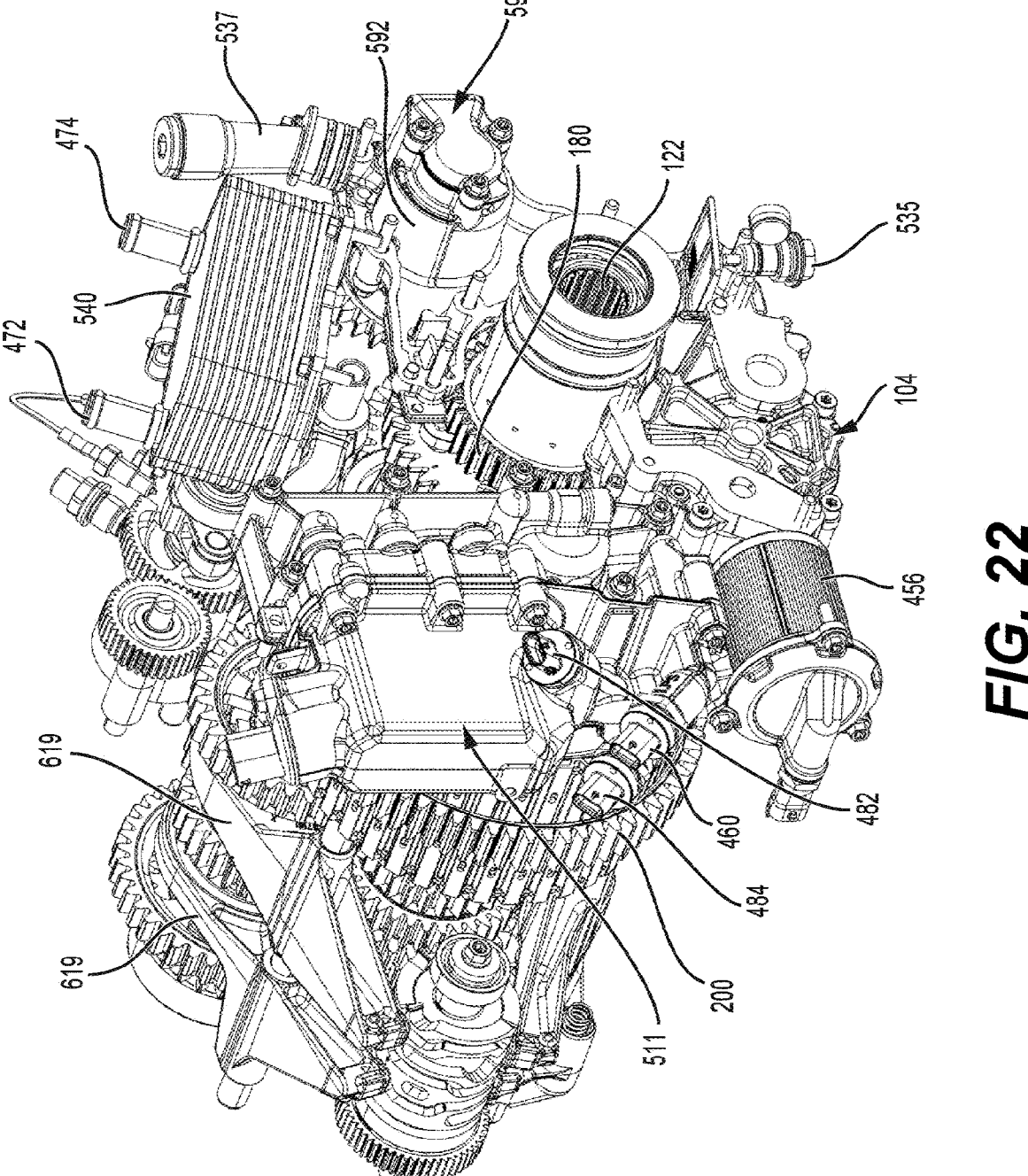
FIG. 22 is a perspective view, taken from a front, top, right side, of the dual-clutch transmission of FIG. 3A with the transmission housing thereof removed.
Figure 23A:
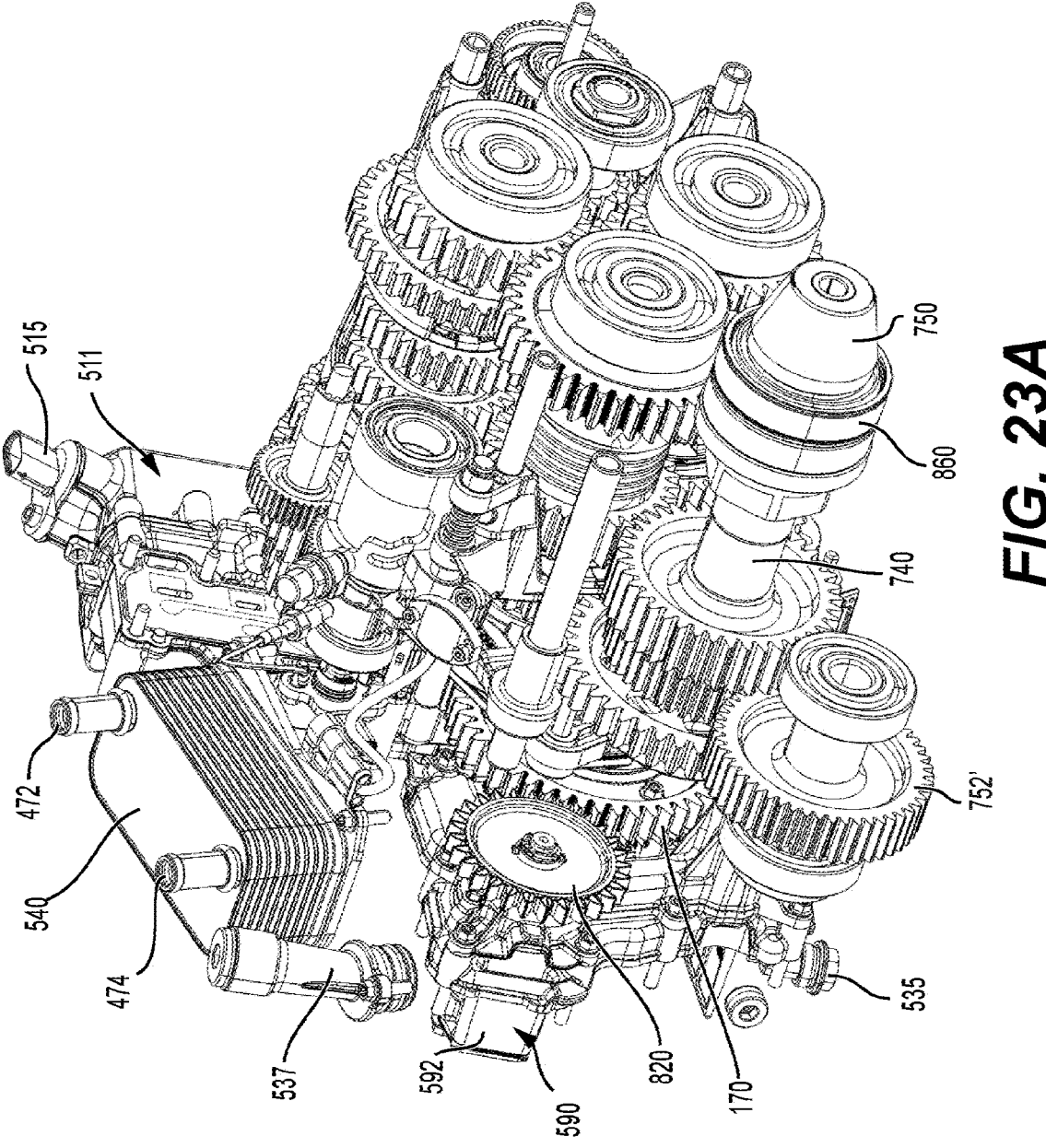
FIG. 23A is a perspective view, taken from a rear, top, left side, of the dual-clutch transmission of FIG. 3A with the transmission housing thereof removed.
Figure 23B:
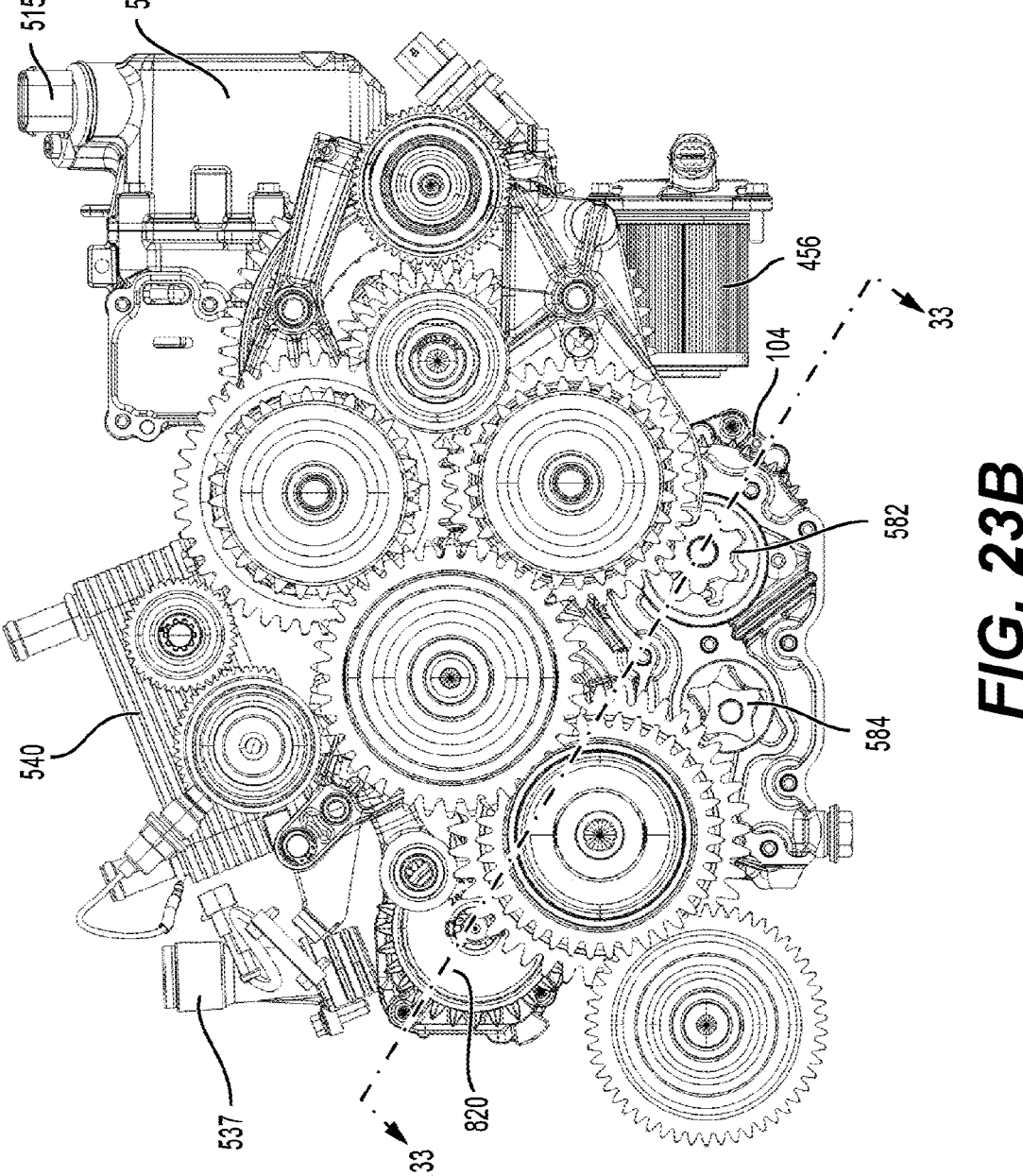
FIG. 23B is a rear elevation view of the dual-clutch transmission of FIG. 3A with the transmission housing thereof removed.

As shown in FIG. 20, part of the transmission fluid then flows through a first passage 485 to the heat exchanger 540 while another part of the transmission fluid flows through two other passages 487, 489 to two clutch valves 464, 466 disposed in the valve housing 511 (shown in FIGS. 21, 22). The clutch valves 464, 466 are fluidly connected to the clutches 204a, 204b respectively. The clutch valves 464, 466 are in communication with a controller 555 and are controlled thereby to operate the clutches 204a, 204b. Notably, the controller 555 controls the clutch valves 464, 466 to actuate the clutches 204a, 204b by selectively routing transmission fluid to the clutches 204a, 204b in the manner described above. In this embodiment, the clutch valves 464, 466 are proportional valves. The valve housing 511 has a controller connector 515 (FIG. 29) at an upper end thereof for connecting the controller 555 to the clutch valves 464, 466.

With reference to FIG. 20, the controller 555 has a processor unit 575 for carrying out executable code, and a non-transitory memory unit 577 that stores the executable code in a non-transitory medium (not shown) included in the memory unit 577. The processor unit 575 includes one or more processors for performing processing operations that implement functionality of the controller 555. The processor unit 575 may be a general-purpose processor or may be a specific-purpose processor comprising one or more preprogrammed hardware or firmware elements (e.g., application-specific integrated circuits (ASICs), electrically erasable programmable read-only memories (EEPROMs), etc.) or other related elements. The non-transitory medium of the memory unit 577 may be a semiconductor memory (e.g., read-only memory (ROM) and/or random-access memory (RAM)), a magnetic storage medium, an optical storage medium, and/or any other suitable type of memory. While the controller 555 is represented as being one control unit in this implementation, it is understood that the controller 555 could comprise separate control units for controlling components separately and that at least some of these control units could communicate with each other. Moreover, in some embodiments, the controller 555 could be in communication with an electronic control unit (ECU) of the vehicle 20.

Referring now to FIGS. 3A and 20, the heat exchanger 540 is configured to cool the transmission fluid and, in this embodiment, is disposed atop the front housing segment 512. As shown in FIG. 3A, the heat exchanger 540 has a transmission fluid inlet 468 for receiving heated transmission fluid from the primary pump 104 and a transmission fluid outlet 470 for discharging cooled transmission fluid. The heat exchanger 540 also has a coolant inlet 472 for receiving cooled coolant and a coolant outlet 474 for discharging heated coolant. The coolant may be any suitable coolant. In this embodiment, the heat exchanger 540 is a plate heat exchanger.

From the transmission fluid outlet 470 of the heat exchanger 540, the transmission fluid flows through a passage 491 to a cooling valve 469. In addition, optionally, a passage 481 (FIG. 20) extending downstream from the transmission fluid outlet 470 of the heat exchanger 540 could route a portion of the transmission fluid discharged by the heat exchanger 540 back to the fluid tank 534 to lower a temperature of the transmission fluid contained by the fluid tank 534. For instance, in this embodiment, an orifice 459 along the passage 481 is closed to seal off the passage 481, however the orifice 459 could be open in other embodiments.

The cooling valve 469 is fluidly connected between the transmission fluid outlet 470 and the first clutch 204a. As such, the cooling valve 469 receives cooled transmission fluid from the heat exchanger 540. The controller 555 is in communication with the cooling valve 469 in order to selectively actuate the cooling valve 469, thereby selectively causing the flow of cooled transmission fluid to the first clutch 204a in order to cool the first clutch 204a. In this embodiment, the cooling valve 469 is an on/off valve.

In this embodiment, only the first clutch 204a is cooled by the transmission fluid discharged by the heat exchanger 540. Notably, as the first clutch 204a is responsible for transmitting motion to the first gear 601 of the DCT 100 which is expected to cause a greater amount of heat to be generated by its associated clutch (i.e., the first clutch 204a) than the other gears, the first clutch 204a can more greatly benefit from cooling than the second clutch 204b. In particular, at launch of the vehicle 20 (i.e., beginning motion from a stand-still state) when the first gear 601 is engaged, a largest rotational difference between the input and output sides of the dual-clutch 202 can be observed during its use, which consequently produces the highest amount of slip and associated heat. Nevertheless, it is contemplated that, in other embodiments, both the first clutch 204a and the second clutch 204b could be fluidly connected to the cooling valve 469, or a dedicated cooling valve therefor, so that both the first and second clutches 204a, 204b could selectively be cooled by transmission fluid discharged by the heat exchanger 540.

Figure 27:
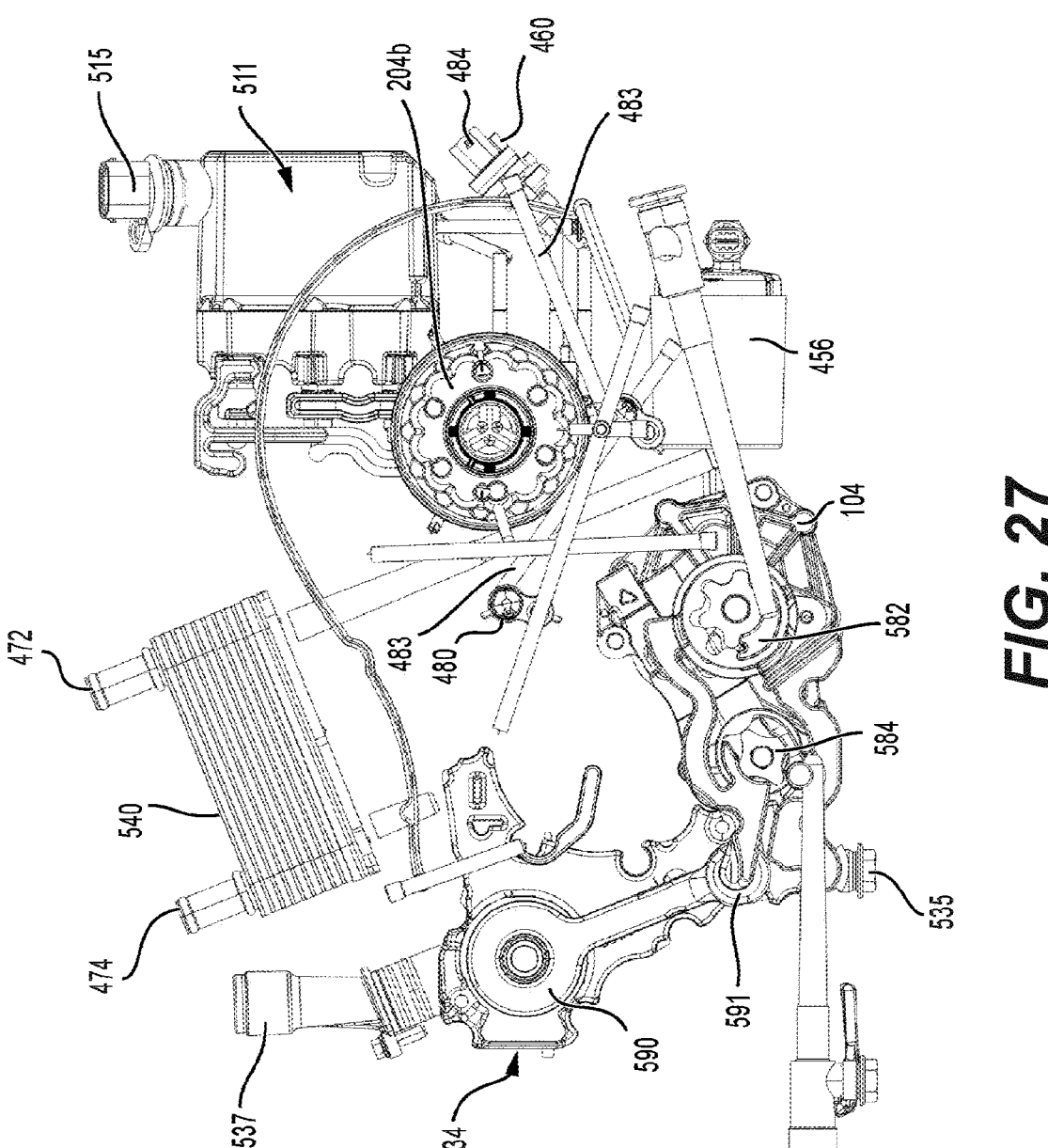
FIG. 27 is a rear elevation view of the transmission fluid content of the transmission fluid distribution system of FIG. 25.
Figure 28:
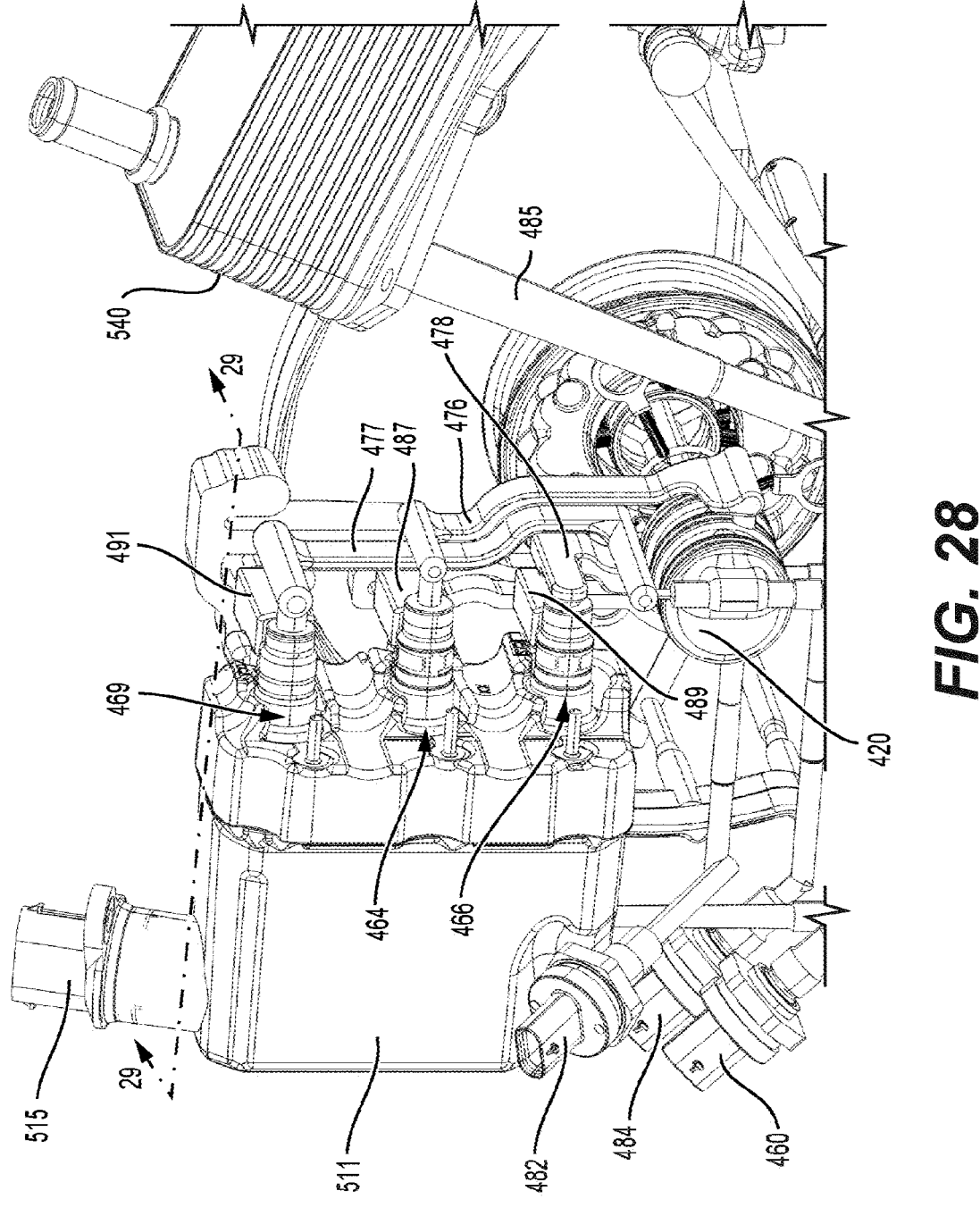
FIG. 28 is a perspective view, taken from a top, front, left side, of part of the transmission fluid distribution system of FIG. 25.
Figure 29:
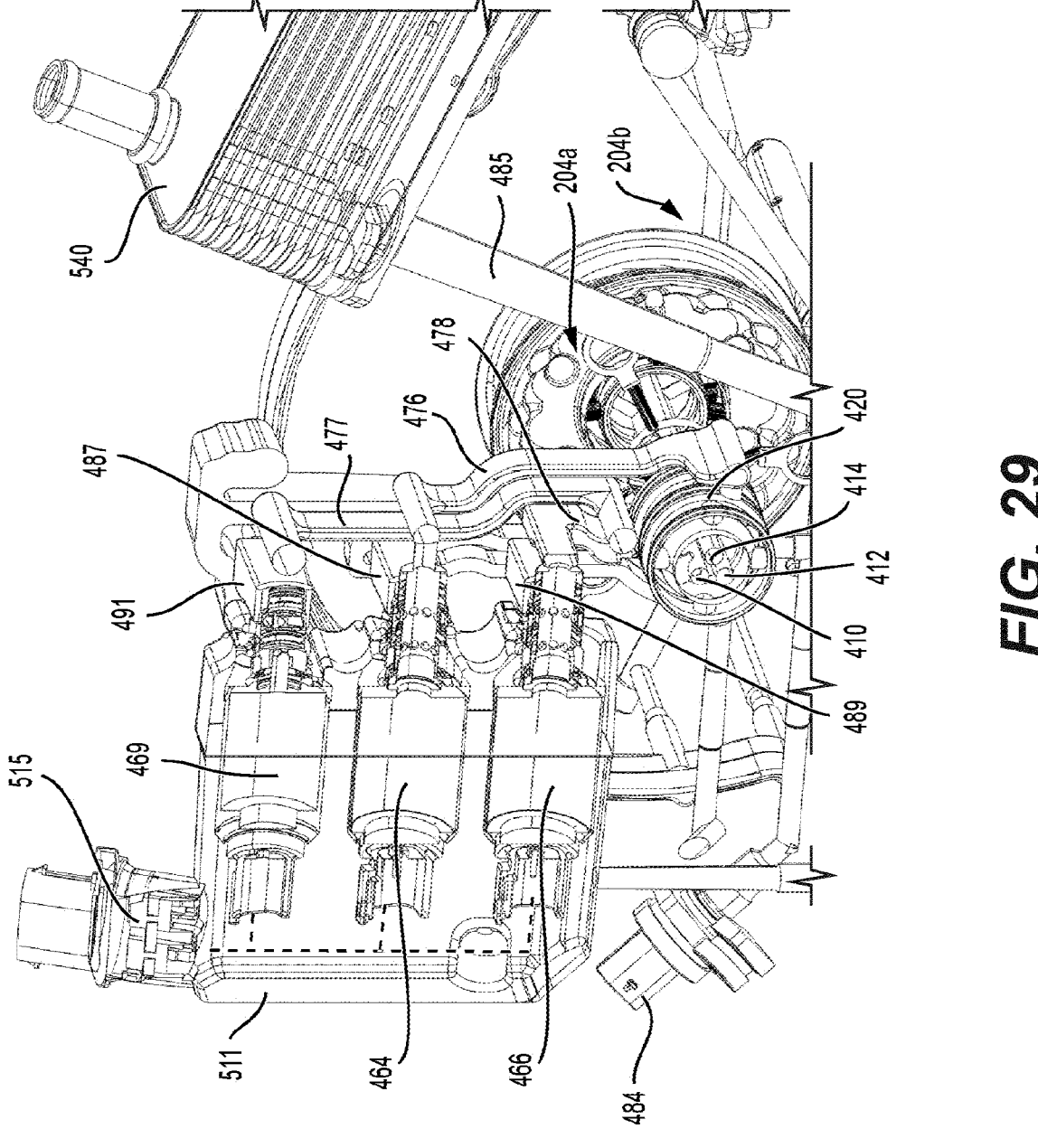
FIG. 29 is a cross-sectional view of the part of the transmission fluid distribution system of FIG. 28 taken along line 29-29 in FIG. 28.
Figure 30:
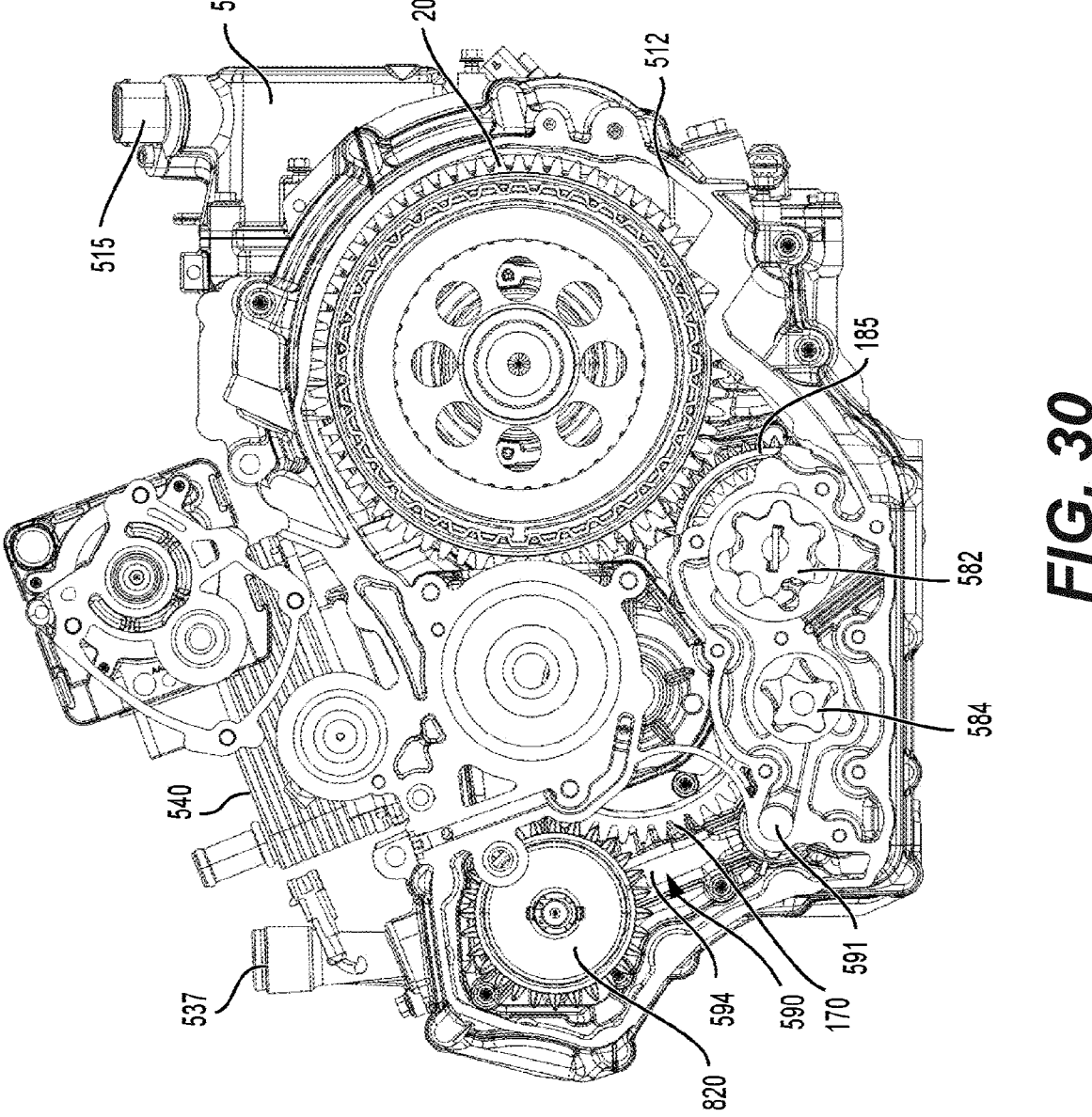
FIG. 30 is a cross-sectional view of the dual-clutch transmission of FIG. 3A taken along line 30-30 in FIG. 3C.
Figure 31:
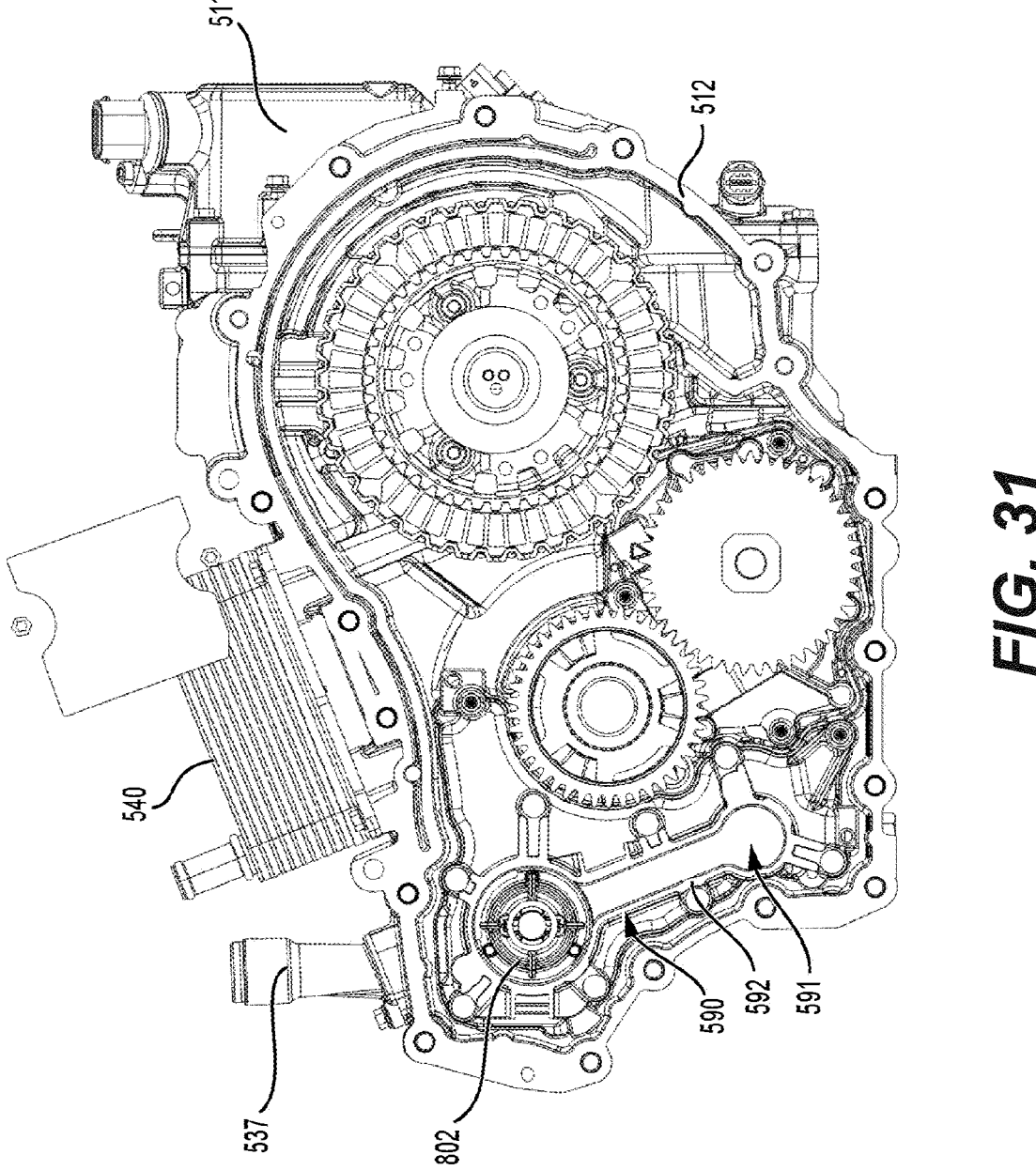
FIG. 31 is a cross-sectional view of the dual-clutch transmission of FIG. 3A taken along line 31-31 in FIG. 3C.

As shown in FIGS. 21 and 27, in this embodiment, the valve housing 511 enclosing the clutch valves 464, 466 and the cooling valve 469 is positioned vertically higher than the first and second clutches 204a, 204b when the vehicle 20 is at rest on a flat horizontal ground surface. As such, valve outlet passages 476, 477 that fluidly connect the valves 464, 469 to the first clutch 204a and a valve outlet passage 478 that fluidly connects the clutch valve 466 to the second clutch 204b remain filled with transmission fluid throughout operation of the DCT 100. Notably, this helps minimize the response time for actuating the clutches 204a, 204b and the response time for cooling the first clutch 204a. In addition, as the valve housing 511 is positioned near the clutches 204a, 204b, namely forwardly and upwardly from the first clutch 204a, the valve outlet passages 476, 477, 478 are relatively short to further minimize the response time for actuating the clutches 204a, 204b and the response time for cooling the first clutch 204a. Furthermore, as shown in FIG. 20, pressures sensors 482, 484 are fluidly connected to the valve outlet passages 476, 478 to sense the pressure of the transmission fluid along the valve outlet passages 476, 478.

As shown in FIG. 20, in this embodiment, fluid paths 493, 495 diverge from an "actuation path" of the valve outlet passages 476, 478 to route transmission fluid to lubricate and cool the clutches 204a, 204. For instance, the fluid path 493 includes the passage 414 (FIG. 8) provided to route transmission fluid to lubricate and cool the clutch plates 242, the clutch disks 250, and the clutch pack basket 222a of the first clutch 204a. Similarly, the fluid path 495 routes transmission fluid to lubricate and cool the clutch plates 242, the clutch disks 250, and the clutch pack basket 222b of the second clutch 204b.

With continued reference to FIG. 20, the primary pump 104 also pumps the transmission fluid to other components in the front and rear chambers 502, 504 of the transmission housing 102. Notably, part of the transmission fluid pumped by the primary pump 104 flows to the input damper 120 located in the front chamber 502. Similarly, part of the transmission fluid pumped by the primary pump 104 flows to the output damper 710 located in the rear chamber 504. Furthermore, part of the transmission fluid pumped by the primary pump 104 flows into the shaft 400a which extends within the front and rear chambers 502, 504.

Figure 24:
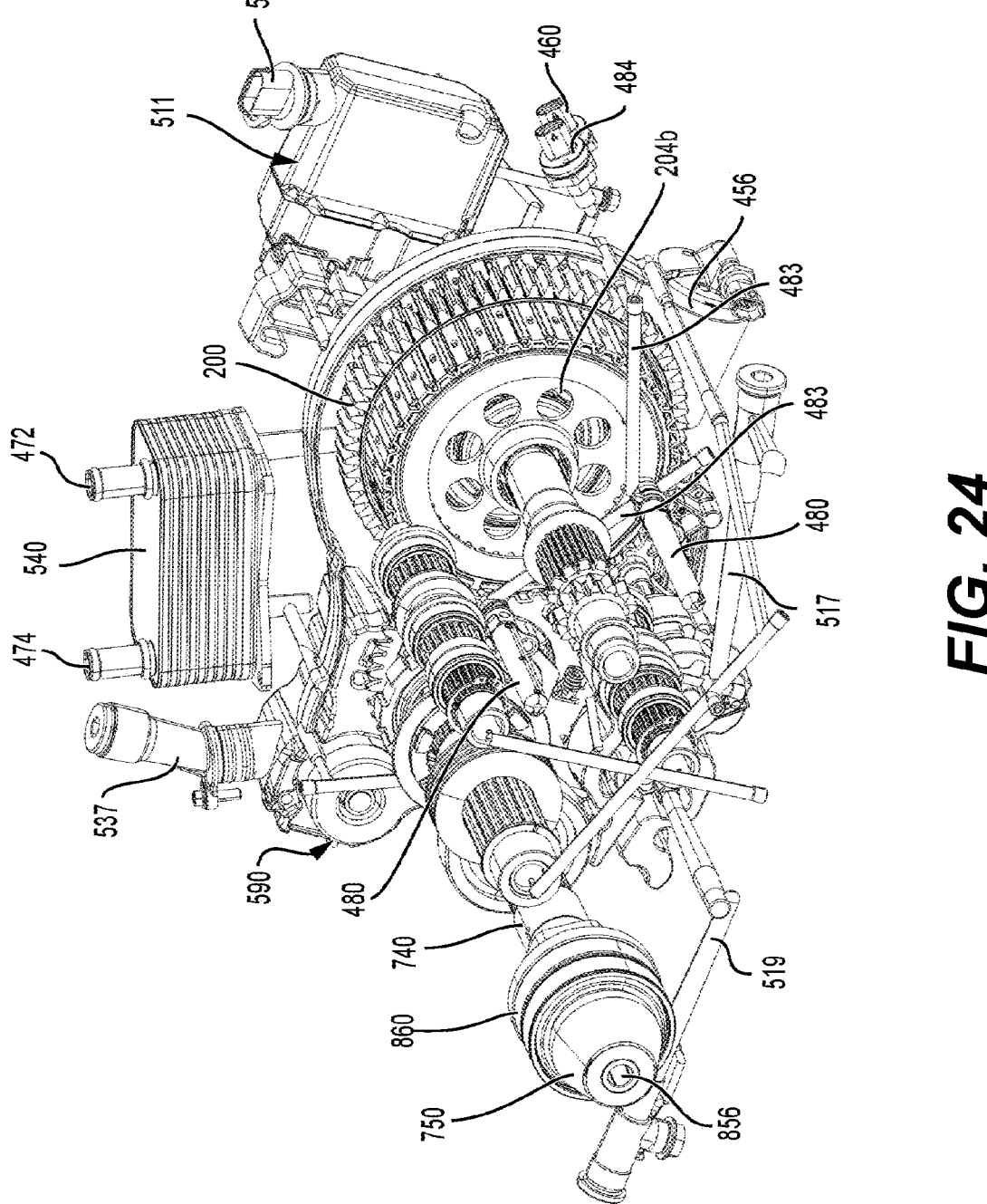
FIG. 24 is a perspective view, taken from a rear, top, right side, of part of the dual-clutch transmission of FIG. 3A, including a transmission fluid content of a transmission fluid distribution system and some of the internal components of the dual-clutch transmission.
Figure 26:
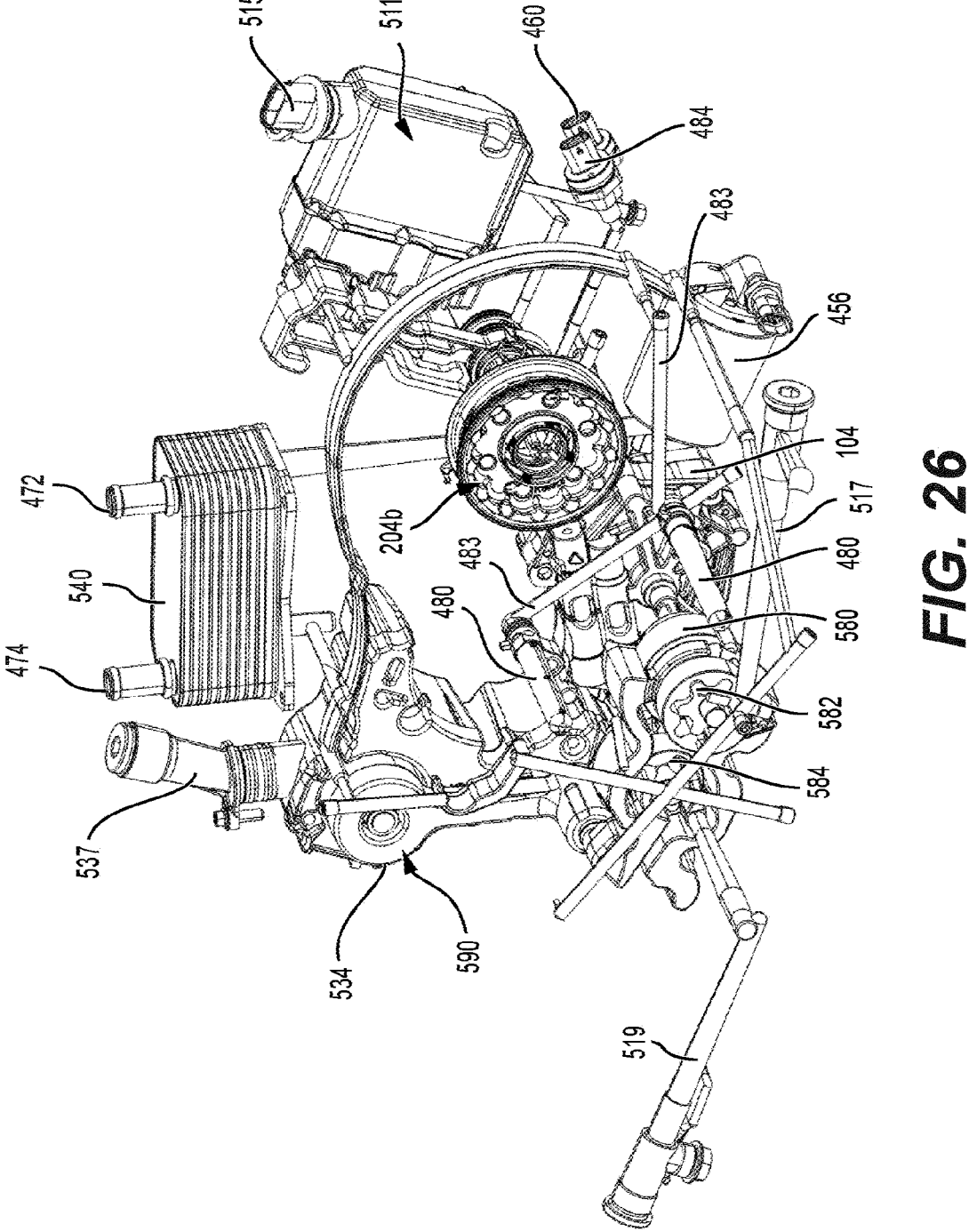
FIG. 26 is a perspective view, taken from a rear, top, right side, of the transmission fluid content of the transmission fluid distribution system of FIG. 25.

Furthermore, in this embodiment, the transmission fluid distribution system 450 is configured to spray transmission fluid within the rear chamber 504 so as to cover at least some of the components therein with transmission fluid. To that end, as shown in FIGS. 24 and 26, in this embodiment, the transmission fluid distribution system 450 includes two spraying devices 480 disposed in the rear chamber 504. The spraying devices 480 are fastened to the internal dividing wall 506 at respective mounting flanges 564 (FIG. 19) provided on the rear side of the middle housing segment 514. The spraying devices 480 are fluidly connected to the primary pump 104 through respective fluid channels 483 (see FIGS. 24, 26 showing the transmission fluid content flowing therein) defined by the internal dividing wall 506 and extending from a front side to a rear side of the internal dividing wall 506. Notably, each fluid channel opens into the corresponding mounting flange 564 to route transmission fluid in a controlled manner from the front chamber 502 to the rear chamber 504. The spraying devices 480 then atomize the transmission fluid received through the fluid channels within the rear chamber 504 to cover many components therein with transmission fluid. For instance, the transmission fluid sprayed by the spraying devices 480 can reach the gears 600 of the DCT 100 to lubricate them. In this embodiment, as shown in FIG. 20, nozzles 488 are also provided downstream from respective ones of the spraying devices 480 to distribute transmission fluid to the gears 600.

The transmission fluid distributed within the front and rear chambers 502, 504 is then recirculated back to the fluid tank 534. To that end, as shown in FIG. 20, in this embodiment, three secondary pumps 580, 582, 584 are provided to route the transmission fluid within the front and rear chambers 502, 504 back towards the fluid tank 534. In particular, the secondary pump 580 is fluidly connected to the front chamber 502 while the secondary pumps 582, 584 are fluidly connected to the rear chamber 504. The secondary pumps 582, 584 are fluidly connected to the rear chamber 504 via respective passages 517, 519 (FIGS. 20, 24 and 26) that are defined by the transmission housing 102. As best shown in FIG. 26, the passage 517 extends rearward and rightward from the secondary pump 582 and opens into an area of the rear chamber 504 that is adjacent the transmission gears 600, and the passage 519 extends rearward and leftward from the secondary pump 584 and opens into an area of the rear chamber 504 that is adjacent to the output damper 710. As such, the secondary pump 580 routes transmission fluid from the front chamber 502 to the fluid tank 534, while the secondary pumps 582, 584 route transmission fluid from the rear chamber 504 to the fluid tank 534. Respective filters 585 are disposed upstream from the secondary pumps 580, 582, 584 to filter out debris from the transmission fluid prior to its entry into the secondary pumps 580, 582, 584. In this embodiment, the filters 585 are sieves.

In this embodiment, the secondary pumps 580, 582, 584 are disposed in the front chamber 502 and are disposed near the lower end of the transmission housing 102. Notably, in this embodiment, the secondary pumps 580, 582, 584 are disposed vertically lower than the input damper axis 130 when the vehicle 20 is at rest on a flat horizontal ground surface. In this embodiment, the secondary pumps 580, 582, 584 are suction pumps.

As shown in FIG. 33, in this embodiment, a pump gear 193 operatively connected to the secondary pumps 580, 582 is mounted to a shaft 199 that is coupled to the pump shaft 187. The shaft 199 is coaxial with the pump shaft 187 such that the pump gear 193 is rotatable about the pump axis 189. Furthermore, as shown in FIG. 33, a pump gear 195 operatively connected to the secondary pump 584 is meshed with and driven by the pump gear 193. The pump gear 195 is rotatable about an axis 197 parallel to the pump axis 189.

Figure 32:
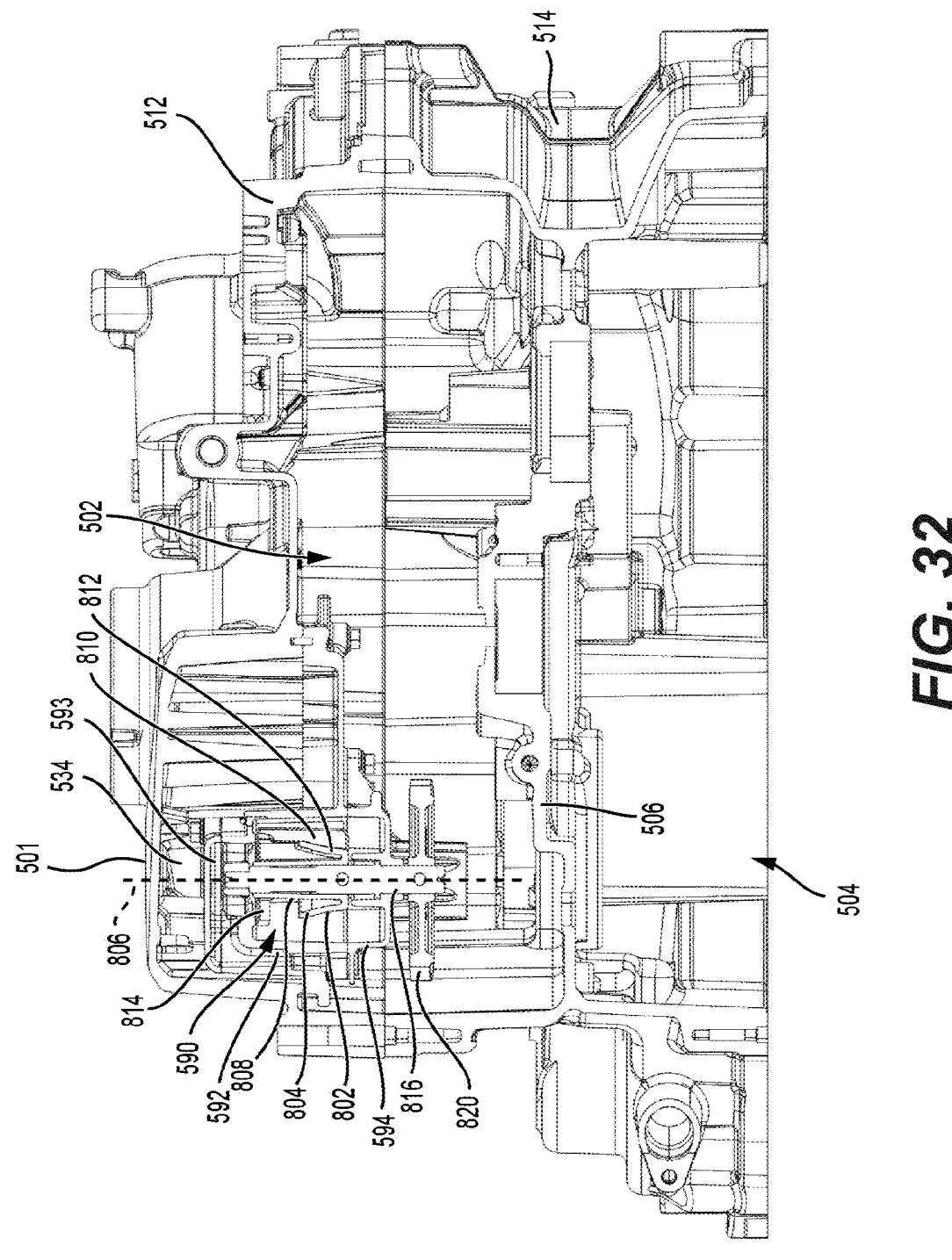
FIG. 32 is a cross-sectional view of the dual-clutch transmission of FIG. 3A taken along a line 32-32 in FIG. 3C, with internal components of the dual-clutch transmission removed for clarity.
Figure 34:
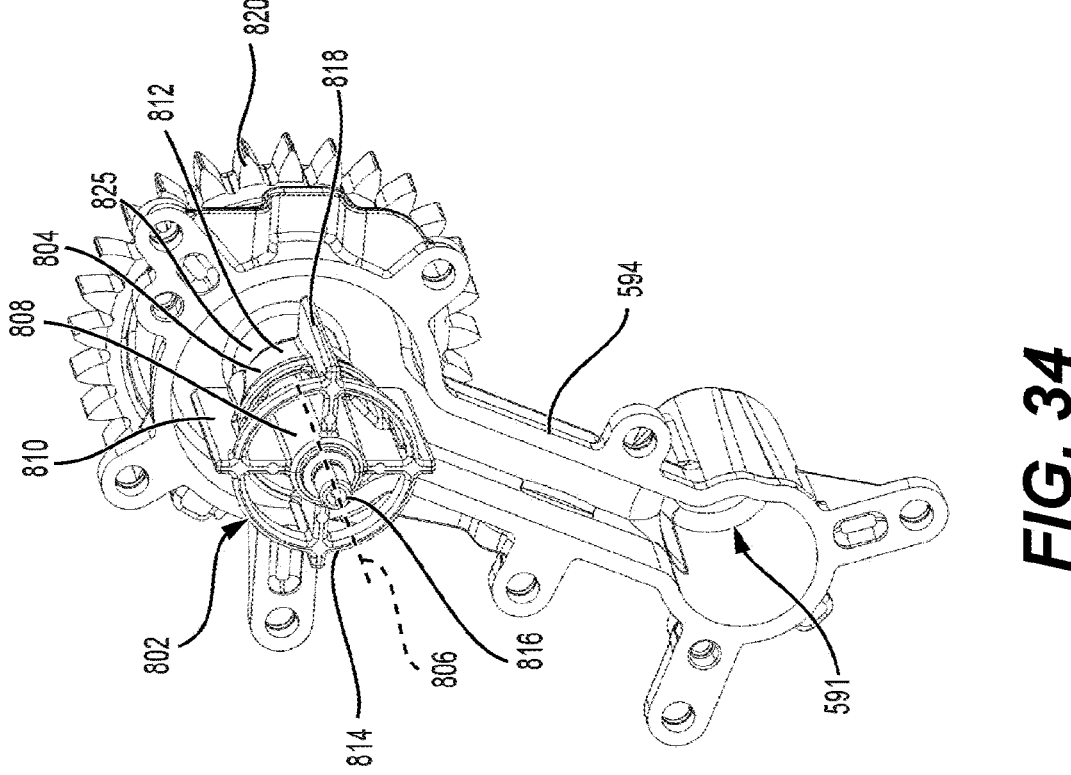
FIG. 34 is a perspective view, taken from a front, top, left side, of an air separator, a rear casing and a separator gear of the dual-cutch transmission of FIG. 3A.

Returning to FIG. 20, in this embodiment, the secondary pumps 580, 582, 584 route the transmission fluid to a separator compartment 590 defined within the front chamber 502. The separator compartment 590 is fluidly connected between the suction pumps 580, 582, 584 and the fluid tank 534. As best shown in FIGS. 32 to 34, in this embodiment, the separator compartment 590 is defined by a front casing 592 and a rear casing 594 which are fastened to one another. The separator compartment 590 may be defined by different components in other embodiments. The separator compartment 590 has a transmission fluid inlet 591 (FIGS. 31 and 34) for receiving transmission fluid from the secondary pumps 580, 582, 584 and a transmission fluid outlet 593 (FIG. 32) for discharging transmission fluid to the fluid tank 534. The transmission fluid inlet 591 is disposed at a lower end of the separator compartment 590 such that the separator compartment extends upward from the transmission fluid inlet 591. The transmission fluid outlet 593 is disposed at an upper end of the separator compartment 590. In particular, the transmission fluid outlet 593 opens into the fluid tank 534.

With reference to FIGS. 31 to 34, the transmission fluid distribution system 450 includes an air separator 802 disposed in the separator compartment 590. The air separator 802 is configured to separate air from transmission fluid. Notably, due to the mixing of air with the transmission fluid, the transmission fluid may form foam which could negatively affect the performance of the primary pump 104. The secondary pumps 580, 582, 584 are fluidly connected to the separator compartment 590 such as to pump transmission fluid from the front and rear chambers 502, 504 to the air separator 802. In turn, the separator compartment 590 is fluidly connected to the fluid tank 534 such that transmission fluid, after having been acted on by the air separator 802, flows from the separator compartment 590 to the fluid tank 534.

As best shown in FIGS. 32 to 34, the air separator 802 has a separator body 804 that is rotatable about a separator axis 806. In this embodiment, the separator axis 806 is disposed vertically higher than the secondary pumps 580, 582, 584 when the vehicle is at rest on a flat horizontal ground surface. In this embodiment, the separator body 804 includes a hub 808, an impeller 810, a sleeve 812 and an annular formation 814 which are interconnected to one another. In particular, the separator body 804 is formed integrally as a single piece component.

As shown in FIG. 34, the hub 808 is mounted to a separator shaft 816 extending along the separator axis 806. The separator shaft 816 extends through the rear casing 594 for connection to a separator gear 820 on the rear side thereof. The hub 808 is generally cylindrical and extends from a front end to a rear end of the separator body 804.

The impeller 810 has a plurality of impeller blades 818 that extend from the hub 808 and are centered about the separator axis 806. In particular, in this embodiment, four impeller blades 818 are provided spaced apart from one another equally such that the impeller blades 818 are at 90° from one another. The impeller blades 818 are configured to project the transmission fluid within the separator compartment 590 in order to separate air from the transmission fluid.

The sleeve 812 is configured to guide the mixture of transmission fluid and air radially outwards towards the impeller blades 818. The sleeve 812 is centered about the separator axis 806 and extends along a portion of the axial length of the separator body 804, namely from the rear end thereof. The sleeve 812 extends radially outwards from the hub 808 and is generally conical such that a diameter of the sleeve 812 is greater at its front end than at its rear end. The sleeve 812 is also hollow to reduce its weight. The sleeve 812 is connected to each of the impeller blades 818, forming respective arcs between consecutive ones of the impeller blades 818.

The annular formation 814 which is centered about the separator axis 806 is axially spaced from the sleeve 812. Notably, the annular formation 814 is disposed at the front end of the separator body 804. The annular formation 814 provides greater rigidity to the separator body 804 which can be beneficial for its performance. The annular formation 814 is connected to each of the impeller blades 818, forming respective arcs between consecutive ones of the impeller blades 818. The annular formation 814 has a diameter that is greater than a maximal diameter of the sleeve 812.

In this embodiment, the air separator 802 is driven by rotation of the input shaft 122. More specifically, the transmission fluid distribution system 450 includes a separator gear 820 (FIGS. 32 to 34) that is meshed with and driven by the output gear 170 that is mounted to the input shaft 122. The separator gear 820, which is disposed behind the rear casing 594, is mounted to the separator shaft 816 such that the separator gear 820 is operatively connected to the separator body 804 to cause rotation of the separator body 804 about the separator axis 806.

In use, the transmission fluid that flows into the transmission fluid inlet 591 hits an annular shoulder 825 (FIGS. 33, 34) that is formed by the rear casing 594 and defining an opening through which the separator shaft 816 extends. Upon impacting the annular shoulder 825, the transmission fluid is atomized, thereby producing droplets of the transmission fluid. The droplets are propelled outwards by the impeller blades 818 and are discharged from the separator compartment 590 through a transmission fluid outlet 593 defined at an end of a cylindrical barrier 821 (FIG. 35) defined by the front casing 592. The barrier 821 surrounds the separator body 804 along at least a majority of the axial length thereof.

In this embodiment, the fluid tank 534 is filled to a maximum capacity thereof with transmission fluid. This is due in part by the shape and dimensions of the fluid tank 534 since the fluid tank 534 is generally tall and slim. Notably, in this embodiment, the fluid tank 534 has a height of at least 120 mm. More specifically, in this embodiment, the height of the fluid tank 534 is between 150 mm and 200 mm inclusively. For instance, the height of the fluid tank 534 may be approximately 175 mm (±10 mm).

Figure 35:
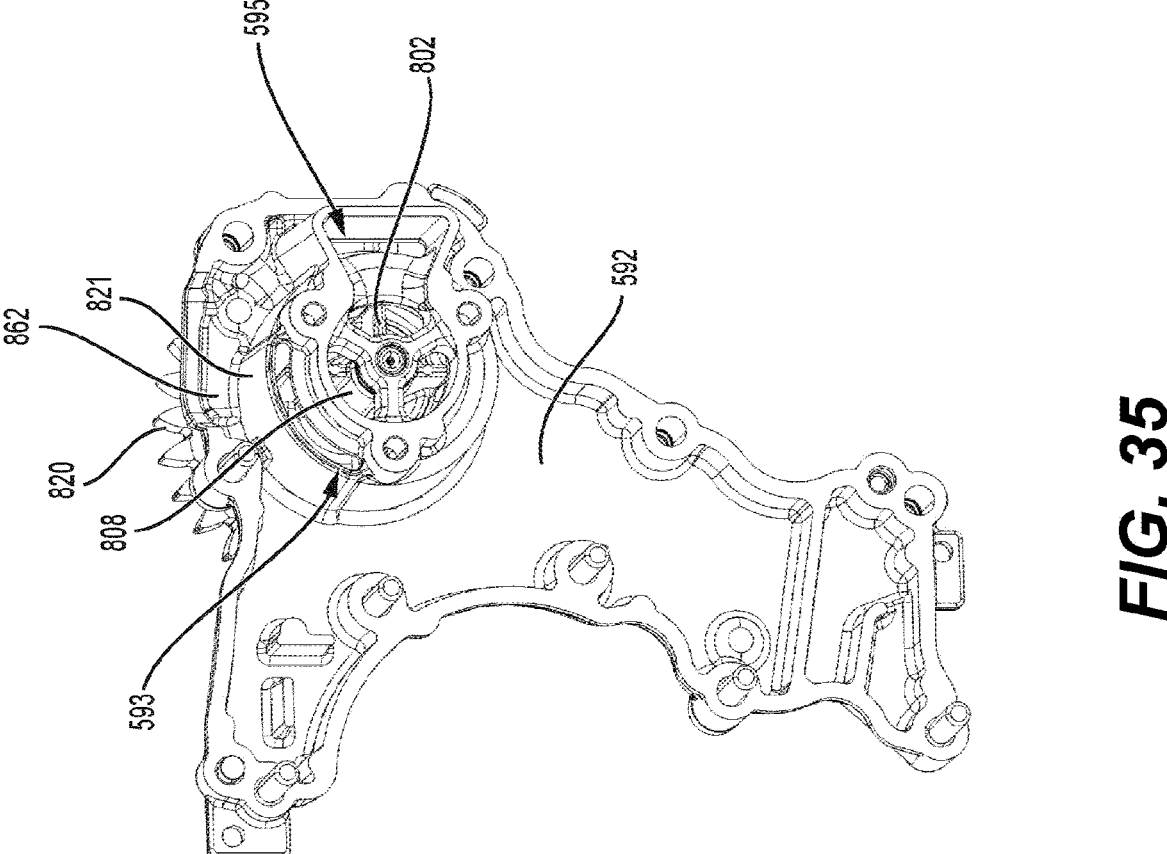
FIG. 35 is a perspective view, taken from a front, top, right side, of the air separator and the separator gear of FIG. 34 and a front casing.

As shown in FIGS. 33 and 35, the separator compartment 590 also has an air outlet 595 for discharging air separated from the transmission fluid in the separator compartment 590. The air separated from the transmission fluid by the air separator 802 is discharged by the air separator 802 axially towards the front and through the air outlet 595. The air outlet 595 is disposed at the upper end of the separator compartment 590. The air discharged through the air outlet 595 is then recirculated within the transmission housing 102.

The transmission fluid distribution system 450 as described above thus provides lubrication, and in some cases cooling, to the components of the DCT 100 enclosed within the front and rear chambers 502, 504.

Figure 3E:
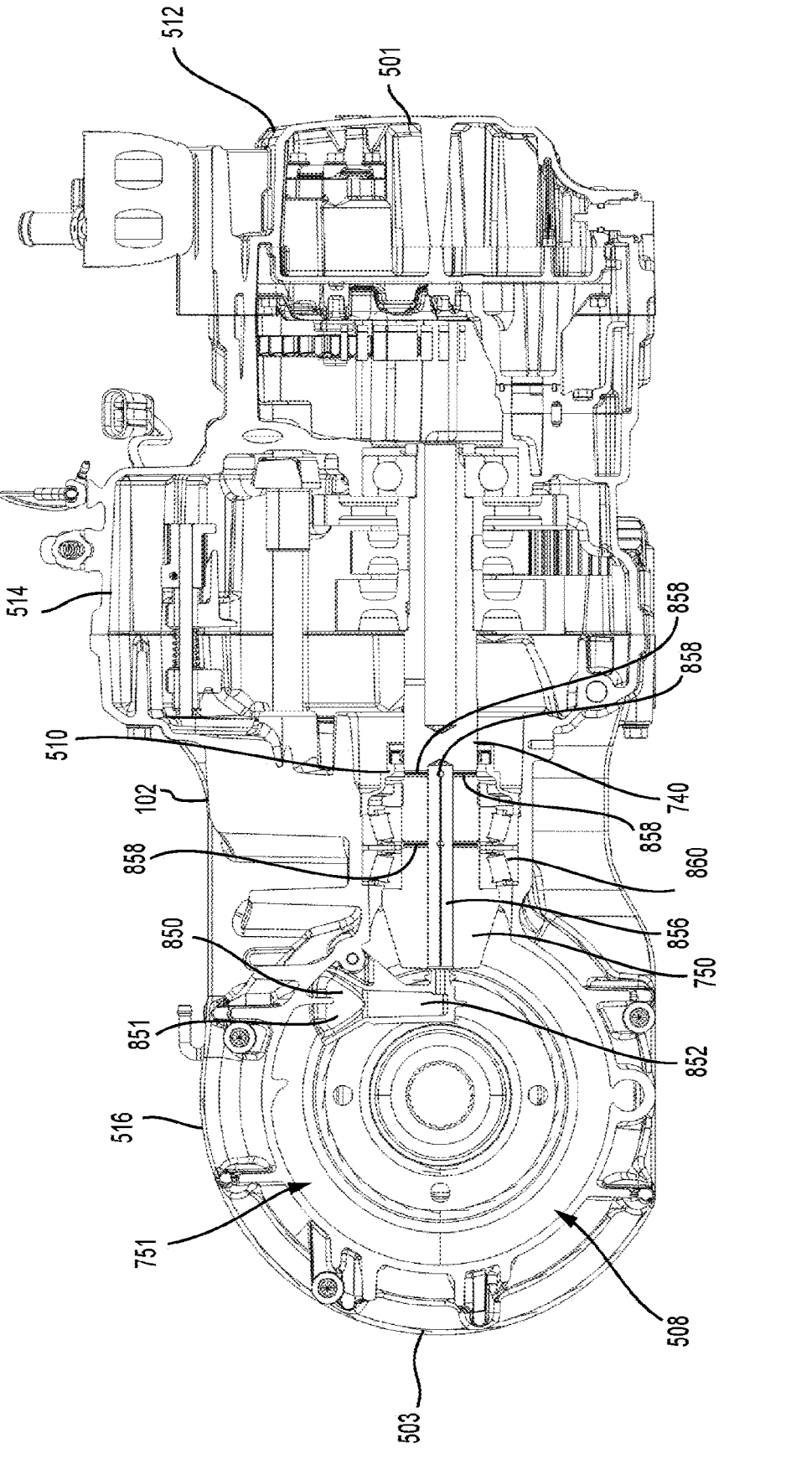
FIG. 3E is a cross-sectional view of the dual-clutch transmission of FIG. 3A taken along line 3E-3E in FIG. 3D.

As mentioned above, the transaxle chamber 508 is fluidly independent from the front and rear chambers 502, 504 such that the transmission fluid flowing therein does not flow into the front and rear chambers 502, 504 and vice-versa. Rather, with reference to FIG. 3E, the rear housing segment 516 is arranged to lubricate the components that need lubrication within the transaxle chamber 508. Notably, as shown in FIG. 3E, the rear housing segment 516 has a funnel 850 configured to receive transmission fluid circulated within the transaxle chamber 508 by the transaxle 751. In this embodiment, the funnel 850 extends generally vertically and has a conical portion 851 and a straight portion 852 extending downward from the conical portion 851. The conical portion 851 is open at its upper end to receive transmission fluid therein. The funnel 850 defines an internal funnel passage 854 that is in communication with a fluid passage 856 defined by the output shaft 740. As shown in FIG. 3E, the fluid passage 856 extends from the rear end of the output shaft 740 and is centered about the axis of the output shaft 740. The output shaft 740 defines radial openings 858 extending radially from an outer surface of the output shaft 740 to an inner surface defining the fluid passage 856. As such, the radial openings 858 are fluidly connected to the fluid passage 856.

Thus, in use, transmission fluid is circulated within the transaxle chamber by the rotating transaxle 751 such that a portion of the transmission fluid is received within the funnel 850 and flows through the funnel passage 854 and then into the fluid passage 856 of the output shaft 740. The transmission fluid then exits the fluid passage 856 through the radial openings 858 to lubricate a bearing 860 (FIGS. 3E and 24) mounted to the output shaft 740 and disposed within the transaxle chamber 508. Notably, the bearing 860 rotatably supports the output shaft 740 on the rear housing segment 516. It is contemplated that in some embodiments, the funnel 850 could be omitted.

Figure 36:
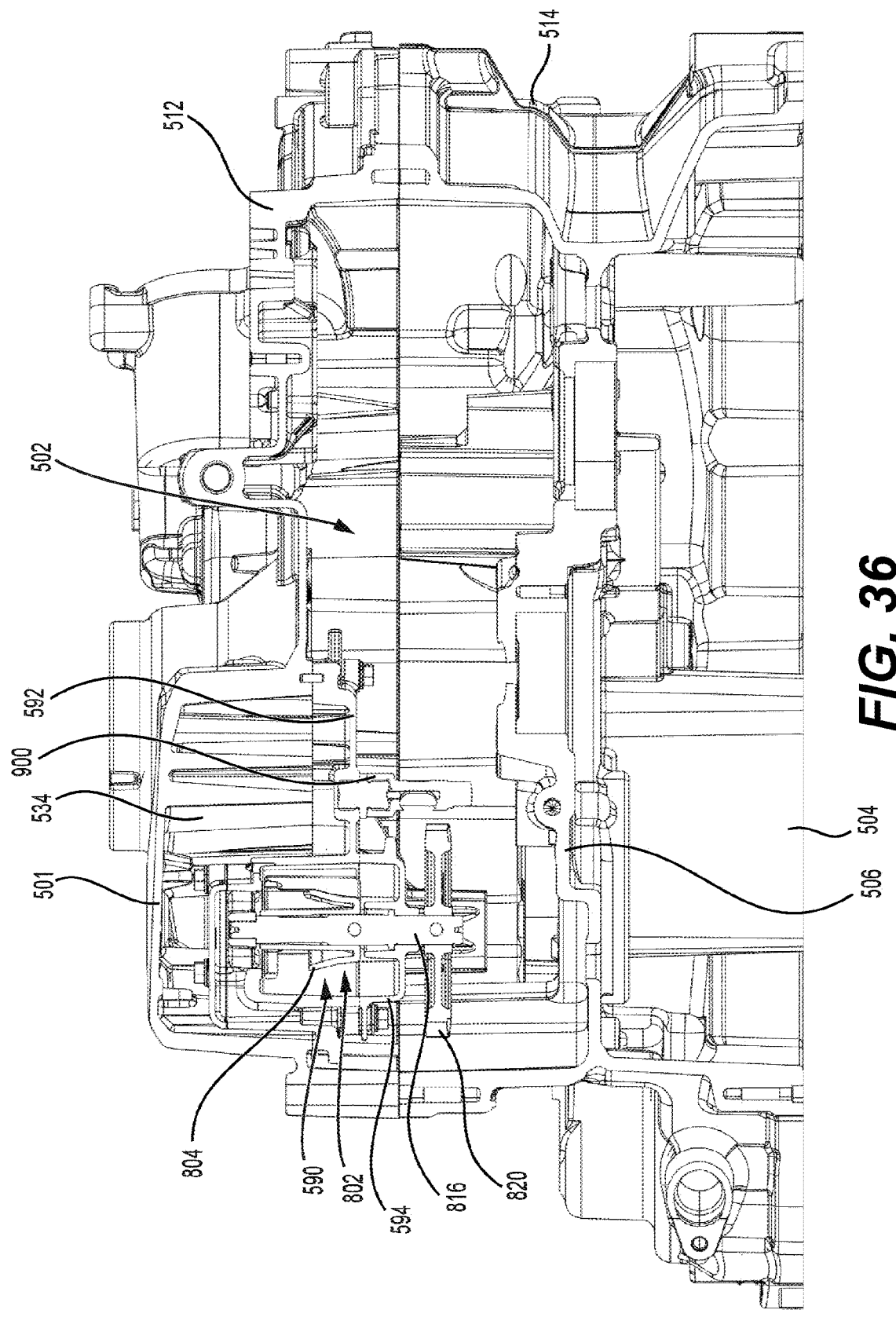
FIG. 36 is a cross-sectional view of an alternative embodiment of the dual-clutch transmission of FIG. 3A taken along a line corresponding to line 31-31 in FIG. 3C.
Figure 37:
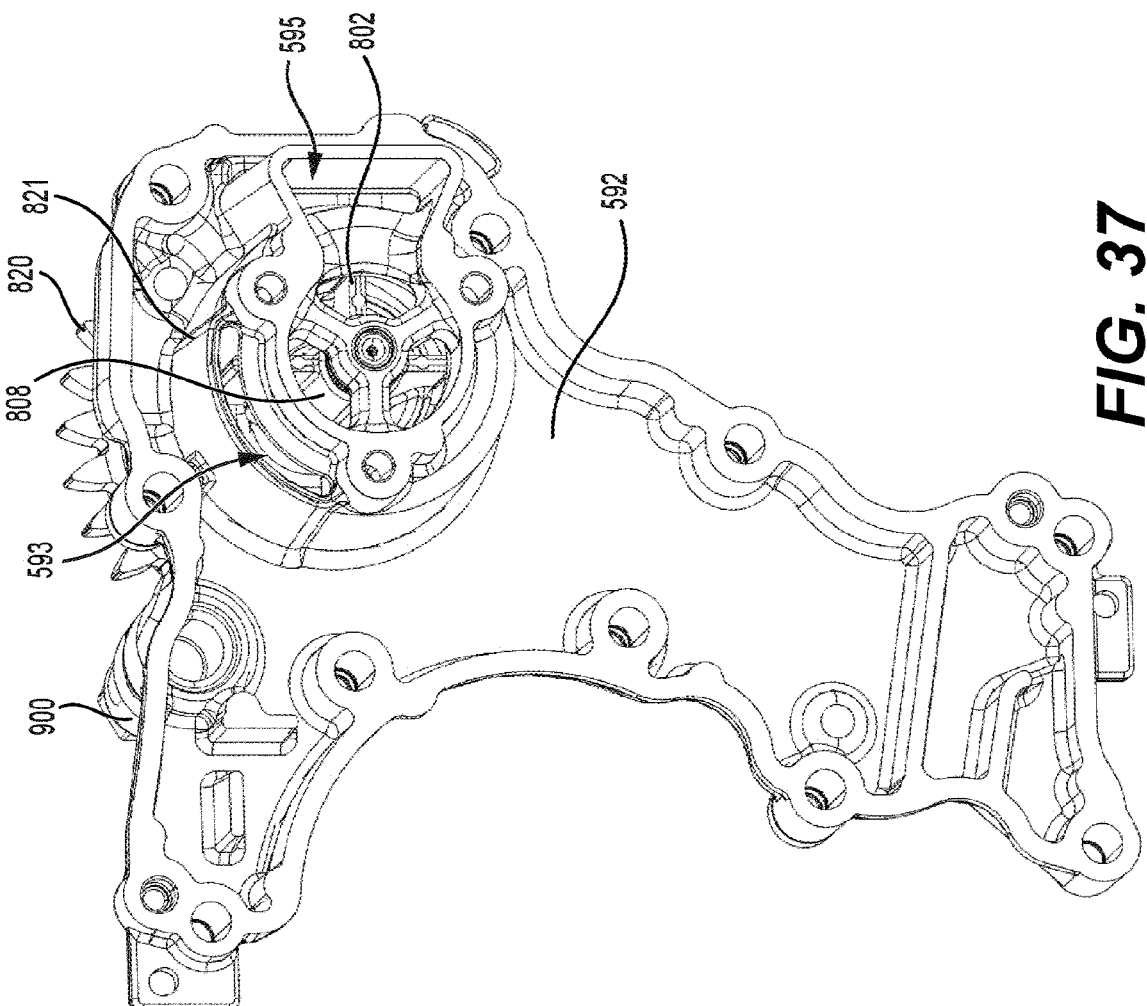
FIG. 37 is a perspective view, taken from a front, top, right side, of an air separator, a separator gear, a front casing, and a pressure relief valve of the alternative embodiment of the dual-clutch transmission.
Figure 38:
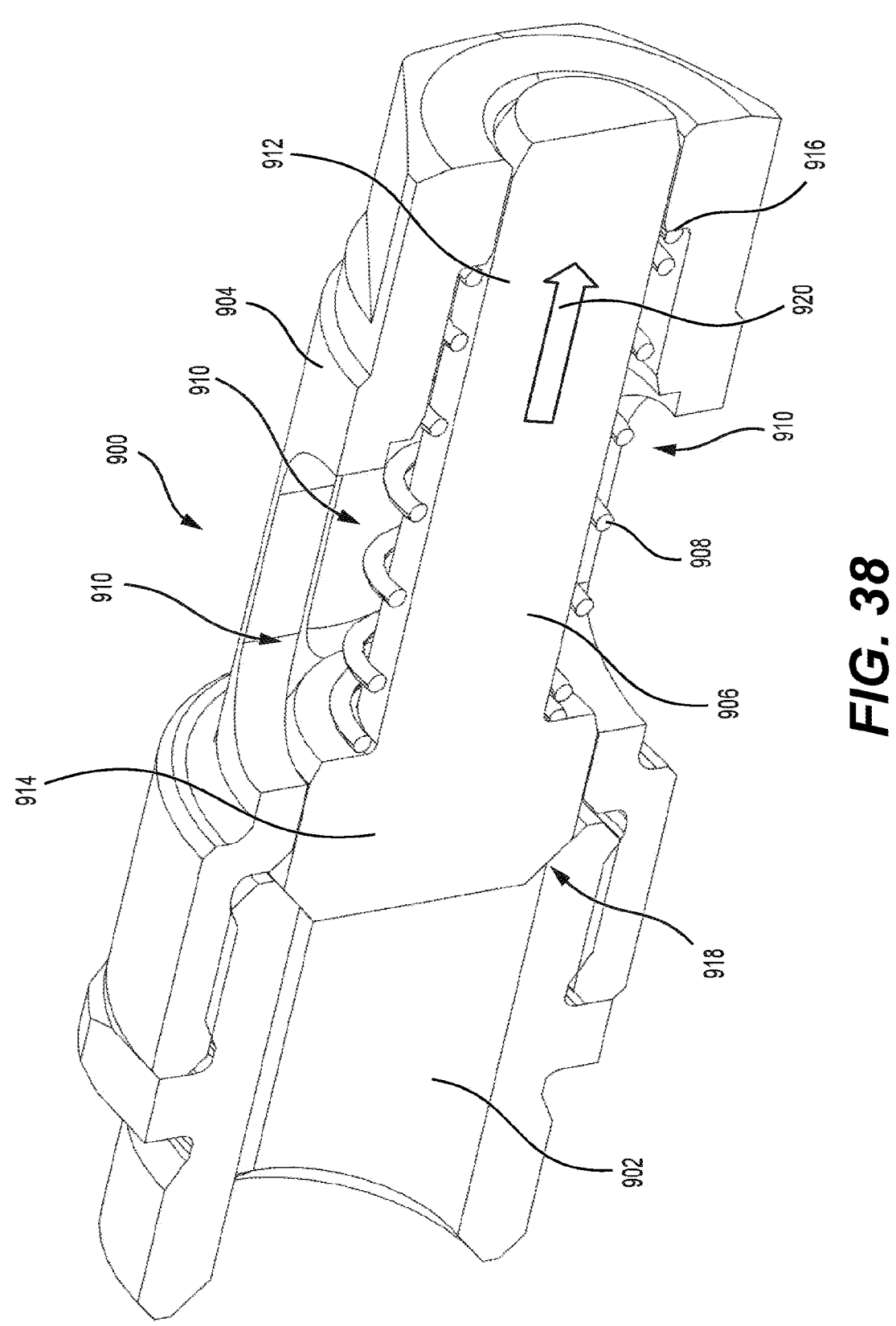
FIG. 38 is a perspective view of the pressure relief valve of FIG. 37.

Turning now to FIGS. 36 to 38, an alternative embodiment of the DCT 100 will be described. For simplicity, components of this alternative embodiment that are the same as or are similar to those described above have been labeled with the same reference numerals and will not be described again.

In the DCT 100, an aperture 862 (FIG. 35) defined in the front casing 592 fluidly communicates the fluid tank 534 with the front chamber 502 to balance the pressure between the interior of the fluid tank 534 and the interior of the front chamber 502. In the present embodiment, this aperture 862 has been omitted and replaced by a pressure relief valve 900 extending through another aperture in the front casing 592. The pressure relief valve 900 selectively communicates the interior of the fluid tank 534 with the interior of the front chamber 502 when the pressure inside the fluid tank 534 exceeds a predetermined pressure. In the present embodiment, the predetermined pressure is 0.3 bar, but other pressures are contemplated. This predetermined pressure is slightly higher than the pressure inside the front chamber 502. It has been found that maintaining a slight overpressure inside the fluid tank 534 helps reduce cavitation of the primary pump 104.

As can be seen in FIGS. 36 and 37, the pressure relief valve 900 extends through the front casing 592 near a top thereof and near the air separator 802. With reference to FIG. 38, the pressure relief valve 900 includes a fitting 902 that is inserted inside an aperture in the front casing 592 and that fastens the pressure relief valve 900 to the front casing 592. The pressure relief valve 900 also includes a valve body 904, a piston 906 and a spring 908. The valve body 904 defines four valve body outlets 910. It is contemplated that the valve body 904 could define more or less than four valve body outlets 910. The valve body 904 is connected to the fitting 902 such that the valve body 902 is disposed inside the front chamber 502. The piston 906 is disposed inside the valve body 904 and can selectively slide therein. The spring 908 is disposed around a stem 912 of the piston 906. The spring 908 abuts the head 914 of the piston 906 at one end and a step 916 defined by the valve body 904 at the other end. The spring 908 biases the head 914 of the piston 906 against a fitting outlet 918 of the fitting 902 as shown in FIG. 38 into a closed position, thereby preventing air inside the fluid tank 534 from flowing into the front chamber 502 via the pressure relief valve 900. When the air pressure inside the fluid tank 534 exceeds the predetermined pressure of 0.3 bar, the air pressure inside the fluid tank 534 pushes the piston 906 in the direction indicated by arrow 920, which compresses the spring 908 and places the pressure relief valve 900 into an open position. In the open position, since the head 914 of the piston 906 no longer blocks the fitting outlet 918, air in the fluid tank 534 flows through the fitting 902 into the valve body 904, and from the valve body 904 into the front chamber 902 via the valve body outlets 910, thereby reducing the pressure inside the fluid tank 934. Once the pressure inside the fluid tank 534 drops below 0.3 bar, the spring 908 pushes the head 914 of the piston 906 back against a fitting outlet 918 of the fitting 902 to close the pressure relief vale 900. It is contemplated that another type of pressure relief vale could be used instead of the pressure relief valve 900. Other components of this alternative embodiment of the DCT 100 are the same as or are similar to those of the DCT 100 and will not be described again.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A transmission for a vehicle, comprising:
an input shaft configured to be operatively connected to an internal combustion engine of the vehicle;
a gear shaft selectively operatively connected to the input shaft;
a plurality of transmission gears mounted to the gear shaft;
a clutch selectively actuatable to transmit motion between the input shaft and the gear shaft for selectively operating the transmission in one of the plurality of transmission gears;
an output shaft operatively connected to the gear shaft at least in part by the plurality of transmission gears, the output shaft being configured to be operatively connected to at least one ground-engaging member of the vehicle;
a transmission housing at least partly enclosing the input shaft, the plurality of transmission gears, the clutch and the output shaft, the transmission housing comprising an internal dividing wall defining first and second chambers of the transmission housing, the internal dividing wall being configured to limit flow of transmission fluid between the first and second chambers,
the input shaft and the clutch being disposed within the first chamber, and
the plurality of transmission gears and the output shaft being disposed within the second chamber; and
a transmission fluid distribution system configured to distribute transmission fluid within the transmission and fluidly connecting the first chamber to the second chamber, the transmission fluid distribution system comprising:
a fluid tank defined at least in part by the transmission housing; and
a primary pump fluidly connected to the fluid tank and to the first and second chambers, the primary pump being configured to pump transmission fluid to the first and second chambers,
the internal dividing wall having a first side defining the first chamber and a second side defining the second chamber,
the internal dividing wall defining at least one fluid channel extending from the first side to the second side of the internal dividing wall, the at least one fluid channel being fluidly connected to the primary pump to route transmission fluid in a controlled manner from the first chamber to the second chamber, and the internal dividing wall defining at least one air hole disposed in an upper portion of the internal dividing wall for balancing a pressure within the first chamber with a pressure within the second chamber.

2. The transmission of claim 1, wherein:
the transmission housing has a lower end and an upper end; and
the internal dividing wall extends along at least a majority of a distance measured from the lower end to the upper end.

3. The transmission of claim 1, wherein the output shaft extends outside of the second chamber through a side of the second chamber opposite the first chamber.

4. The transmission of claim 1, wherein the transmission fluid distribution system further comprises at least one fluid spraying device disposed in the second chamber and fluidly connected to the at least one fluid channel such as to receive transmission fluid therefrom, the at least one fluid spraying device being configured to spray transmission fluid within the second chamber.

5. The transmission of claim 1, wherein the transmission fluid distribution system further comprises a heat exchanger fluidly connected to the primary pump and configured to absorb heat from transmission fluid received from the primary pump, the heat exchanger having an inlet for receiving heated transmission fluid from the primary pump and an outlet for discharging cooled transmission fluid to multiple components of the transmission including the clutch.

6. The transmission of claim 1, wherein the fluid tank comprises an inlet duct at an upper end thereof configured for filling the fluid tank with transmission fluid.

7. The transmission of claim 1, wherein:
the at least one fluid channel has at least one fluid channel inlet and at least one fluid channel outlet, the at least one fluid channel inlet and the at least one fluid channel outlet being non-coaxial.

8. The transmission of claim 1, wherein the transmission fluid distribution system further comprises:
a first suction pump fluidly connected to the first chamber; and
a second suction pump fluidly connected to the second chamber,
the first and second suction pumps being fluidly connected to the fluid tank to route transmission fluid from the first and second chambers to the fluid tank.

9. The transmission of claim 8, wherein:
the transmission housing defines a separator compartment;
the transmission fluid distribution system further comprises an air separator disposed in the separator compartment and configured to separate air from transmission fluid;
the air separator comprises a separator body that is rotatable about a separator axis;
the separator body comprising an impeller; and
the first and second suction pumps are fluidly connected to the separator compartment to pump transmission fluid from the first and second chambers to the air separator.

* * * * *